United States Patent
Barlow et al.

(10) Patent No.: US 12,454,573 B2
(45) Date of Patent: Oct. 28, 2025

(54) DOSAGES OF EMACTUZUMAB

(71) Applicant: Synox Therapeutics UK Limited, Oxford (GB)

(72) Inventors: Raymond Barlow, Dublin (IE); Axel Mescheder, Dublin (IE); Michael Cannarile, Penzberg (DE); Georgina Meneses-Lorente, Welwyn Garden City (GB)

(73) Assignee: SYNOX THERAPEUTICS UK LIMITED, Oxford (GB)

( * ) Notice: Subject to any disclaimer, the term of this patent is extended or adjusted under 35 U.S.C. 154(b) by 150 days.

(21) Appl. No.: 18/051,816

(22) Filed: Nov. 1, 2022

(65) Prior Publication Data

US 2023/0340110 A1    Oct. 26, 2023

Related U.S. Application Data

(60) Provisional application No. 63/274,634, filed on Nov. 2, 2021.

(51) Int. Cl.
| | | |
|---|---|---|
| *C07K 16/28* | (2006.01) | |
| *A61K 9/00* | (2006.01) | |
| *A61P 35/00* | (2006.01) | |
| *A61K 39/00* | (2006.01) | |

(52) U.S. Cl.
CPC ............ *C07K 16/28* (2013.01); *A61K 9/0019* (2013.01); *A61P 35/00* (2018.01); *A61K 2039/545* (2013.01)

(58) Field of Classification Search
CPC .......................... C07K 16/28; C07K 2317/24; C07K 2317/76; C07K 2317/92; C07K 16/2866; C07K 2317/565; C07K 2317/569; C07K 2317/50; C07K 2317/56; C07K 16/464; A61K 9/0019; A61K 2039/545; A61K 2039/505; A61K 2039/585; A61P 35/00
See application file for complete search history.

(56) References Cited

U.S. PATENT DOCUMENTS

| | | | |
|---|---|---|---|
| 8,999,327 B2 * | 4/2015 | Dimoudis ............... | A61P 29/00 424/133.1 |
| 11,498,968 B2 * | 11/2022 | Cannarile .......... | C07K 16/2827 |
| 11,752,096 B2 * | 9/2023 | Alani ...................... | A61P 19/02 424/133.1 |

OTHER PUBLICATIONS

Janeway, C. A. Jr. et al., Immunobiology: The Immune System in Health and Disease. Chapter 3: Structure of the Antibody Molecule and Immunoglobulin Genes. 3rd Edition, 1997 Garland Publishing Inc., pp. 3:1-3:11 (Year: 1997).*
Edwards, B. M. et al. The Remarkable Flexibility of the Human Antibody Repertoire; Isolation of Over One Thousand Different Antibodies to a Single Protein, BLyS. J Mol Biol 2003; 334:103-118. (Year: 2003).*
Goel, M. et al. Plasticity within the Antigen-Combining Site May Manifest as Molecular Mimicry in the Humoral Immune Response. J Immunol 2004; 173:7358-7367. (Year: 2004).*
Dall'Acqua, W.F. et al. Antibody humanization by framework shuffling. Methods 2005; 36:43-60. (Year: 2005).*
De Genst, E. et al. Antibody repertoire development in camelids. Dev Comp Immunol 2006; 30:187-98. (Year: 2006).*
Almagro, J.C. & Fransson, J. Humanization of Antibodies. Frontiers in Bioscience 2008; 13:1619-33. (Year: 2008).*
Lloyd, C. et al. Modelling the human immune response: performance of a 1011 human antibody repertoire against a broad panel of therapeutically relevant antigens. Protein Eng Des Sel 2009; 22;3: 159-168. (Year: 2009).*
Bai, S. et al. A Guide to Rational Dosing of Monoclonal Antibodies. Clin Pharmacokinet 2012; 51: 119-135. (Year: 2012).*
Xu, Z. et al. Rational development and utilization of antibody-based therapeutic proteins in pediatrics. Pharmacol Ther 2013; 137(2): 225-247. (Year: 2013).*
Cassier, P. A. et al. CSF1R inhibition with emactuzumab in locally advanced diffuse-type tenosynovial giant cell tumours of the soft tissue: a dose-escalation and dose-expansion phase 1 study. Lancet Oncol 2015; 16: 949-956. (Year: 2015).*
Yang, N. Evaluation of Weight Thresholds for Pediatric Patients to Use Adult Dosage of Therapeutic Monoclonal Antibodies. J Clin Pharmacol 2019; 59(10): 1309-1318. (Year: 2019).*
Kanyavuz, A. et al. Breaking the law: unconventional strategies for antibody diversification. Nat Rev Immunol 2019; 19: 355-368. (Year: 2019).*
Briney, B. et al. Commonality despite exceptional diversity in the baseline human antibody repertoire. Nature 2019; 566: 393-397 (Year: 2019).*
Cassier, P. A. et al., "Long-term clinical activity, safety and patient-reported quality of life for emactuzumab-treated patients with diffuse-type tenosynovial giant-cell tumour," *European Journal of Cancer*, 141 (2020): 162-170.
Smart, K. et al., "PK/PD Mediated Dose Optimization of Emactuzumab, a CSF1R Inhibitor, in Patients With Advanced Solid Tumors and Diffuse-Type Tenosynovial Giant Cell Tumor," *Clinical Pharmacology & Therapeutics*, 108 (2020): 616-624.
Turalio—Assessment Report, *European Medicines Agency*, 2020, 1-144.
Turalio—Highlights of Prescribing Information, 2019, 1-8.

(Continued)

*Primary Examiner* — Misook Yu
*Assistant Examiner* — Grace H Lunde
(74) *Attorney, Agent, or Firm* — pH IP Law

(57) ABSTRACT

The present invention relates to a treatment regime, including an antibody or antigen-binding fragment which is capable of binding specifically to colony stimulating factor-1 receptor (CSF-1R) for use in the treatment of tenosynovial giant cell tumour (TGCT) in a subject, as well as associated uses and methods.

5 Claims, 14 Drawing Sheets
Specification includes a Sequence Listing.

(56) References Cited

OTHER PUBLICATIONS

West, R. B. et al., "A landscape effect in tenosynovial giant-cell tumor from activation of CSF1 expression by a translocation in a minority of tumor cells," *PNAS*, 103 (2006): 690-695.
Xiong, Y. et al., "A CSF-1 Receptor Phosphotyrosine 559 Signaling Pathway Regulates Receptor Ubiquitination and Tyrosine Phosphorylation," *Journal of Biological Chemistry*, 286 (2011): 952-960.

\* cited by examiner

SEQUENCE LISTING

```
Sequence total quantity: 12
SEQ ID NO: 1            moltype = AA  length = 972
FEATURE                 Location/Qualifiers
source                  1..972
                        mol_type = protein
                        organism = synthetic construct
SEQUENCE: 1
MGPGVLLLLL VATAWHGQGI PVIEPSVPEL VVKPGATVTL RCVGNGSVEW DGPPSPHWTL   60
YSDGSSSILS TNNATFQNTG TYRCTEPGDP LGGSAAIHLY VKDPARPWNV LAQEVVVFED  120
QDALLPCLLT DPVLEAGVSL VRVRGRPLMR HTNYSFSPWH GFTIHRAKFI QSQDYQCSAL  180
MGGRKVMSIS IRLKVQKVIP GPPALTLVPA ELVRIRGEAA QIVCSASSVD VNFDVFLQHN  240
NTKLAIPQQS DFHNNRYQKV LTLNLDQVDF QHAGNYSCVA SNVQGKHSTS MFFRVVESAY  300
LNLSSEQNLI QEVTVGEGLN LKVMVEAYPG LQGFNWTYLG PFSDHQPEPK LANATTKDTY  360
RHTFTLSLPR LKPSEAGRYS FLARNPGGWR ALTFELTLRY PPEVSVIWTF INGSGTLLCA  420
ASGYPQPNVT WLQCSGHTDR CDEAQVLQVW DDPYPEVLSQ EPFHKVTVQS LLTVETLEHN  480
QTYECRAHNS VGSGSWAFIP ISAGAHTPPP DEFLFTPVVV ACMSIMALLL LLLLLLLYKY  540
KQKPKYQVRW KIIESYEGNS YTFIDPTQLP YNEKWEFPRN NLQFGKTLGA GAFGKVVEAT  600
AFGLGKEDAV LKVAVKMLKS TAHADEKEAL MSELKIMSHL GQHENIVNLL GACTHGGPVL  660
VITEYCCYGD LLNFLRRKAE AMLGPSLSPG QDPEGGVDYK NIHLEKKYVR RDSGFSSQGV  720
DTYVEMRPVS TSSNDSFSEQ DLDKEDGRPL ELRDLLHFSS QVAQGMAFLA SKNCIHRDVA  780
ARNVLLTNGH VAKIGDFGLA RDIMNDSNYI VKGNARLPVK WMAPESIFDC VYTVQSDVWS  840
YGILLWEIFS LGLNPYPGIL VNSKFYKLVK DGYQMAQPAF APKNIYSIMQ ACWALEPTHR  900
PTFQQICSFL QEQAQEDRRE RDYTNLPSSS RSGGSGSSSS ELEEESSSEH LTCCEQGDIA  960
QPLLQPNNYQ FC                                                     972

SEQ ID NO: 2            moltype = AA  length = 388
FEATURE                 Location/Qualifiers
source                  1..388
                        mol_type = protein
                        organism = synthetic construct
SEQUENCE: 2
IPVIEPSVPE LVVKPGATVT LRCVGNGSVE WDGPPSPHWT LYSDGSSSIL STNNATFQNT   60
GTYRCTEPGD PLGGSAAIHL YVKDPARPWN VLAQEVVVFE DQDALLPCLL TDPVLEAGVS  120
LVRVRGRPLM RHTNYSFSPW HGFTIHRAKF IQSQDYQCSA LMGGRKVMSI SIRLKVQKVI  180
PGPPALTLVP AELVRIRGEA AQIVCSASSV DVNFDVFLQH NNTKLAIPQQ SDFHNNRYQK  240
VLTLNLDQVD FQHAGNYSCV ASNVQGKHST SMFFRYPPEV SVIWTFINGS GTLLCAASGY  300
PQPNVTWLQC SGHTDRCDEA QVLQVWDDPY PEVLSQEPFH KVTVQSLLTV ETLEHNQTYE  360
```

```
CRAHNSVGSG SWAFIPISAG AHTHPPDE                                       388

SEQ ID NO: 3              moltype = AA   length = 5
FEATURE                   Location/Qualifiers
source                    1..5
                          mol_type = protein
                          organism = synthetic construct
SEQUENCE: 3
SYDIS                                                                5

SEQ ID NO: 4              moltype = AA   length = 16
FEATURE                   Location/Qualifiers
source                    1..16
                          mol_type = protein
                          organism = synthetic construct
SEQUENCE: 4
VIWTDGGTNY AQKLQG                                                    16

SEQ ID NO: 5              moltype = AA   length = 8
FEATURE                   Location/Qualifiers
source                    1..8
                          mol_type = protein
                          organism = synthetic construct
SEQUENCE: 5
DQRLYFDV                                                             8

SEQ ID NO: 6              moltype = AA   length = 11
FEATURE                   Location/Qualifiers
source                    1..11
                          mol_type = protein
                          organism = synthetic construct
SEQUENCE: 6
RASEDVNTYV S                                                         11

SEQ ID NO: 7              moltype = AA   length = 7
FEATURE                   Location/Qualifiers
source                    1..7
                          mol_type = protein
                          organism = synthetic construct
SEQUENCE: 7
AASNRYT                                                              7

SEQ ID NO: 8              moltype = AA   length = 8
FEATURE                   Location/Qualifiers
source                    1..8
                          mol_type = protein
                          organism = synthetic construct
SEQUENCE: 8
QQSFSYPT                                                             8

SEQ ID NO: 9              moltype = AA   length = 116
FEATURE                   Location/Qualifiers
source                    1..116
                          mol_type = protein
                          organism = synthetic construct
SEQUENCE: 9
QVQLVQSGAE VKKPGASVKV SCKASGYTFT SYDISWVRQA PGQGLEWMGV IWTDGGTNYA    60
QKLQGRVTMT TDTSTSTAYM ELRSLRSDDT AVYYCARDQR LYFDVWGQGT TVTVSS        116

SEQ ID NO: 10             moltype = AA   length = 106
FEATURE                   Location/Qualifiers
source                    1..106
                          mol_type = protein
                          organism = synthetic construct
SEQUENCE: 10
DIQMTQSPSS LSASVGDRVT ITCRASEDVN TYVSWYQQKP GKAPKLLIYA ASNRYTGVPS    60
RFSGSGSGTD FTLTISSLQP EDFATYYCQQ SFSYPTFGQG TKLEIK                   106

SEQ ID NO: 11             moltype = AA   length = 446
FEATURE                   Location/Qualifiers
source                    1..446
                          mol_type = protein
                          organism = synthetic construct
SEQUENCE: 11
QVQLVQSGAE VKKPGASVKV SCKASGYTFT SYDISWVRQA PGQGLEWMGV IWTDGGTNYA    60
QKLQGRVTMT TDTSTSTAYM ELRSLRSDDT AVYYCARDQR LYFDVWGQGT TVTVSSASTK    120
GPSVFPLAPS SKSTSGGTAA LGCLVKDYFP EPVTVSWNSG ALTSGVHTFP AVLQSSGLYS    180
LSSVVTVPSS SLGTQTYICN VNHKPSNTKV DKKVEPKSCD KTHTCPPCPA PELLGGPSVF    240
LFPPKPKDTL MISRTPEVTC VVVDVSHEDP EVKFNWYVDG VEVHNAKTKP REEQYNSTYR    300
```

```
VVSVLTVLHQ DWLNGKEYKC KVSNKALPAP IEKTISKAKG QPREPQVYTL PPSRDELTKN    360
QVSLTCLVKG FYPSDIAVEW ESNGQPENNY KTTPPVLDSD GSFFLYSKLT VDKSRWQQGN    420
VFSCSVMHEA LHNHYTQKSL SLSPGK                                        446

SEQ ID NO: 12           moltype = AA    length = 213
FEATURE                 Location/Qualifiers
source                  1..213
                        mol_type = protein
                        organism = synthetic construct
SEQUENCE: 12
DIQMTQSPSS LSASVGDRVT ITCRASEDVN TYVSWYQQKP GKAPKLLIYA ASNRYTGVPS     60
RFSGSGSGTD FTLTISSLQP EDFATYYCQQ SFSYPTFGQG TKLEIKRTVA APSVFIFPPS    120
DEQLKSGTAS VVCLLNNFYP REAKVQWKVD NALQSGNSQE SVTEQDSKDS TYSLSSTLTL    180
SKADYEKHKV YACEVTHQGL SSPVTKSFNR GEC                                 213
```

DOSAGES OF EMACTUZUMAB

PRIORITY CLAIM

This application claims benefit of priority to U.S. Provisional Application Ser. No. 63/274,634, filed Nov. 2, 2021, the entire contents of which are hereby incorporated by reference.

INCORPORATION OF SEQUENCE LISTING

The sequence listing that is contained in the file named "EPCL.P0098US-Updated Sequence Listing.xml", which is 14 KB (as measured in Microsoft Windows®) and created on Apr. 24, 2023, is filed herewith by electronic submission, and is incorporated by reference herein.

FIELD

The present invention relates to a treatment regime, including an antibody or antigen-binding fragment which is capable of binding specifically to colony stimulating factor-1 receptor (CSF-1R) for use in the treatment of tenosynovial giant cell tumour (TGCT) in a subject, as well as associated uses and methods.

BACKGROUND

TGCTs are rare, benign tumors, arising in synovial lining of joints, tendon sheaths, or bursae. The knee is most frequently (66-80%) affected, followed by the hip, ankle, elbow, and shoulder (Murphey M D, et al. Pigmented villonodular synovitis: Radiologic-pathologic correlation. Radiographics. 2008; 28(5):1493-1518). The most commonly reported and debilitating symptoms are pain, swelling, stiffness, and limited range of motion of the affected joints (Bernthal N M, et al. The diffuse-type tenosynovial giant cell tumor (dt-TGCT) patient journey: A prospective multicenter study. Orphanet J Rare Dis. 2021; 16(1):191 and Riedel R F, et al. (Cancer Care). Improving Resources and Support for Patients with Tenosynovial Giant Cell Tumor. White Paper. Website: media.cancercare.org/publications/original/431-2021_TGCT.pdf). Consequently, these symptoms cause a significant impact on patients' physical functioning and health-related quality of life (HRQoL). A recent nationwide study in the Netherlands estimated worldwide incidence rates in localized-digits, localized-extremity and diffuse TGCT of 29, 10, and 4 per million person-years, respectively (Mastboom M J L, et al. Higher incidence rates than previously known in tenosynovial giant cell tumors. Acta Orthop. 2017a; 88(6):688-694). The current standard of care is surgical resection of the tumor. Patient outcome following surgery depends on multiple factors, including the location and extent of disease. Surgical resection may involve removal of major tendons, neurovascular structures, or limbs (in severe, recurrent cases), leading to significant postsurgical morbidity (Mastboom M J L, et al. Limb amputation after multiple treatments of tenosynovial giant cell tumour: Series of 4 Dutch cases. Case Rep Orthop. 2017b; 2017:7402570).

Many TGCT tumours are characterized by a prominent immune cell infiltrate containing macrophages that exert antitumor function (M1 subtype) or support tumor growth (M2 subtype) (Ogilvie-Harris D J, et al. Pigmented villonodular synovitis of the knee. The results of total arthroscopic synovectomy, partial, arthroscopic synovectomy, and arthroscopic local excision. J Bone Joint Surg Am 1992; 74:119-23 and Pollard J W. Trophic macrophages in development and disease. Nat Rev Immunol 2009; 9:259-70). In TGCT, colony stimulating factor 1 receptor (CSF-1) overexpression leads to the accumulation of monocytes and macrophages expressing CSF-1R (West R B, et al. A landscape effect in tenosynovial giant-cell tumor from activation of CSF1 expression by a translocation in a minority of tumor cells. Proc Natl Acad Sci USA 2006; 3:690-5), a class III receptor tyrosine kinases that regulates the survival, proliferation, and differentiation of monocytes and macrophages (Xiong Y, et al. A CSF-1 receptor phosphotyrosine 559 signaling pathway regulates receptor ubiquitination and tyrosine phosphorylation. J Biol Chem 2011; 286:952-60).

Although one therapy (pexidartinib/Turalio®) is already approved for the treatment of adult patients with symptomatic TGCT associated with severe morbidity or functional limitations and not amenable to improvement with surgery in the United States (US), this therapy can cause serious and potentially fatal liver injury (Turalio Prescribing Information. 2020. Website: world-wide-web.turaliohcp.com/en/.). In the EU, pexidartinib marketing authorization was refused as safety and efficacy was considered not sufficiently demonstrated (Turalio Refusal Public Assessment Report. EMA/CHMP/431740/2020. 2020). Due to the severe long-term morbidity, there is a need for a safe, effective treatment to reduce disability and restore function in patients with TGCT.

Emactuzumab is a humanized monoclonal antibody which binds specifically to human CSF-1R and is selective for the receptor dimerization interface of the human CSF-1R extracellular domain. Systemic therapy of patients with diffuse TGCT with emactuzumab in the Phase I study BP27772 showed a pronounced and durable response as assessed via the Response Evaluation Criteria in Solid Tumors version 1.1 (RECIST 1.1) associated with symptomatic improvement and a manageable safety profile (Cassier P A, et al. Long-term clinical activity, safety and patient-reported quality of life for emactuzumab-treated patients with diffuse-type tenosynovial giant-cell tumour. Eur J Cancer. 2020; 141:162-170). However, Emactuzumab is not approved for the treatment of TGCT nor for other clinical indications. This is due to the need of a confirmatory pivotal clinical trial, to demonstrate a positive benefit/risk.

Given the paucity of treatment options for TGCT patients there is a strong medical need for a safe and efficacious treatment of these tumours other than surgery. This systemic treatment needs to proof a pronounced and durable tumour shrinkage associated with improvement of the joint function, reduction in pain and improvement of the physical function as one of a group Patient-Reported Outcomes Information System instruments.

SUMMARY

The inventors have identified that an antibody or antigen-binding fragment which is capable of binding specifically to CSF-1R administered as a short-term treatment is surprisingly efficacious with a very acceptable safety profile.

In a first aspect, the present invention provides an antibody or antigen-binding fragment which is capable of binding specifically to colony stimulating factor-1 receptor (CSF-1R) for use in the treatment of tenosynovial giant cell tumour (TGCT) in a subject, according to a treatment regimen;
  wherein the treatment regimen comprises up to five treatment cycles; and,
  wherein a treatment cycle comprises one administration of about 200 mg to about 1,500 mg of the antibody or antigen-binding fragment, followed by an about 6-day to an about a 20-day period of rest.

In a second aspect, the present invention provides a method for the treatment of tenosynovial giant cell tumour (TGCT) in a subject, according to a treatment regimen;
wherein the treatment regimen comprises up to five treatment cycles of an antibody or antigen-binding fragment which is capable of binding specifically to colony stimulating factor-1 receptor (CSF-1R); and,
wherein a treatment cycle comprises one administration of about 200 mg to about 1,500 mg of the antibody or antigen-binding fragment, followed by an about 6-day to an about a 20-day period of rest.

In a third aspect, the present invention provides a use of an antibody or antigen-binding fragment which is capable of binding specifically to colony stimulating factor-1 receptor (CSF-1R) for the manufacture of a medicament for the treatment of tenosynovial giant cell tumour (TGCT) in a subject, according to a treatment regimen;
wherein the treatment regimen comprises up to five treatment cycles; and,
wherein a treatment cycle comprises one administration of about 200 mg to about 1,500 mg of the antibody or antigen-binding fragment, followed by an about 6-day to an about a 20-day period of rest.

As described further herein, the short-term treatment regime of the invention with up to five treatment cycles was surprisingly efficacious for the treatment of TGCT with a very acceptable safety profile CSF-1R (also referred to as M-CSF receptor; Macrophage colony-stimulating factor 1 receptor, Fms proto-oncogene, c-fms) is the receptor for colony stimulating factor 1 (CSF-1) (also referred to as macrophage colony-stimulating factor (M-CSF)) and mediates the biological effects of this cytokine (Sherr, C. J., et al., Cell 41 (1985) 665-676). The cloning of the colony stimulating factor-1 receptor (CSF-1R) (also called c-fms) was described for the first time in Roussel, M. F., et al., Nature 325 (1987) 549-552.

The biologically active homodimer CSF-1 binds to the CSF-1R within the subdomains D1 to D3 of the extracellular domain of the CSF-1 receptor (CSF-1R-ECD). The CSF-1R-ECD comprises five immunoglobulin-like subdomains (designated D1 to D5). The subdomains D4 to D5 of the extracellular domain (CSF-1R-ECD) are not involved in the CSF-1 binding. (Wang et al. Molecular and Cellular Biology 13 (1993) 5348-5359). The subdomain D4 is involved in dimerization (Yeung et al., Molecular & Cellular Proteomics 2 (2003) 1143-1155; Pixley, F. J., et al., Trends Cell Biol 14 (2004) 628-638).

Further signaling is mediated by the p85 subunit of PI3K and Grb2 connecting to the PI3K/AKT and Ras/MAPK pathways, respectively. These two important signaling pathways can regulate proliferation, survival and apoptosis. Other signaling molecules that bind the phosphorylated intracellular domain of CSF-1R include STAT1, STAT3, PLCy, and Cbl (Bourette, R. P. and Rohrschneider, L. R., Growth Factors 17 (2000) 155-166).

In TGCT, colony stimulating factor 1 receptor (CSF-1) overexpression leads to the accumulation of monocytes and macrophages expressing CSF-1R (West R B, et al. A landscape effect in tenosynovial giant-cell tumor from activation of CSF1 expression by a translocation in a minority of tumor cells. Proc Natl Acad Sci USA 2006; 3:690-5), a class III receptor tyrosine kinases that regulates the survival, proliferation, and differentiation of monocytes and macrophages (Xiong Y, et al. A CSF-1 receptor phosphotyrosine 559 signaling pathway regulates receptor ubiquitination and tyrosine phosphorylation. J Biol Chem 2011; 286:952-60). Accordingly, CSF-1R is a useful drug target for the treatment of TGCT.

The following is the amino acid sequence of CSF-1R (SEQ ID NO: 1):

```
Met Gly Pro Gly Val Leu Leu Leu Leu Val Ala Thr Ala Trp His
1               5                   10                  15

Gly Gln Gly Ile Pro Val Ile Glu Pro Ser Val Pro Glu Leu Val Val
            20                  25                  30

Lys Pro Gly Ala Thr Val Thr Leu Arg Cys Val Gly Asn Gly Ser Val
            35                  40                  45

Glu Trp Asp Gly Pro Pro Ser Pro His Trp Thr Leu Tyr Ser Asp Gly
        50                  55                  60

Ser Ser Ser Ile Leu Ser Thr Asn Asn Ala Thr Phe Gln Asn Thr Gly
65                  70                  75                  80

Thr Tyr Arg Cys Thr Glu Pro Gly Asp Pro Leu Gly Gly Ser Ala Ala
                85                  90                  95

Ile His Leu Tyr Val Lys Asp Pro Ala Arg Pro Trp Asn Val Leu Ala
                100                 105                 110

Gln Glu Val Val Val Phe Glu Asp Gln Asp Ala Leu Leu Pro Cys Leu
            115                 120                 125

Leu Thr Asp Pro Val Leu Glu Ala Gly Val Ser Leu Val Arg Val Arg
        130                 135                 140

Gly Arg Pro Leu Met Arg His Thr Asn Tyr Ser Phe Ser Pro Trp His
145                 150                 155                 160

Gly Phe Thr Ile His Arg Ala Lys Phe Ile Gln Ser Gln Asp Tyr Gln
                165                 170                 175

Cys Ser Ala Leu Met Gly Gly Arg Lys Val Met Ser Ile Ser Ile Arg
                180                 185                 190
```

-continued

```
Leu Lys Val Gln Lys Val Ile Pro Gly Pro Ala Leu Thr Leu Val
    195                 200                 205

Pro Ala Glu Leu Val Arg Ile Arg Gly Glu Ala Ala Gln Ile Val Cys
210                 215                 220

Ser Ala Ser Ser Val Asp Val Asn Phe Asp Val Phe Leu Gln His Asn
225                 230                 235                 240

Asn Thr Lys Leu Ala Ile Pro Gln Gln Ser Asp Phe His Asn Asn Arg
                245                 250                 255

Tyr Gln Lys Val Leu Thr Leu Asn Leu Asp Gln Val Asp Phe Gln His
                260                 265                 270

Ala Gly Asn Tyr Ser Cys Val Ala Ser Asn Val Gln Gly Lys His Ser
                275                 280                 285

Thr Ser Met Phe Phe Arg Val Val Glu Ser Ala Tyr Leu Asn Leu Ser
    290                 295                 300

Ser Glu Gln Asn Leu Ile Gln Glu Val Thr Val Gly Glu Gly Leu Asn
305                 310                 315                 320

Leu Lys Val Met Val Glu Ala Tyr Pro Gly Leu Gln Gly Phe Asn Trp
                325                 330                 335

Thr Tyr Leu Gly Pro Phe Ser Asp His Gln Pro Glu Pro Lys Leu Ala
                340                 345                 350

Asn Ala Thr Thr Lys Asp Thr Tyr Arg His Thr Phe Thr Leu Ser Leu
                355                 360                 365

Pro Arg Leu Lys Pro Ser Glu Ala Gly Arg Tyr Ser Phe Leu Ala Arg
    370                 375                 380

Asn Pro Gly Gly Trp Arg Ala Leu Thr Phe Glu Leu Thr Leu Arg Tyr
385                 390                 395                 400

Pro Pro Glu Val Ser Val Ile Trp Thr Phe Ile Asn Gly Ser Gly Thr
                405                 410                 415

Leu Leu Cys Ala Ala Ser Gly Tyr Pro Gln Pro Asn Val Thr Trp Leu
                420                 425                 430

Gln Cys Ser Gly His Thr Asp Arg Cys Asp Glu Ala Gln Val Leu Gln
    435                 440                 445

Val Trp Asp Asp Pro Tyr Pro Glu Val Leu Ser Gln Glu Pro Phe His
    450                 455                 460

Lys Val Thr Val Gln Ser Leu Leu Thr Val Glu Thr Leu Glu His Asn
465                 470                 475                 480

Gln Thr Tyr Glu Cys Arg Ala His Asn Ser Val Gly Ser Gly Ser Trp
                485                 490                 495

Ala Phe Ile Pro Ile Ser Ala Gly Ala His Thr His Pro Pro Asp Glu
                500                 505                 510

Phe Leu Phe Thr Pro Val Val Ala Cys Met Ser Ile Met Ala Leu
                515                 520                 525

Leu Leu Leu Leu Leu Leu Leu Leu Tyr Lys Tyr Lys Gln Lys Pro
    530                 535                 540

Lys Tyr Gln Val Arg Trp Lys Ile Ile Glu Ser Tyr Glu Gly Asn Ser
545                 550                 555                 560

Tyr Thr Phe Ile Asp Pro Thr Gln Leu Pro Tyr Asn Glu Lys Trp Glu
                565                 570                 575

Phe Pro Arg Asn Asn Leu Gln Phe Gly Lys Thr Leu Gly Ala Gly Ala
                580                 585                 590

Phe Gly Lys Val Val Glu Ala Thr Ala Phe Gly Leu Gly Lys Glu Asp
    595                 600                 605

Ala Val Leu Lys Val Ala Val Lys Met Leu Lys Ser Thr Ala His Ala
    610                 615                 620
```

-continued

```
Asp Glu Lys Glu Ala Leu Met Ser Glu Leu Lys Ile Met Ser His Leu
625                 630                 635                 640
Gly Gln His Glu Asn Ile Val Asn Leu Leu Gly Ala Cys Thr His Gly
                645                 650                 655
Gly Pro Val Leu Val Ile Thr Glu Tyr Cys Cys Tyr Gly Asp Leu Leu
            660                 665                 670
Asn Phe Leu Arg Arg Lys Ala Glu Ala Met Leu Gly Pro Ser Leu Ser
        675                 680                 685
Pro Gly Gln Asp Pro Glu Gly Gly Val Asp Tyr Lys Asn Ile His Leu
    690                 695                 700
Glu Lys Lys Tyr Val Arg Arg Asp Ser Gly Phe Ser Ser Gln Gly Val
705                 710                 715                 720
Asp Thr Tyr Val Glu Met Arg Pro Val Ser Thr Ser Ser Asn Asp Ser
                725                 730                 735
Phe Ser Glu Gln Asp Leu Asp Lys Glu Asp Gly Arg Pro Leu Glu Leu
                740                 745                 750
Arg Asp Leu Leu His Phe Ser Ser Gln Val Ala Gln Gly Met Ala Phe
            755                 760                 765
Leu Ala Ser Lys Asn Cys Ile His Arg Asp Val Ala Ala Arg Asn Val
770                 775                 780
Leu Leu Thr Asn Gly His Val Ala Lys Ile Gly Asp Phe Gly Leu Ala
785                 790                 795                 800
Arg Asp Ile Met Asn Asp Ser Asn Tyr Ile Val Lys Gly Asn Ala Arg
                805                 810                 815
Leu Pro Val Lys Trp Met Ala Pro Glu Ser Ile Phe Asp Cys Val Tyr
            820                 825                 830
Thr Val Gln Ser Asp Val Trp Ser Tyr Gly Ile Leu Leu Trp Glu Ile
        835                 840                 845
Phe Ser Leu Gly Leu Asn Pro Tyr Pro Gly Ile Leu Val Asn Ser Lys
    850                 855                 860
Phe Tyr Lys Leu Val Lys Asp Gly Tyr Gln Met Ala Gln Pro Ala Phe
865                 870                 875                 880
Ala Pro Lys Asn Ile Tyr Ser Ile Met Gln Ala Cys Trp Ala Leu Glu
                885                 890                 895
Pro Thr His Arg Pro Thr Phe Gln Gln Ile Cys Ser Phe Leu Gln Glu
            900                 905                 910
Gln Ala Gln Glu Asp Arg Arg Glu Arg Asp Tyr Thr Asn Leu Pro Ser
        915                 920                 925
Ser Ser Arg Ser Gly Gly Ser Gly Ser Ser Ser Ser Glu Leu Glu Glu
    930                 935                 940
Glu Ser Ser Ser Glu His Leu Thr Cys Cys Glu Gln Gly Asp Ile Ala
945                 950                 955                 960
Gln Pro Leu Leu Gln Pro Asn Asn Tyr Gln Phe Cys
                965                 970
```

Preferably, CSF-1R is human CSF-1R.

BRIEF DESCRIPTION OF FIGURES

Preferred, non-limiting examples which embody certain aspects of the invention will now be described, with reference to the following figures:

(FIG. 9A) based on central read of MRI scans assessed by RECIST criteria (FIG. 9B) based on of FDG-PET scans assessed by EORTC criteria at Cycle 2 Day 7. dTGCT, diffuse-type tenosynovial giant-cell tumour; EORTC, European Organisation for Research and Treatment of Cancer; FDG-PET, ($^{18}$F)-fluorodeoxyglucose positron emission tomography; MRI, magnetic resonance imaging; RECIST, Response Evaluation Criteria in Solid Tumors. Please note: for eight patients (13%) no FDG-PET results were available.

(FIG. 11A) The box plot of the overall health status score by visit of EQ-5D-3L. Please note: central line Z median; boxes Z 25th to 75th percentiles; whiskers Z range of observations which are not outliers (within 1.5 times the inter-quartile range from the 25th and 75th percentile); point outside Z outliers. (FIG. 11B) differences compared with cycle 1 day 1 predose for EQ-5D-3L. Estimates with standard error and respective p-value are shown. Asterisks indicate the level of statistical significance. (FIG. 11C) The box plot of the WOMAC score at baseline and for timepoints on treatment. Estimates with standard error and respective p-value are shown. Asterisks indicate the level of statistical significance. WOMAC, Western Ontario and McMaster Universities Osteoarthritis Index. Please note: central line Z median; boxes Z 25th to 75th percentiles; whiskers Z range of observations which are not outliers (within 1.5 times the interquartile range from the 25th and 75th percentile); point outside Z outliers.

DETAILED DESCRIPTION

Figure 1:
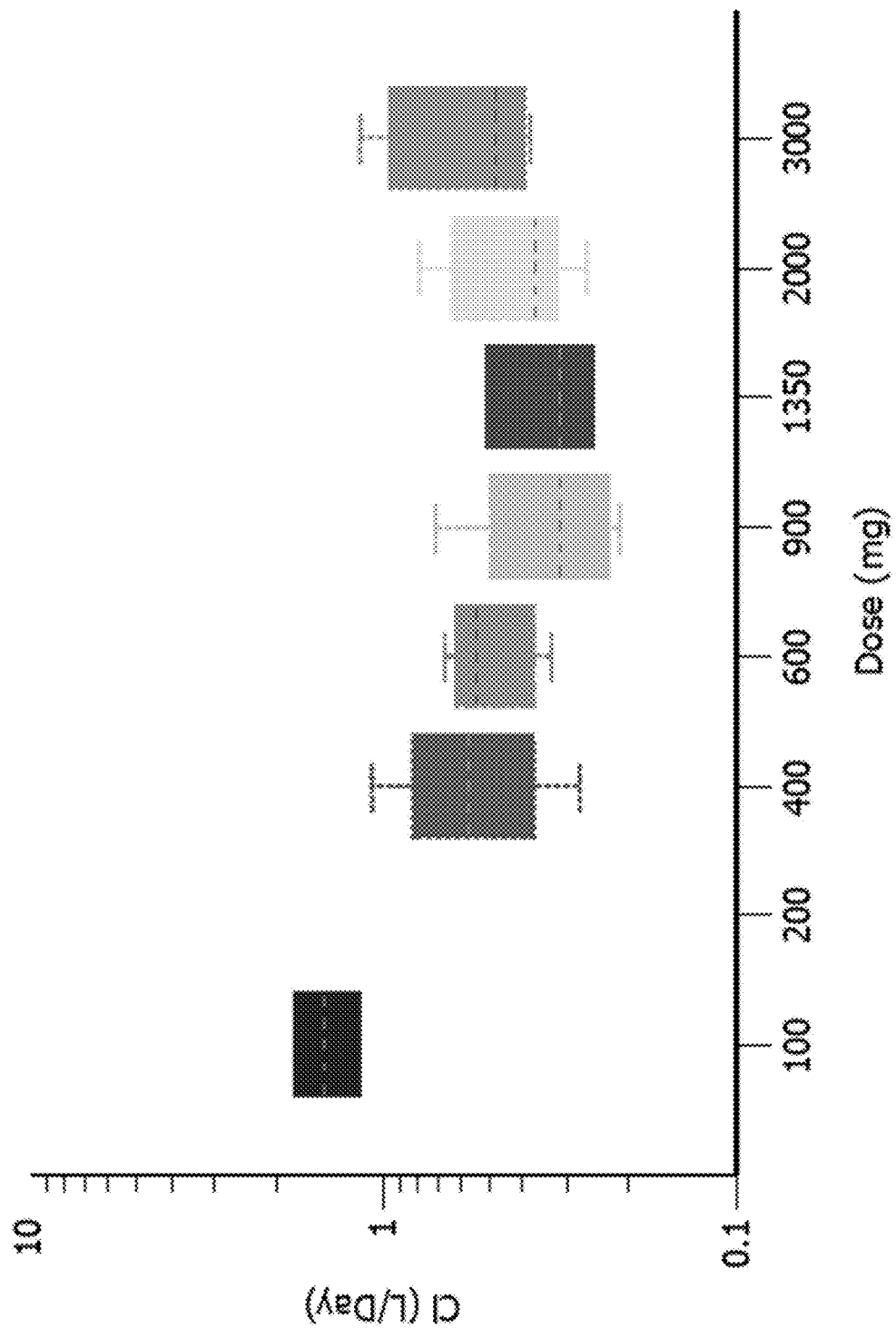
FIG. 1: Total Clearance of Emactuzumab on Cycle 1 Emactuzumab Monotherapy (Source: Investigator's Brochure Emactuzumab—F. Hoffmann-La Roche Ltd).

As described herein, TGCTs are rare, benign tumors, arising in synovial lining of joints, tendon sheaths, or bursae. The knee is most frequently (66-80%) affected, followed by the hip, ankle, elbow, and shoulder (Murphey M D, et al. Pigmented villonodular synovitis: Radiologic-pathologic correlation. Radiographics. 2008; 28(5):1493-1518). The most commonly reported and debilitating symptoms are pain, swelling, stiffness, and limited range of motion of the affected joints (Bernthal N M, et al. The diffuse-type tenosynovial giant cell tumor (dt-TGCT) patient journey: A prospective multicenter study. Orphanet J Rare Dis. 2021; 16(1):191 and Riedel R F, et al. (Cancer Care). Improving Resources and Support for Patients with Tenosynovial Giant Cell Tumor. White Paper. Website: media.cancercare.org/publications/original/431-2021_TGCT.pdf).

The M2-like subtype of tumour associated macrophages (TAMs) is implicated in promoting tumourigenesis and suppressing tumour immunity. Tumours are able to recruit and polarise macrophages into the M2-like subtype by secreting various cytokines such as CSF-1 and interleukin 10 (IL-10). CSF-1 is linked to neoplasia and poor prognosis. The CSF-1 receptor (CSF-1R) tyrosine kinase, responsible for mediating the cellular effects of CSF-1, is therefore an attractive target to selectively inhibit TAMs of the M2-like subtype.

The diagnosis of TGCT would be known to one skilled in medicine.

TGCTs are broadly divided into localised (lTGCT) and diffuse (dTGCT) types. The lTGCT include giant cell tumours of tendon sheath and pigmented villonodular synovitis and are generally indolent. dTGCT encompass conventional pigmented villonodular synovitis and diffuse-type giant cell tumour and are locally aggressive, invading extra-articular tissue and often recur post-surgery, estimated in at least 50% of cases.

Accordingly, in one embodiment, the TGCT is selected from the list consisting of: localised TGCT; giant cell tumor of the tendon sheath; diffuse TGCT; and/or pigmented villonodular synovitis (PVNS).

In one embodiment, the subject is one in which there are limited or no other options for treating TGCT and/or no effective standard of care. In a further related embodiment, for such a subject the treatment regime is effective in treating TGCT when other treatments have not been.

By "treatment" the inventors include both therapeutic and prophylactic treatment of the subject.

The term "therapeutic treatment" would be understood by those skilled in medicine. The term "treatment" as used herein may include any treatment of TGCT in the subject, particularly a human or other mammal, and optionally includes one or more of the following effects:
(i) inhibiting TGCT, i.e., slowing, reducing or arresting the development of the condition;
(ii) relieving the TGCT, i.e., causing regression of TGCT in the subject having that condition; and/or
(iii) curing TGCT, i.e. returning a subject having TGCT to a state of health in which that condition is no longer detectable.

The term "prophylactic treatment" would be understood by those skilled in medicine. The term "prophylaxis" as used herein may include any prophylactic treatment of TGCT in the subject, particularly a human or other mammal, and optionally includes one or more of the following effects:
(iv) preventing TGCT from occurring in the subject (for example, a subject which may be predisposed to, or at risk of, developing TGCT, but has not yet been diagnosed as having it) i.e. stopping the subject from developing the condition;
(v) delaying the onset of TGCT in the subject, i.e. delaying the subject from developing that condition until later in the life of the subject;
(vi) limiting the occurrence of TGCT in the subject, for example reducing the extent to which the subject is affected by that condition; and/or
(vii) preventing one or more symptoms of TGCT in the subject, i.e. stopping the subject from developing one or more symptoms of that condition.

In a preferred embodiment, the treatment is a therapeutic treatment.

By "treatment cycle" the inventors include a course of one or more treatments or treatment periods that is repeated on a regular schedule and, in the present invention, encompasses a period of rest. For example, a treatment given one day followed by 13 days of rest is 1 treatment cycle of 14 days (i.e. two weeks). The treatment cycle may be repeated, either identically or in an amended form, e.g., with a different dose or schedule, or with different additional treatments. However, in a preferred embodiment, each treatment cycle is the same.

Accordingly, to put it another way, by a treatment cycle comprising one administration of the antibody or antigen-binding fragment followed by an about 6-day period of rest, the inventors include a treatment cycle comprising one administration of the antibody or antigen-binding fragment per week (i.e. weekly). Additionally, to put it another way, by a treatment cycle comprising one administration of the antibody or antigen-binding fragment followed by an about a 20-day period of rest, the inventors include a treatment cycle comprising one administration of the antibody or antigen-binding fragment per three weeks (i.e. triweekly).

By a "period of rest", the inventors include a period of time (for example, a day) on which the antibody or antigen-binding fragment is not administered to the subject.

An "overall treatment time" means the time period comprising all treatment cycles. Accordingly, in present invention, an example of an overall treatment time is the period over which the up to five treatment cycles are administered. This could also be understood as the time it takes to complete the treatment regimen.

In one embodiment, the antibody or antigen-binding fragment is capable of binding specifically to domain 4 of CSF-1R. In a particular embodiment, the antibody or antigen-binding fragment is not capable of binding specifically to the CSF-1R fragment delD4.

The following is the amino acid sequence the CSF-1R fragment delD4 (SEQ ID NO: 2):

```
Ile Pro Val Ile Glu Pro Ser Val Pro Glu Leu Val Val Lys Pro Gly
1               5                   10                  15

Ala Thr Val Thr Leu Arg Cys Val Gly Asn Gly Ser Val Glu Trp Asp
                20                  25                  30

Gly Pro Pro Ser Pro His Trp Thr Leu Tyr Ser Asp Gly Ser Ser Ser
            35                  40                  45

Ile Leu Ser Thr Asn Asn Ala Thr Phe Gln Asn Thr Gly Thr Tyr Arg
    50                  55                  60

Cys Thr Glu Pro Gly Asp Pro Leu Gly Gly Ser Ala Ala Ile His Leu
65                  70                  75                  80

Tyr Val Lys Asp Pro Ala Arg Pro Trp Asn Val Leu Ala Gln Glu Val
                85                  90                  95

Val Val Phe Glu Asp Gln Asp Ala Leu Leu Pro Cys Leu Leu Thr Asp
                100                 105                 110

Pro Val Leu Glu Ala Gly Val Ser Leu Val Arg Val Arg Gly Arg Pro
            115                 120                 125

Leu Met Arg His Thr Asn Tyr Ser Phe Ser Pro Trp His Gly Phe Thr
        130                 135                 140

Ile His Arg Ala Lys Phe Ile Gln Ser Gln Asp Tyr Gln Cys Ser Ala
145                 150                 155                 160

Leu Met Gly Gly Arg Lys Val Met Ser Ile Ser Ile Arg Leu Lys Val
                165                 170                 175

Gln Lys Val Ile Pro Gly Pro Pro Ala Leu Thr Leu Val Pro Ala Glu
            180                 185                 190

Leu Val Arg Ile Arg Gly Glu Ala Ala Gln Ile Val Cys Ser Ala Ser
        195                 200                 205

Ser Val Asp Val Asn Phe Asp Val Phe Leu Gln His Asn Asn Thr Lys
    210                 215                 220

Leu Ala Ile Pro Gln Gln Ser Asp Phe His Asn Asn Arg Tyr Gln Lys
225                 230                 235                 240

Val Leu Thr Leu Asn Leu Asp Gln Val Asp Phe Gln His Ala Gly Asn
                245                 250                 255

Tyr Ser Cys Val Ala Ser Asn Val Gln Gly Lys His Ser Thr Ser Met
            260                 265                 270

Phe Phe Arg Tyr Pro Pro Glu Val Ser Val Ile Trp Thr Phe Ile Asn
        275                 280                 285

Gly Ser Gly Thr Leu Leu Cys Ala Ala Ser Gly Tyr Pro Gln Pro Asn
    290                 295                 300

Val Thr Trp Leu Gln Cys Ser Gly His Thr Asp Arg Cys Asp Glu Ala
305                 310                 315                 320
```

```
                    -continued
Gln Val Leu Gln Val Trp Asp Asp Pro Tyr Pro Glu Val Leu Ser Gln
                325                 330                 335

Glu Pro Phe His Lys Val Thr Val Gln Ser Leu Leu Thr Val Glu Thr
            340                 345                 350

Leu Glu His Asn Gln Thr Tyr Glu Cys Arg Ala His Asn Ser Val Gly
        355                 360                 365

Ser Gly Ser Trp Ala Phe Ile Pro Ile Ser Ala Gly Ala His Thr His
    370                 375                 380

Pro Pro Asp Glu
385
```

By "an antibody or antigen-binding fragment" the inventors include substantially intact antibody molecules, as well as chimeric antibodies, humanised antibodies, isolated human antibodies, single chain antibodies, bispecific antibodies, antibody heavy chains, antibody light chains, homodimers and heterodimers of antibody heavy and/or light chains, and antigen-binding fragments and derivatives of the same. Suitable antigen-binding fragments and derivatives include Fv fragments (e.g., single chain Fv and disulphide-bonded Fv), Fab-like fragments (e.g., Fab fragments, Fab' fragments and F(ab)2 fragments), single variable domains (e.g., VH and VL domains) and single domain antibodies (dAbs, including single and dual formats [i.e. dAb-linker-dAb], and nanobodies).

In one embodiment, the antigen-binding fragment is selected from the group consisting of: Fv fragments (such as a single chain Fv fragment, or a disulphide-bonded Fv fragment), Fab-like fragments (such as a Fab fragment; a Fab' fragment or a F(ab)2 fragment) and single domain antibodies.

The phrase "an antibody or an antigen-binding fragment thereof" is also intended to encompass antibody mimics (for example, non-antibody scaffold structures that have a high degree of stability yet allow variability to be introduced at certain positions). Those skilled in the art of biochemistry will be familiar with many such molecules, as discussed in Gebauer & Skerra, 2009 (the disclosures of which are incorporated herein by reference). Exemplary antibody mimics include: affibodies (also called Trinectins; Nygren, 2008, FEBS J, 275, 2668-2676); CTLDs (also called Tetranectins; Innovations Pharmac. Technol. (2006), 27-30); adnectins (also called monobodies; Meth. Mol. Biol., 352 (2007), 95-109); anticalins (Drug Discovery Today (2005), 10, 23-33); DARPins (ankyrins; Nat. Biotechnol. (2004), 22, 575-582); avimers (Nat. Biotechnol. (2005), 23, 1556-1561); microbodies (FEBS J, (2007), 274, 86-95); peptide aptamers (Expert. Opin. Biol. Ther. (2005), 5, 783-797); Kunitz domains (J. Pharmacol. Exp. Ther. (2006) 318, 803-809); affilins (Trends. Biotechnol. (2005), 23, 514-522); affimers (Avacta Life Sciences, Wetherby, UK).

Persons skilled in the art will further appreciate that the invention also encompasses modified versions of antibodies and antigen-binding fragments thereof, whether existing now or in the future, e.g., modified by the covalent attachment of polyethylene glycol or another suitable polymer.

Methods of generating antibodies and antibody fragments are well known in the art. For example, antibodies may be generated via any one of several methods which employ induction of in vivo production of antibody molecules, screening of immunoglobulin libraries (Orlandi. et al., 1989; Winter et al., 1991, the disclosures of which are incorporated herein by reference) or generation of monoclonal antibody molecules by cell lines in culture. These include, but are not limited to, the hybridoma technique, the human B cell hybridoma technique, and the Epstein-Barr virus (EBV)-hybridoma technique (Kohler et al., 1975, Kozbor et al., 1985; Cote et al., 1983; Cole et al., 1984., the disclosures of which are incorporated herein by reference).

Suitable methods for the production of monoclonal antibodies are also disclosed in "Monoclonal Antibodies: A manual of techniques", H Zola (CRC Press, 1988, the disclosures of which are incorporated herein by reference) and in "Monoclonal Hybridoma Antibodies: Techniques and Applications", J G R Hurrell (CRC Press, 1982, the disclosures of which are incorporated herein by reference).

Likewise, antibody fragments can be obtained using methods well known in the art (see, for example, Harlow & Lane, 1988, "Antibodies: A Laboratory Manual", Cold Spring Harbor Laboratory, New York, the disclosures of which are incorporated herein by reference). For example, antibody fragments according to the present invention can be prepared by proteolytic hydrolysis of the antibody or by expression in E. coli or mammalian cells (e.g., Chinese hamster ovary cell culture or other protein expression systems) of DNA encoding the fragment. Alternatively, antibody fragments can be obtained by pepsin or papain digestion of whole antibodies by conventional methods.

It will be appreciated by persons skilled in the art that for human therapy or diagnostics, human or humanised antibodies are preferably used. Humanised forms of non-human (e.g., murine) antibodies are genetically engineered chimaeric antibodies or antibody fragments having preferably minimal-portions derived from non-human antibodies. Humanised antibodies include antibodies in which complementary determining regions of a human antibody (recipient antibody) are replaced by residues from a complementary determining region of a non-human species (donor antibody) such as mouse, rat or rabbit having the desired functionality. In some instances, Fv framework residues of the human antibody are replaced by corresponding non-human residues. Humanised antibodies may also comprise residues which are found neither in the recipient antibody nor in the imported complementarity determining region or framework sequences. In general, the humanised antibody will comprise substantially all of at least one, and typically two, variable domains, in which all or substantially all of the complementarity determining regions correspond to those of a non-human antibody and all, or substantially all, of the framework regions correspond to those of a relevant human consensus sequence. Humanised antibodies optimally also include at least a portion of an antibody constant region, such as an Fc region, typically derived from a human antibody (see, for example, Jones et al., 1986, Riechmann et al., 1988, Presta, 1992, the disclosures of which are incorporated herein by reference).

Methods for humanising non-human antibodies are well known in the art. Generally, the humanised antibody has one or more amino acid residues introduced into it from a source which is non-human. These non-human amino acid residues, often referred to as imported residues, are typically taken from an imported variable domain. Humanisation can be essentially performed as described (see, for example, Jones et al., 1986, Reichmann et al., 1988, Verhoeyen et al., 1988, U.S. Pat. No. 4,816,567, the disclosures of which are incorporated herein by reference) by substituting human complementarity determining regions with corresponding rodent complementarity determining regions. Accordingly, such humanised antibodies are chimaeric antibodies, wherein substantially less than an intact human variable domain has been substituted by the corresponding sequence from a non-human species. In practice, humanised antibodies may be typically human antibodies in which some complementarity determining region residues and possibly some framework residues are substituted by residues from analogous sites in rodent antibodies.

Human antibodies can also be identified using various techniques known in the art, including phage display libraries (see, for example, Hoogenboom & Winter, 1991, Marks et al., 1991, Cole et al., 1985, Boerner et al., 1991, the disclosures of which are incorporated herein by reference).

By antibody or antigen-binding fragment which is "capable of binding specifically to CSF-1R", the inventors include that the antibody or antigen-binding fragment binds to CSF-1R, i.e. it binds to CSF-1R but does not bind, or binds at a lower affinity, to other molecules. The antibody or antigen-binding fragment may have some binding affinity for CSF-1R from other mammals, such as CSF-1R from a non-human primate (for example *Macaca fascicularis* (cynomolgus monkey) or *Macaca mulatta*). However, the antibody or antigen-binding fragment will have the greatest binding affinity with human CSF-1R.

Therefore, typically, the Kd for the binding domain with respect to human CSF-1R will be 2-fold, preferably 5-fold, more preferably 10-fold less than Kd with respect to the other, non-target molecules or any other unrelated material or accompanying material in the environment.

It will be appreciated by persons skilled in the art that the binding specificity of an antibody or antigen-binding fragment thereof is conferred by the presence of complementarity determining regions (CDRs) within the variable regions of the constituent heavy and light chains.

In a preferred embodiment, the antibody or antigen-binding fragment comprises one or more CDRs of the antibody Emactuzumab; for example, one CDR; two CDRs; three CDRs; four CDRs; five CDRs or six CDRs, preferably wherein the antibody or antigen-binding fragment comprises the six CDRs of the antibody Emactuzumab.

Emactuzumab is a humanised monoclonal antibody targeting CSF-1R, and is capable of binding to CSF-1R expressed on macrophages and inhibits the binding of CSF-1 to CSF1R. Emactuzumab might also be referred to as RО5509554 or RG7155. Emactuzumab is described in WO 2011/070024 as well as the WHO Drug Information, Vol. 28, No. 2, 2014 Proposed INN (which are both incorporated by reference in their entirety, in particular the relevant amino acid and nucleotide sequences), and is known elsewhere in the scientific literature.

The amino acid sequences of the heavy chain variable region CDRs of Emactuzumab are as follows:

```
CDR1:
                                           (SEQ ID NO: 3)
SYDIS

CDR2:
                                           (SEQ ID NO: 4)
VIWTDGGTNYAQKLQG

CDR3:
                                           (SEQ ID NO: 5)
DQRLYFDV
```

The amino acid sequences of the light chain variable region CDRs of Emactuzumab are as follows:

```
CDR1:
                                           (SEQ ID NO: 6)
RASEDVNTYVS

CDR2:
                                           (SEQ ID NO: 7)
AASNRYT

CDR3:
                                           (SEQ ID NO: 8)
QQSFSYPT
```

In a particular embodiment, the antibody or antigen-binding fragment comprises one or more CDRs of the light chain of the antibody Emactuzumab; for example, one CDR; two CDRs; or three CDRs of the light chain variable region of the antibody Emactuzumab, and/or one or more CDRs of the heavy chain variable region of the antibody Emactuzumab; for example, one CDR; two CDRs; or three CDRs of the heavy chain of the antibody Emactuzumab.

In one embodiment, the antibody or antigen-binding fragment comprises the light chain variable region and/or the heavy chain variable region of the antibody Emactuzumab, preferably the light chain variable region and the heavy chain variable region of the antibody Emactuzumab.

The amino acid sequence of the heavy chain variable region of Emactuzumab is as follows:

```
                                           (SEQ ID NO: 9)
QVQLVQSGAE VKKPGASVKV SCKASGYTFT SYDISWVRQA

PGQGLEWMGV IWTDGGTNYA QKLQGRVTMT TDTSTSTAYM

ELRSLRSDDT AVYYCARDQR LYFDVWGQGT TVTVSS
```

The amino acid sequence of the light chain variable region of Emactuzumab is as follows:

```
                                           (SEQ ID NO: 10)
DIQMTQSPSS LSASVGDRVT ITCRASEDVN TYVSWYQQKP

GKAPKLLIYA ASNRYTGVPS RFSGSGSGTD FTLTISSLQP

EDFATYYCQQ SFSYPTFGQG TKLEIK
```

In one embodiment, the antibody or antigen-binding fragment comprises the light chain and/or the heavy chain of the antibody Emactuzumab, preferably the light chain and the heavy chain of the antibody Emactuzumab.

The amino acid sequence of the heavy chain of Emactuzumab is as follows:

```
                                              (SEQ ID NO: 11)
QVQLVQSGAE VKKPGASVKV SCKASGYTFT SYDISWVRQA

PGQGLEWMGV IWTDGGTNYA QKLQGRVTMT TDTSTSTAYM

ELRSLRSDDT AVYYCARDQR LYFDVWGQGT TVTVSSASTK

GPSVFPLAPS SKSTSGGTAA LGCLVKDYFP EPVTVSWNSG

ALTSGVHTFP AVLQSSGLYS LSSVVTVPSS SLGTQTYICN

VNHKPSNTKV DKKVEPKSCD KTHTCPPCPA PELLGGPSVF

LFPPKPKDTL MISRTPEVTC VVVDVSHEDP EVKFNWYVDG

VEVHNAKTKP REEQYNSTYR VVSVLTVLHQ DWLNGKEYKC

KVSNKALPAP IEKTISKAKG QPREPQVYTL PPSRDELTKN

QVSLTCLVKG FYPSDIAVEW ESNGQPENNY KTTPPVLDSD

GSFFLYSKLT VDKSRWQQGN VFSCSVMHEA LHNHYTQKSL

SLSPGK
```

The amino acid sequence of the light chain of Emactuzumab is as follows:

```
                                              (SEQ ID NO: 12)
DIQMTQSPSS LSASVGDRVT ITCRASEDVN TYVSWYQQKP

GKAPKLLIYA ASNRYTGVPS RFSGSGSGTD FTLTISSLQP

EDFATYYCQQ SFSYPTFGQG TKLEIKRTVA APSVFIFPPS

DEQLKSGTAS VVCLLNNFYP REAKVQWKVD NALQSGNSQE

SVTEQDSKDS TYSLSSTLTL SKADYEKHKV YACEVTHQGL

SSPVTKSFNR GEC
```

It will be appreciated by persons skilled in the art that the antibody or antigen-binding fragment may comprise a human Fc region, or a variant of a said region, where the region is an IgG1, IgG2, IgG3 or IgG4 region, preferably an IgG1 or IgG4 region.

Engineering the Fc region of a therapeutic monoclonal antibody or Fc fusion protein allows the generation of molecules that are better suited to the pharmacology activity required of them (Strohl, 2009, the disclosures of which are incorporated herein by reference).

Derivatives and variants of the Emactuzumab amino acid sequences as described above may be prepared during synthesis of the polypeptide or by post-production modification, or when the polypeptide is in recombinant form using the known techniques of site-directed mutagenesis, random mutagenesis, or enzymatic cleavage and/or ligation of nucleic acids.

Preferably variants have an amino acid sequence which has more than 60%, or more than 70%, e.g., 75 or 80%, preferably more than 85%, e.g., more than 90 or 95% amino acid identity to a sequence as shown in the sequences disclosed herein. This level of amino acid identity may be seen across the full length of the relevant SEQ ID NO sequence or over a part of the sequence, such as across 20, 30, 50, 75, 100, 150, 200 or more amino acids, depending on the size of the full-length polypeptide. As will be appreciated, the antibody or antigen-binding fragment comprising derivatives and variants of the Emactuzumab amino acid sequences as described herein will retain a capacity to binding specifically to CSF-1R.

In connection with amino acid sequences, "sequence identity" refers to sequences which have the stated value when assessed using ClustalW (Thompson et al., 1994; the disclosures of which are incorporated herein by reference) with the following parameters:

Pairwise alignment parameters—Method: accurate, Matrix: PAM, Gap open penalty: 10.00, Gap extension penalty: 0.10; Multiple alignment parameters—Matrix: PAM, Gap open penalty: 10.00, % identity for delay: 30, Penalize end gaps: on, Gap separation distance: 0, Negative matrix: no, Gap extension penalty: 0.20, Residue-specific gap penalties: on, Hydrophilic gap penalties: on, Hydrophilic residues: GPSNDQEKR. Sequence identity at a particular residue is intended to include identical residues which have simply been derivatised.

In one embodiment, the antibody or antigen-binding fragment may comprise one or more variants of the above-defined light chain variable regions and/or said heavy chain variable regions having at least 90% sequence identity thereto. The antibody or antigen-binding fragment may also comprise variants of the CDR sequences specified herein, for example variants where up one, two, three, four or five amino acid residues are substituted, deleted to added compared to the specified reference sequences.

In one embodiment, the antibody or antigen-binding fragment is an antibody, preferably wherein the antibody is Emactuzumab. In an alternative embodiment, the antibody or antigen-binding fragment binds the same epitope as Emactuzumab. In a further alternative embodiment, the antibody or antigen-binding fragment competitively binds with Emactuzumab.

As described herein, the antibody Emactuzumab is particularly amenable to, and effective in, the treatment regime of the current invention.

The Disulfide bridges locations in Emactuzumab are as follows:
Intra-H (C23-C104) 22-95 143-199 260-320 366-424
22"-95" 143"-199" 260"-320" 366"-424"
Intra-L (C23-C104) 23'-88' 133'-193'
23'''-88''' 133'''-193'''
Inter-H-L (h 5-CL 126) 219-213' 219"-213"
Inter-H-H (h 11, h 14) 225-225" 228-228"

The N-glycosylation sites in Emactuzumab are as follows:
H CH2 N84.4:
296, 296

In one embodiment, the treatment regimen comprises one treatment cycle, two treatment cycles, three treatment cycles, four treatment cycles, or five treatment cycles, preferably the treatment regimen is five treatment cycles.

In one embodiment, the treatment cycle comprises an about 6-day, or 7-day, or 8-day, or 9-day, or 10-day, or 11-day, or 12-day, or 13-day, or 14-day, or 15-day, or 16-day, or 17-day, or 18-day, or 19 day, or 20 day period of rest, preferably the treatment cycle comprises an about 13-day period of rest.

To put it another way, by a treatment cycle comprising one administration of the antibody or antigen-binding fragment followed by an about 13-day period of rest, the inventors include a treatment cycle comprising one administration of the antibody or antigen-binding fragment per two weeks (i.e. biweekly). In the art, this can be referred to as "Q2W".

As described herein, the biweekly treatment cycle (i.e. one administration of the antibody or antigen-binding fragment followed by an about 13-day period of rest) is particularly effective in the treatment regime of the current invention.

In a particularly preferred embodiment, the treatment regimen comprises five treatment cycles; and a treatment cycle comprises one administration of about 200 mg to about 1,500 mg of the antibody or antigen-binding fragment, followed by an about a 13-day day period of rest. In this embodiment, the overall treatment time is ten weeks.

In a preferred embodiment, the administration is intravenous (IV) administration.

As would be known to one skilled in medicine, IV administration is administering a drug (such as the antibody or antigen-binding fragment of the current invention) into the vein of a subject, often through a needle or a tube inserted into the vein.

In a particularly preferred embodiment, the IV administration is an IV infusion.

As would be known to one skilled in medicine, an IV infusion is IV administration which occurs over a period of time, which allows for a particularly controlled administration of a drug (such as the antibody or antigen-binding fragment of the current invention). The IV infusion can be mediated in a number of ways, such as via a drip (i.e. an infusion bag) or via a pump, for example connected to an IV catheter.

In one embodiment, the IV infusion is via an infusion bag.

As described herein, an IV infusion is particularly effective in the treatment regime of the current invention.

In one embodiment, the IV infusion is administered over a period of about 30 minutes to about 360 minutes; for example, about 30 minutes; about 60 minutes; about 90 minutes; about 120 minutes; about 150 minutes; about 180 minutes; about 210 minutes; about 240 minutes; about 270 minutes; about 300 minutes; about 330 minutes; or about 360 minutes. In a particularly preferred embodiment, the IV infusion is administered over a period of about 90 minutes.

As described herein, an IV infusion administered over a period of about 90 minutes is particularly effective in the treatment regime of the current invention.

In a preferred embodiment, the treatment of a monotherapy.

By "monotherapy", the inventors include that the subject is not also administered with a drug that is not the antibody or antigen-binding fragment for the treatment of TGCT, during the treatment regime. By "monotherapy", the inventors do not exclude that the subject is administered with drugs for the treatment of other conditions that are not TGCT.

In a preferred embodiment, the administration of the antibody or antigen-binding fragment leads to about 100% CSF-1R saturation.

In one embodiment, the treatment cycle comprises one administration of about 200 mg, or about 300 mg, or about 400 mg, or about 500 mg, or about 600 mg, or about 700 mg, or about 800 mg, or about 900 mg, or about 1,000 mg, or about 1,100 mg, or about 1,200 mg, or about 1,300 mg, or about 1,400 mg, or about 1,500 mg of the antibody or antigen-binding fragment. As will be appreciated by the skilled person, this relates to the "dose" of the antibody or antigen-binding fragment. As described herein, preferably the dose of the antibody or antigen-binding fragment is not altered between treatment cycles in the treatment regime.

In a particularly preferred embodiment, the treatment cycle comprises one administration of about 500 mg of the antibody or antigen-binding fragment.

In an alternative particularly preferred embodiment, the treatment cycle comprises one administration of about 1000 mg of the antibody or antigen-binding fragment.

As will be appreciated by one skilled in medicine, it is sometimes necessary to alter the dose of a drug based on the weight of the subject, with lower doses being administered to subjects with lower body weight. This can be for a number of reasons, with safety and efficacy often, but not always, being relevant.

In a preferred embodiment, the subject has a body weight of about <40 kg and the treatment cycle comprises one administration of about 500 mg of the antibody or antigen-binding fragment.

In another preferred embodiment, the subject has a body weight of about ≥40 kg and the treatment cycle comprises one administration of about 1000 mg of the antibody or antigen-binding fragment.

In a particularly preferred embodiment, for a subject with a body weight of about ≤40 kg, the treatment cycle comprises one administration of about 500 mg of the antibody or antigen-binding fragment; and for a subject with a body weight of about ≥40 kg, the treatment cycle comprises one administration of about 1000 mg of the antibody or antigen-binding fragment.

As will be appreciated, a dose of the antibody or antigen-binding fragment can also be expressed as mg per kg of subject weight. Accordingly, in a preferred embodiment the treatment cycle comprises one administration of about 12.5 mg/kg of the antibody or antigen-binding fragment. As will be appreciated by one skilled in medicine, an administration of about 12.5 mg/kg of the antibody or antigen-binding fragment of corresponds to a subject weighing 40 kg being administered with 500 mg of the antibody or antigen-binding fragment. It would be understood by one skilled in medicine how to convert the "one administration of about 200 mg to about 1,500 mg of the antibody or antigen-binding fragment" as described in the first to third aspects of the invention to be expressed as mg/kg.

In one embodiment, the treatment regime is not repeated for at least about six months; for example: at least about one year; at least about 18 months; at least about two years; at least about 30 months; and/or at least about three years. In a preferred embodiment, the treatment regime is not repeated for at least about six months. In one embodiment, the date from which the treatment regime not being repeated is calculated is the date of the last administration. In an alternative embodiment, the date from which the date from which the treatment regime not being repeated is calculated is the date of the end of the overall treatment time.

In one embodiment, prior to the treatment regime being started the subject is identified as having adequate organ and bone marrow function; for example: haemoglobin (hb) >10.0 g/dL; and/or neutrophils >1.5×109/L; and/or platelets >100 ×109/L.

In one embodiment, prior to the treatment regime being started the subject has a TGCT lesion(s) with a longest diameter of ≥10 mm, preferably ≥20 mm.

In one embodiment, as the treatment regime progresses (for example, after one or more treatment cycle) the subject exhibits a reduction in the longest diameter of a TGCT lesion(s), preferably with no TGCT lesions being detectable following the treatment regime. As will be appreciated by one skilled in medicine, it is straightforward to take measurements of TGCT lesions, such as by Magnetic Resonance Imaging (MRI).

In one embodiment, as the treatment regime progresses (for example, after one or more treatment cycle) the subject exhibits a reduction in TGCT tumour volume, preferably with no TGCT tumours being detectable following the treatment regime. As will be appreciated by one skilled in medicine, it is straightforward to measure the volume of TGCT tumours, such as by Magnetic Resonance Imaging (MRI).

In one embodiment, as the treatment regime progresses (for example, after one or more treatment cycle) the subject exhibits a reduction in Worst Pain Numerical Rating Score (NRS). As discussed in the Examples, NRS is a scale of 0 (no pain) to 10 (pain as bad as you can imagine). In a preferred embodiment, the subject has a NRS of 4 or less (such as 3 or less, or 2 or less, or 1 or less, or 0) following the treatment regime.

In one embodiment, as the treatment regime progresses (for example, after one or more treatment cycle) the subject provides more positive feedback regarding the subject's health via a Healthcare Professional (HCP)-Reported Joint Mobility Score. Healthcare Professional (HCP)-Reported Joint Mobility Scores are described in the Examples.

In one embodiment, as the treatment regime progresses (for example, after one or more treatment cycle) the subject exhibits a reduction in Worst Stiffness NRS. As discussed in the Examples, Worst Stiffness NRS is a scale of 0 (no stiffness) to 10 (stiffness as bad as you can imagine). In a preferred embodiment, the subject has a Worst Stiffness NRS of 4 or less (such as 3 or less, or 2 or less, or 1 or less, or 0) following the treatment regime.

In one embodiment, as the treatment regime progresses (for example, after one or more treatment cycle) the subject provides more positive feedback regarding the subject's health via a Short Form 12-Item Survey. Short Form 12-Item Surveys are described in the Examples.

In one embodiment, as the treatment regime progresses (for example, after one or more treatment cycle) the subject provides more positive feedback regarding the subject's health via a EuroQoL 5-Dimension 5-Level Questionnaire. EuroQoL 5-Dimension 5-Level Questionnaires are described in the Examples.

In one embodiment, the subject cannot be characterised by one or more of the following:
1. is pregnant and/or breast feeding;
2. has a pre-existing auto-immune condition requiring systemic treatment (such as lupus erythematosus);
3. has a medical condition requiring systemic immunosuppression;
4. has current and/or chronic history of liver disease (
5. has the following renal function: Serum creatinine >1.5× upper limit of normal (ULN); or creatinine clearance <60 mL/min (Cockcroft-Gault formula);
6. within six months has experienced: clinically significant myocardial infarction; severe/unstable angina pectoris; congestive heart failure; and/or Class III or IV, or pulmonary disease;
7. has a significant active infection requiring systemic antibiotic treatment;
8. has had systemic antiretroviral therapy within three months; and/or
9. has a history of malignancy other than TGCT, unless there is the expectation that the malignancy has been cured, and tumour specific treatment for the malignancy has not been administered within the previous 5 years.

In one embodiment, the subject does not exhibit any, or at least a low number of, severe adverse reactions, at any point in the treatment regime. In a preferred embodiment, the subject exhibits less adverse reactions (in particular, less severe adverse reactions) when compared to the average response in the BP27772 study, described above.

In one embodiment, the subject does not exhibit one or more reaction, or exhibits only a mild reaction or moderate reaction, selected from the list consisting of:
 pruritis;
 skin rash;
 asthenia;
 face edema; and/or
 periorbital edema (also referred to as a periorbital oedema).

In one embodiment, the subject exhibits one or more response to the treatment regime, selected from the list consisting of:
 a complete response, including an absence of a tumour;
 a partial response, including a reduction in the size of a tumour (as discussed further herein);
 a positive objective response rate (ORR); and/or
 a long duration of response—such as, a response of at least six months—for example: at least one year; at least 18 months; at least 2 years; at least 30 months; or at least 3 years.

As will be appreciated by the person skilled in medicine, ORR is the assessment of the tumor burden after a given treatment.

By "a mild reaction" or "a moderate reaction", the inventors include a reaction that does not necessitate the treatment regime being stopped. This is discussed further in the Examples.

The reactions of pruritis, asthenia, a face edema, and periorbital edema would be known to one skilled in medicine.

In one embodiment, the antibody or antigen-binding fragment is in a pharmaceutical composition. As will be appreciated, a pharmaceutical composition might be referred to as a formulation or a pharmaceutical formulation.

In one embodiment, the pharmaceutical composition further comprises a pharmaceutically acceptable diluent and/or carrier.

By "pharmaceutically acceptable carrier" the inventors include any and all solvents, dispersion media, coatings, surfactants, antioxidants, preservatives (e.g., antibacterial agents, antifungal agents), isotonic agents, salts, preservatives, drugs, drug stabilizers, excipients, disintegration agents, such like materials and combinations thereof, as would be known to one of ordinary skill in the art. Except insofar as any conventional carrier is incompatible with the active ingredient, its use in the therapeutic or pharmaceutical compositions is contemplated.

In a preferred embodiment, the pharmaceutical composition is for IV administration, preferably IV infusion.

In one embodiment, the antibody or antigen-binding fragment is in a solution, wherein the infusion volume is 100 ml to 500 ml, preferably 250 ml.

In a preferred embodiment, the pharmaceutical composition is a solution, preferably the solution comprises one or more excipients, optionally wherein the excipients are one or more excipient selected from the list consisting of: histidine; trehalose dihydrate; polysorbate 20; and/or water.

In a particularly preferred embodiment, the pharmaceutical composition comprises a solution comprising a histidine; trehalose dihydrate; polysorbate 20; and water. In one embodiment, the pharmaceutical composition is diluted with a sodium chloride solution, preferably 0.9 w/v sodium chloride.

Further examples of excipients may be one or more of carbohydrates, polymers, lipids and minerals. Examples of carbohydrates include lactose, glucose, sucrose, mannitol, and cyclodextrines, which are added to the composition, e.g., for facilitating lyophilisation. Examples of polymers are starch, cellulose ethers, cellulose carboxymethylcellulose, hydroxypropylmethyl cellulose, hydroxyethyl cellulose, ethylhydroxyethyl cellulose, alginates, carageenans, hyaluronic acid and derivatives thereof, polyacrylic acid, polysulphonate, polyethyleneglycol/polyethylene oxide, polyethyleneoxide/polypropylene oxide copolymers, polyvinylalcohol/polyvinylacetate of different degree of hydrolysis, and polyvinylpyrrolidone, all of different molecular weight, which are added to the composition, e.g., for viscosity control, for achieving bioadhesion, or for protecting the lipid from chemical and proteolytic degradation. Examples of lipids are fatty acids, phospholipids, mono-, di-, and triglycerides, ceramides, sphingolipids and glycolipids, all of different acyl chain length and saturation, egg lecithin, soy lecithin, hydrogenated egg and soy lecithin, which are added to the composition for reasons similar to those for polymers. Examples of minerals are talc, magnesium oxide, zinc oxide and titanium oxide, which are added to the composition to obtain benefits such as reduction of liquid accumulation or advantageous pigment properties.

In one embodiment, the pharmaceutical composition has a pH range of about pH 3 to about pH 9; preferably a pH range of about pH 4.5 to about pH 6, most preferably a pH of about pH 6±0.5.

Pharmaceutical compositions for the antibody or antigen-binding fragment of the invention are known in the art, such as those described in WO 2020/053321 (which is incorporated by reference in its entirety, in particular the details on the formulations disclosed therein).

In one embodiment, the pharmaceutical composition comprises:
the antibody or antigen-binding fragment;
a surfactant (such as polysorbate, in particular polysorbate 20);
a buffering agent (such as histidine buffer, in particular a histidine chloride buffer); and/or
at least one stabilizer (such as salts, saccharides and amino acids; preferably, a saccharide; most preferably, sucrose), preferably two stabilizers (preferably wherein the first stabilizer sucrose and the second stabilizer is methionine).

In a preferred embodiment, the pharmaceutical composition comprises:
40 mg/ml to 200 mg/ml of the antibody or antigen-binding fragment;
0.01% to 0.1% (w/v) of a surfactant;
5 mM to 100 mM (preferably, 10 to 30 mM; in particular, 20 mM) of a buffering agent; and/or
10 mM to 500 mM (preferably, 40 to 250 mM; in particular, 210 to 230 mM) of at least one stabilizer; at a pH in the range from 4.5 to 7.0.

In a further preferred embodiment, the pharmaceutical composition comprises:
40 to 100 mg/ml of the antibody or antigen-binding fragment;
20 mM L-histidine;
0.03 to 0.05% (w/v) polysorbate 20;
210 to 230 mM sucrose; and/or
optionally 5 to 25 mM methionine;
at a pH of 6.0±0.5.

In an even further preferred embodiment, the pharmaceutical composition comprises:
50 mg/ml of the antibody or antigen-binding fragment;
20 mM L-histidine;
0.04% (w/v) polysorbate 20;
220 mM sucrose; and/or
10 mM methionine;
at a pH of 6.0±0.5.

In one embodiment (particularly of the second aspect of the invention), the antibody or antigen-binding fragment may be administered at what is considered to be a 'therapeutically effective amount', or 'effective amount', or 'therapeutically effective'. By a "therapeutically effective amount", or "effective amount", or "therapeutically effective", the inventors include that the amount which provides a therapeutic effect for a given condition and administration regimen.

Preferably the subject is a mammal. Preferably, the mammal is a human.

The use of the word "a" or "an" when used in conjunction with the term "comprising" in the claims and/or the specification may mean "one," but it is also consistent with the meaning of "one or more," "at least one," and "one or more than one."

These, and further, aspects of the present invention will be better appreciated and understood when considered in conjunction with the following description and the accompanying drawings. It should be understood, however, that the following description, while indicating various aspects and embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

The listing or discussion of an apparently prior-published document in this specification should not necessarily be taken as an acknowledgement that the document is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention. For example, particular doses of the antibody or antigen-binding fragment described herein can be combined with any of the described treatment cycles.

The documents referenced herein are incorporated by reference in their entirety.

The following examples are included to further illustrate various aspects of the disclosure. It should be appreciated by those of skill in the art that the techniques disclosed in the examples which follow represent techniques and/or compositions discovered by the inventor to function well in the practice of the disclosure, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the disclosure.

EXAMPLES

Example 1

Background. Many clonal neoplastic tumours are driven by overexpression of macrophage colony stimulating factor (CSF-1). CSF-1 is a secreted cytokine/haematopoietic growth factor that plays an essential role in the proliferation, differentiation, and survival of monocytes, macrophages, and related cells. CSF-1 is linked to neoplasia and poor prognosis. The CSF-1 receptor (CSF-1R) tyrosine kinase, responsible for mediating the cellular effects of CSF-1, is therefore an attractive target to selectively inhibit special subtypes of tumour associated macrophages.

Emactuzumab is a recombinant, humanized monoclonal antibody of the immunoglobulin G (IgG) 1 (IgG1) subclass directed against CSF-1R. It binds to CSF-1R with a dissociation constant of 0.3 nM, is selective for the receptor dimerization interface and inhibits the viability of cell lines overexpressing CSF-1R exogenously or endogenously.

Emactuzumab monotherapy and emactuzumab in combination with paclitaxel, azetolizumab or selicrelumab were investigated in several Phase I/II open-label studies in patients (PK profiles, n=258 [100-3000 mg]; n=177 [1000 mg] dose) with advanced solid cancers and tenosynovial giant cell tumour (TGCT) (F. Hoffmann-La Roche Ltd, Investigator's Brochure (R05509554) Emactuzumab, Version 12, March 2021; Cassier P A, Italiano A, Gomez-Roca C A, Le Tourneau C, Toulmonde M, Cannarile M A, et al. CSF1R inhibition with emactuzumab in locally advanced diffuse-type tenosynovial giant cell tumours of the soft tissue: a dose-escalation and dose-expansion phase 1 study. Lancet Oncol 2015; 16:949e56; and Cassier P A, Italiano A, Gomez-Roca C A, Le Tourneau C, Toulmonde M, DAngelo S P, et al. Long-term clinical activity, safety and patient-reported quality of life for emactuzumab-treated patients with diffuse-type tenosynovial giant-cell tumour. Eur J Cancer. 2020; 141:162-170).

Objective. The objective of this pharmacokinetic (PK) and pharmacodynamic (PD) study was to develop a concentration effect model to determine the biologically optimal dose of emactuzumab.

Methods. This was an open-label, multicentre, dose-escalation Phase Ia/b trial in patients with advanced solid tumours and TGCT. The single-agent emactuzumab dose was escalated from 100 mg up to 3000 mg and administered as intravenous infusion in different dosing regimen (twice a week, thrice a week, and biweekly or monthly).

Blood samples for safety and PK assessments were taken both at baseline, on Day 1 of each 2-week cycle, and five additional timepoints during Cycle 1 (Days 2, 4, 8, 10, and 12), and one additional timepoint during Cycle 2 (Day 8). For analysis of emactuzumab in human serum, an adapted ELISA was developed using human CSF-1R as capture reagent and an anti-idiotypic antibody against emactuzumab applied as detection reagent. The PK parameters were estimated using non-compartmental analysis.

For PD assessment, tumour biopsies were taken at baseline and around 4 weeks on treatment. Samples were analysed for CD68, CD163, and CSF-1R expression with immunohistochemical (IHC) staining. Furthermore, fluorescence-activated cell sorting was used to monitor peripheral blood monocyte subsets over time. Specifically, the inventors assessed the number of CD45+/CD14+ and CD14Dim/CD16High monocytes; the latter express high levels of CSF-1R and represent about 5-10% of all monocytes. The tissue biopsies (skin and TGCT) were immediately subjected to fixation in 10% neutral-buffered formalin, and were transferred to tissue processing and paraffin embedding according to standard protocols. The following antibodies were obtained from Ventana Medical Systems (Tucson, AZ, USA): CD68 (clone KP-1) and CD163 (cloneMRQ-26). An in-house-generated anti-human-CSF-1R monoclonal mouse antibody (clone 29; Roche Diagnostics GmbH, Germany) was used for IHC detection of CSF-1R. Sections were subjected to automated staining on a Benchmark XT instrument (Ventana Medical Systems).

Results. The PK of emactuzumab in patients with TGCT and advanced solid tumours after single IV administration (Cycle 1) is non-linear. The PK of emactuzumab was shown to be non-linear across the doses 100-900 mg. Both Cmax and AUC showed a greater than dose proportional increase, accompanied by a decline in clearance over the same dose range, indicating that the elimination of emactuzumab across this dose range is predominantly target-mediated (indicative data are shown in Table 1). For doses above 900 mg, exposure increased approximately dose-proportionally and little change in total clearance was seen (Table 1; FIG. 1). Terminal t1/2 estimates increased with increasing dose ranging from approximately 1.5-9 days. The apparent volume of distribution ranged from 3.7-6.2 L, which is consistent with the majority of the drug residing within the confines of the central compartment.

Figure 2:
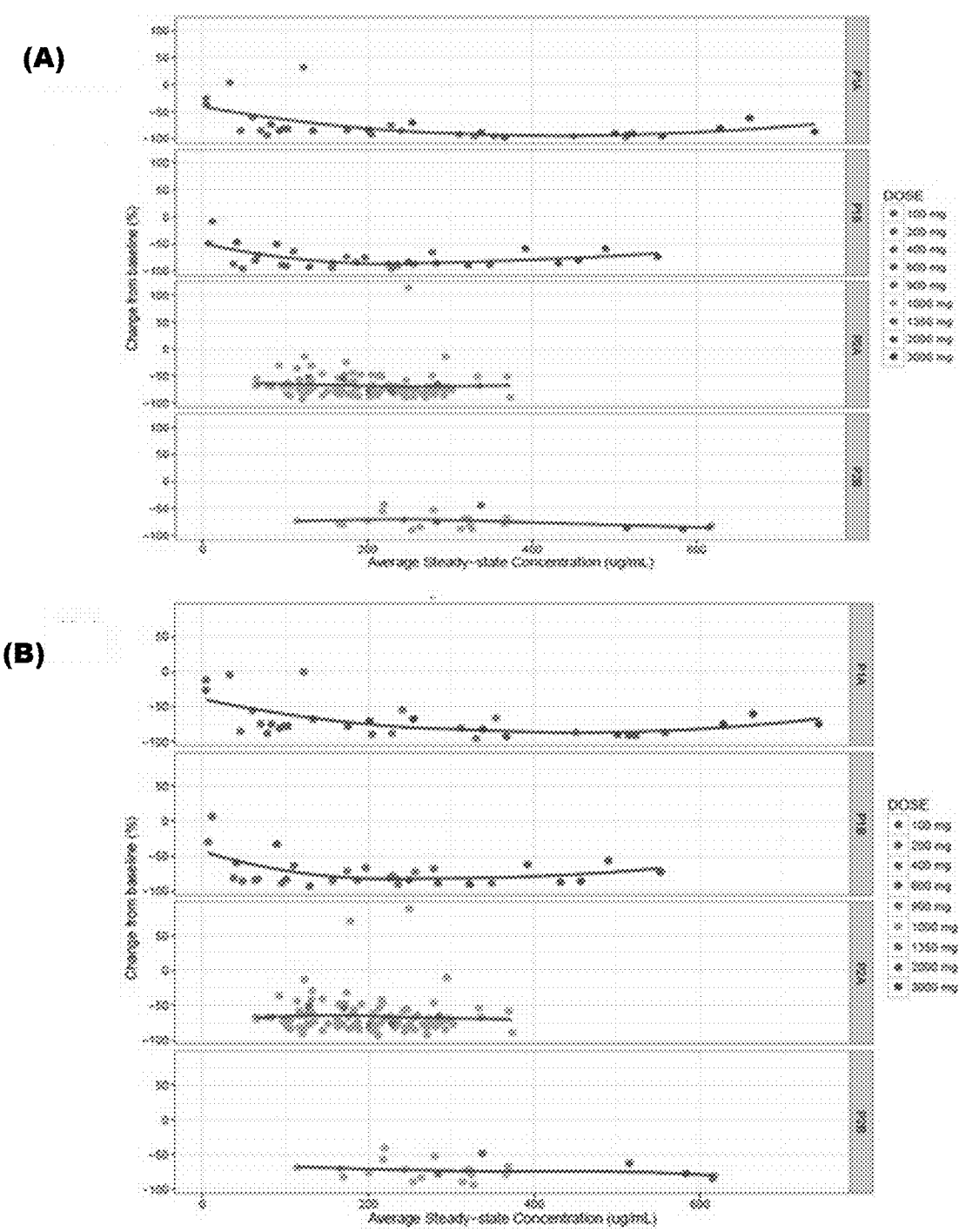
FIGS. 2A-B: Systemic Exposure versus (a) CD163+/CD68+ Macrophage Levels (b) CSF-1R+ Macrophage Levels in Paired Skin Biopsy Samples for Study BP27772 (Source: Investigator's Brochure Emactuzumab—F. Hoffmann-La Roche Ltd).

A decrease in CD163/CD68 and CSF-1R expressing macrophage levels (% change from baseline) in a dose/exposure manner was observed following four weeks of emactuzumab therapy in both surrogate skin (dermal macrophages; FIGS. 2A-B) and tumour (tumour associated macrophages) samples. A plateau in macrophage depletion was observed from an approximate Cavg of 100 μg/mL (approximately corresponding to a 900 mg dose) in the dose escalation parts. A trend for peripheral blood levels of CD14+/CD16+ monocytes to decrease from pre infusion baseline levels, concomitantly with emactuzumab average concentration, was observed during Day 1 of Cycle 1, as was a rapid and sustained exposure-dependent increase of CSF-1, consistent with a positive feedback loop.

TABLE 1

Clinical Pharmacokinetics (Mean [% CV]) of Emactuzumab Following Single IV Infusion (100-3000 mg, q2w) during Cycle 1 (Emactuzumab Monotherapy)

| Dose (mg) | Mean (CV %) [a] | $C_{max}$ (μg/mL) | $AUC_{last}$ (d × μg/mL) | $V_d$ (L) | CL (L/day) | $t_{1/2}$ (day) |
|---|---|---|---|---|---|---|
| 100 n = 2 [b] | Individual value | 21.6, 37.2 | 54.0, 64.7 | 3.68, 2.55 | 1.78, 1.16 | 1.55, 1.53 |
| 200 n = 1 | Individual value | 24.9 | 65.2 | 6.87 | 2.89 | 1.79 |
| 400 n = 6 | Mean (CV %) | 123 (20.8) | 587 (27.5) | 4.50 (17.4) | 0.610 (46.4) | 6.68 (58.7) |
| 600 n = 5 | Mean (CV %) | 207 (9.1) | 929 (19.0) | 4.53 (10.9) | 0.518 (26.6) | 6.84 (30.9) |

TABLE 1-continued

Clinical Pharmacokinetics (Mean [% CV]) of Emactuzumab Following Single IV Infusion (100-3000 mg, q2w) during Cycle 1 (Emactuzumab Monotherapy)

| Dose (mg) | Mean (CV %) [a] | $C_{max}$ (µg/mL) | $AUC_{last}$ (d × µg/mL) | $V_d$ (L) | CL (L/day) | $t_{1/2}$ (day) |
|---|---|---|---|---|---|---|
| 900 | Mean (CV %) | 298 | 1880 | 3.79 | 0.369 | 8.60 |
| n = 6 | | (14.8) | (26.5) | (19.0) | (49.9) | (32.1) |
| 1350 [c] | Mean (CV %) | 501 | 2270 | 4.07 | 0.361 | 7.69 |
| n = 4 | | (25.1) | (67.5) | (52.2) | (37.8) | (15.6) |
| 2000 | Mean (CV %) | 638 | 3330 | 4.64 | 0.452 | 8.29 |
| n = 6 | | (20.9) | (30.0) | (26.7) | (43.1) | (34.7) |
| 3000 | Mean (CV %) | 980 | 4180 | 6.24 | 0.635 | 7.92 |
| n = 6 | | (39.6) | (37.9) | (46.4) | (50.7) | (21.7) |

$AUC_{last}$ = area under the concentration-time curve from 0 to time when drug was undetectable; CL = clearance; $C_{max}$ = maximum concentration of drug; CV = coefficient of variation; d = day; IV = intravenous; q2w = every 2 weeks; $t_{1/2}$ = half-life; $t_{last}$ = time when drug was undetectable; $V_d$ = volume of distribution.
[a] Individual values are reported when N ≤ 2.
[b] All patients received an initial dose of 100 mg emactuzumab. Data are included from one patient that received 100 mg emactuzumab q2w following the run-in dose of 100 mg.
[c] Lambda z was not calculated for one patient therefore $t_{1/2}$, $V_d$ and CL not calculated for that patient. Patient 2006 was excluded for most calculations since $t_{last}$ was 24 hours.
Source: *Investigator's Brochure Emactuzumab*-F. Hoffmann-La Roche Ltd Conclusion. Target mediated drug disposition (TMDD) corresponds to a special case (Mager D E. Target-mediated drug disposition dynamics. Biochem Pharmacol. 2006; 72(1):1-10) wherein a significant proportion of a drug (relative to dose) is bound with high affinity to a pharmacological target (CSF1R), such that this interaction is reflected in the PK properties of the drug e.g., dose-dependent effects on steady-state volume of distribution and total systemic clearance. It was apparent that TMDD was operating in these clinical studies, leading us to develop a concentration-effect model to define the optimal biological dose of 1000 mg every 2 weeks (Cassier P A, Italiano A, Gomez-Roca C A, Le Tourneau C, Toulmonde M, Cannarile M A, et al. CSF1R inhibition with emactuzumab in locally advanced diffuse-type tenosynovial giant cell tumours of the soft tissue: a dose-escalation and dose-expansion phase 1 study. Lancet Oncol 2015; 16:949e56 and Cassier P A, Italiano A, Gomez-Roca C A, Le Tourneau C, Toulmonde M, DAngelo S P, et al. Long-term clinical activity, safety and patient-reported quality of life for emactuzumab-treated patients with diffuse-type tenosynovial giant-cell tumour. Eur J Cancer. 2020; 141:162-170).

This dose achieved the required 90% or more target saturation resulting in depletion of macrophages (both in the tumour and the skin) (F. Hoffmann-La Roche Ltd, Investigator's Brochure (R05509554) Emactuzumab, Version 12, March 2021. and Bissinger S, Hage C, Wagner V, Maser I P, Brand V, Schmittnaegel M, et al. Macrophage depletion induces edema through release of matrix-degrading proteases and proteoglycan deposition. Sci Transl Med. 2021; 13:eabd4550) and was supported by further PD markers such as peripheral monocyte subsets and circulating CSF-1 levels1.

Example 2

Figure 3:
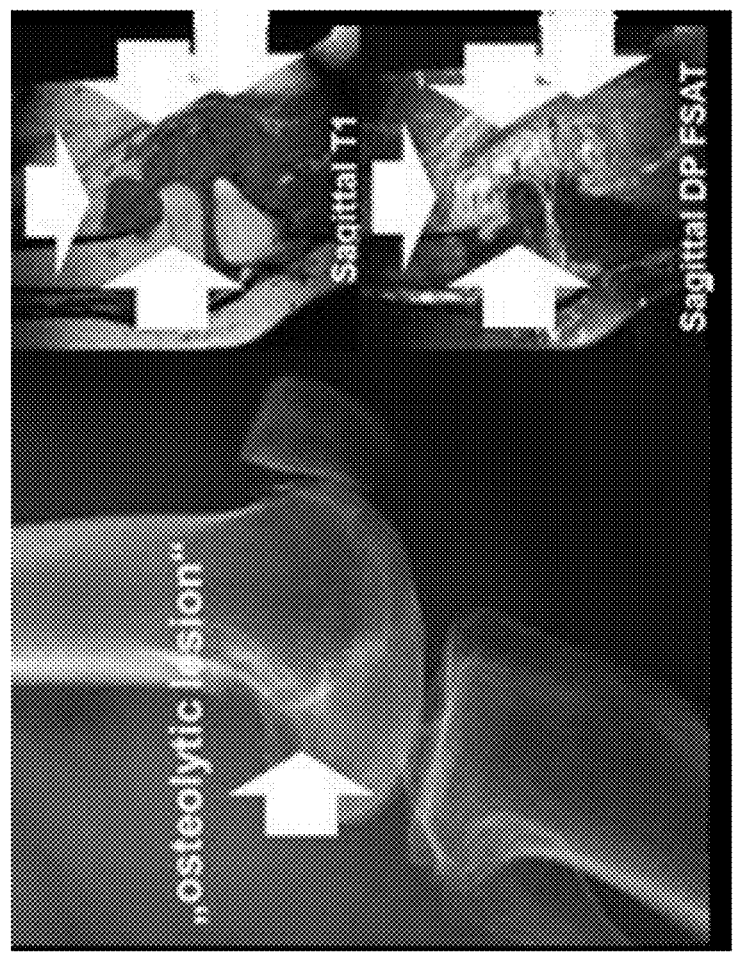
FIG. 3: Pigmented villonodular synovitis (PVNS), TGCTs.

Indication. Tenosynovial giant cell tumors (TGCTs) are rare, benign tumors, arising in synovial lining of joints, tendon sheaths, or bursae. The knee is most frequently (66-80%) affected, followed by the hip, ankle, elbow, and shoulder (Murphey M D, et al. Pigmented villonodular synovitis: Radiologic-pathologic correlation. Radiographics. 2008; 28(5):1493-1518) (FIG. 3). The most commonly reported and debilitating symptoms are pain, swelling, stiffness, and limited range of motion of the affected joints (Bernthal N M, et al. The diffuse-type tenosynovial giant cell tumor (dt-TGCT) patient journey: A prospective multicenter study. Orphanet J Rare Dis. 2021; 16(1):191. and Riedel R F, et al. (Cancer Care). Improving Resources and Support for Patients with Tenosynovial Giant Cell Tumor. White Paper. Website: media.cancercare.org/publications/original/431-2021_TGCT.pdf.). Consequently, these symptoms cause a significant impact on patients' physical functioning and health-related quality of life (HRQoL). A recent nationwide study in the Netherlands estimated worldwide incidence rates in localized-digits, localized-extremity and diffuse TGCT of 29, 10, and 4 per million person-years, respectively (Mastboom M J L, et al. Higher incidence rates than previously known in tenosynovial giant cell tumors. Acta Orthop. 2017a; 88(6):688-694).

The current standard of care is surgical resection of the tumor. Patient outcome following surgery depends on multiple factors, including the location and extent of disease. Surgical resection may involve removal of major tendons, neurovascular structures, or limbs (in severe, recurrent cases), leading to significant postsurgical morbidity (Mastboom M J L, et al. Limb amputation after multiple treatments of tenosynovial giant cell tumour: Series of 4 Dutch cases. Case Rep Orthop. 2017b; 2017:7402570).

Investigation Medicinal Product—Emactuzumab. Many tumors are characterized by a prominent immune cell infiltrate containing macrophages that exert antitumor function (M1 subtype) or support tumor growth (M2 subtype) (Ogilvie-Harris D J, et al. Pigmented villonodular synovitis of the knee. The results of total arthroscopic synovectomy, partial, arthroscopic synovectomy, and arthroscopic local excision. J Bone Joint Surg Am 1992; 74:119-23 and Pollard J W. Trophic macrophages in development and disease. Nat Rev Immunol 2009; 9:259-70). In TGCT, colony stimulating factor 1 receptor (CSF-1) overexpression leads to the accumulation of monocytes and macrophages expressing CSF-1R (West R B, et al. A landscape effect in tenosynovial giant-cell tumor from activation of CSF1 expression by a translocation in a minority of tumor cells. Proc Natl Acad Sci USA 2006; 3:690-5), a class III receptor tyrosine kinases that regulates the survival, proliferation, and differentiation of monocytes and macrophages (Xiong Y, et al. A CSF-1 receptor phosphotyrosine 559 signaling pathway regulates receptor ubiquitination and tyrosine phosphorylation. J Biol Chem 2011; 286:952-60).

Figure 4:
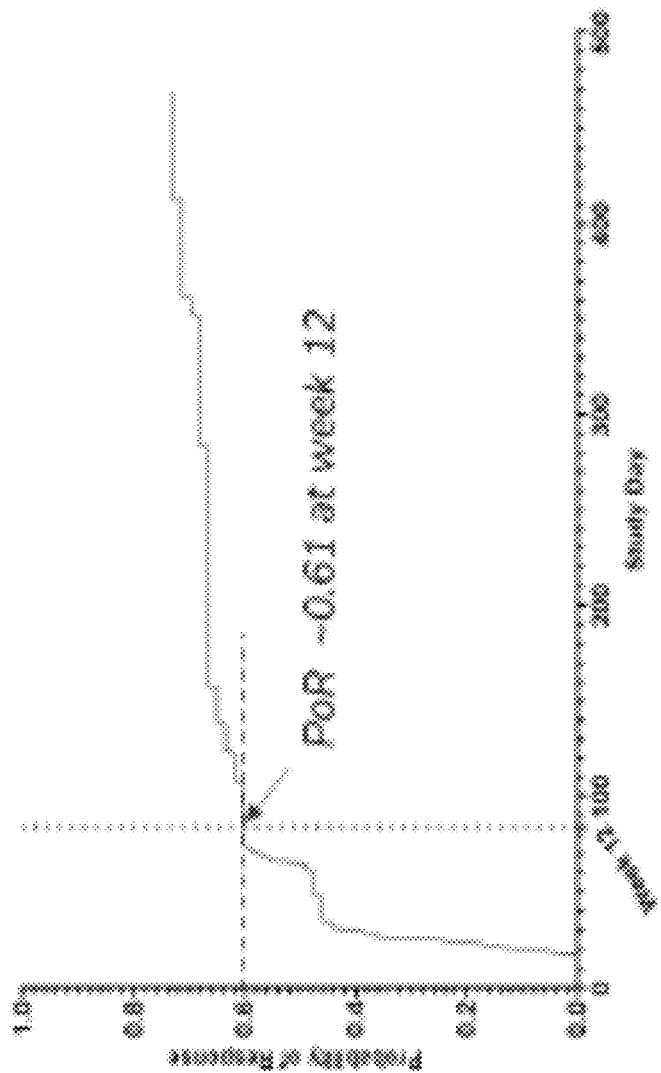
FIG. 4: Inverse Kaplan-Meier plot of probability of response to emactuzumab treatment in patients with TGCT (Source: Clinical Study Report: R05509554—F. Hoffmann-La Roche Ltd; Protocol BP27772 Report Number 1087150).
Figure 5:
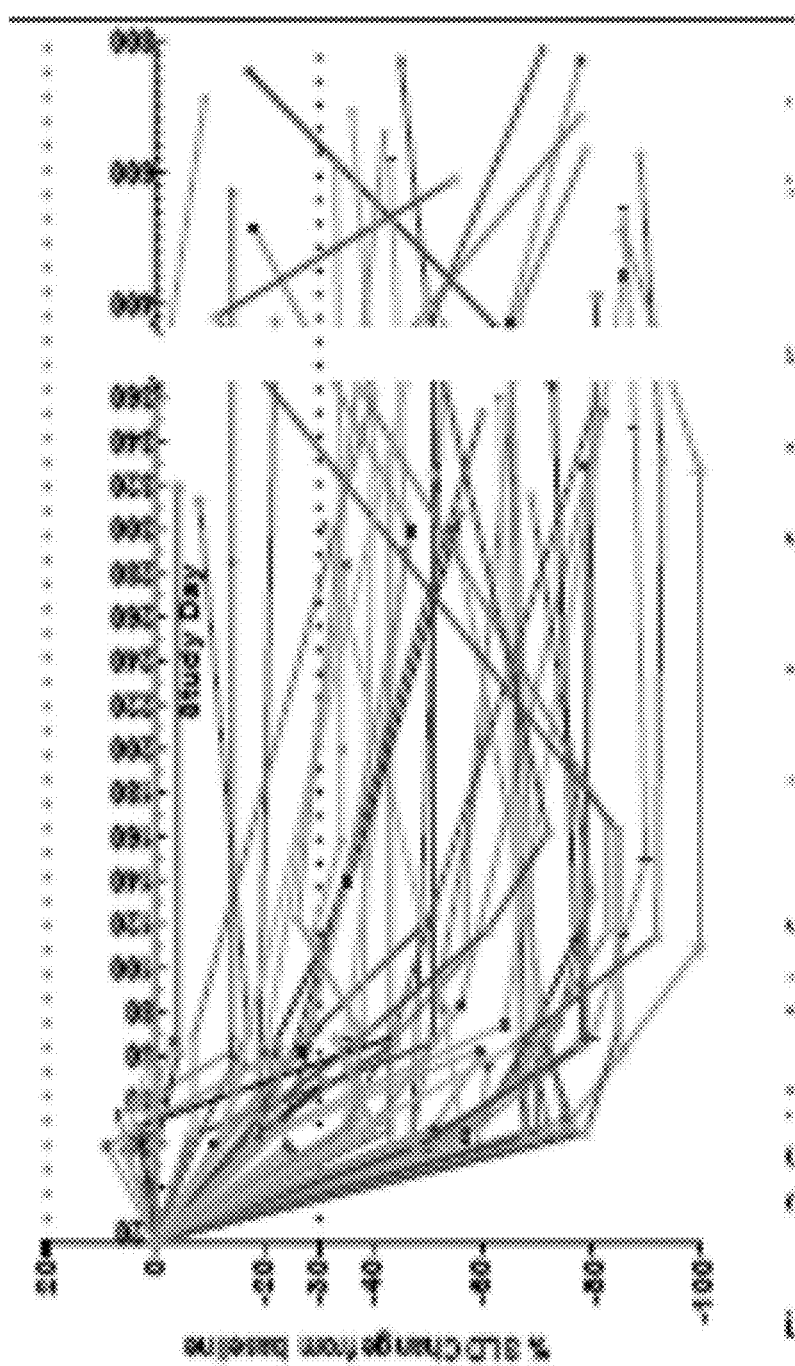
FIG. 5: Spider plot of percentage change from baseline over time in the sum of longest diameters according to RECIST 1.1. Dotted reference lines indicate thresholds for partial response at −30% and progressive disease at 20% (Source: Clinical Study Report: R05509554—F. Hoffmann-La Roche Ltd; Protocol BP27772 Report Number 1087150).
Figure 6:
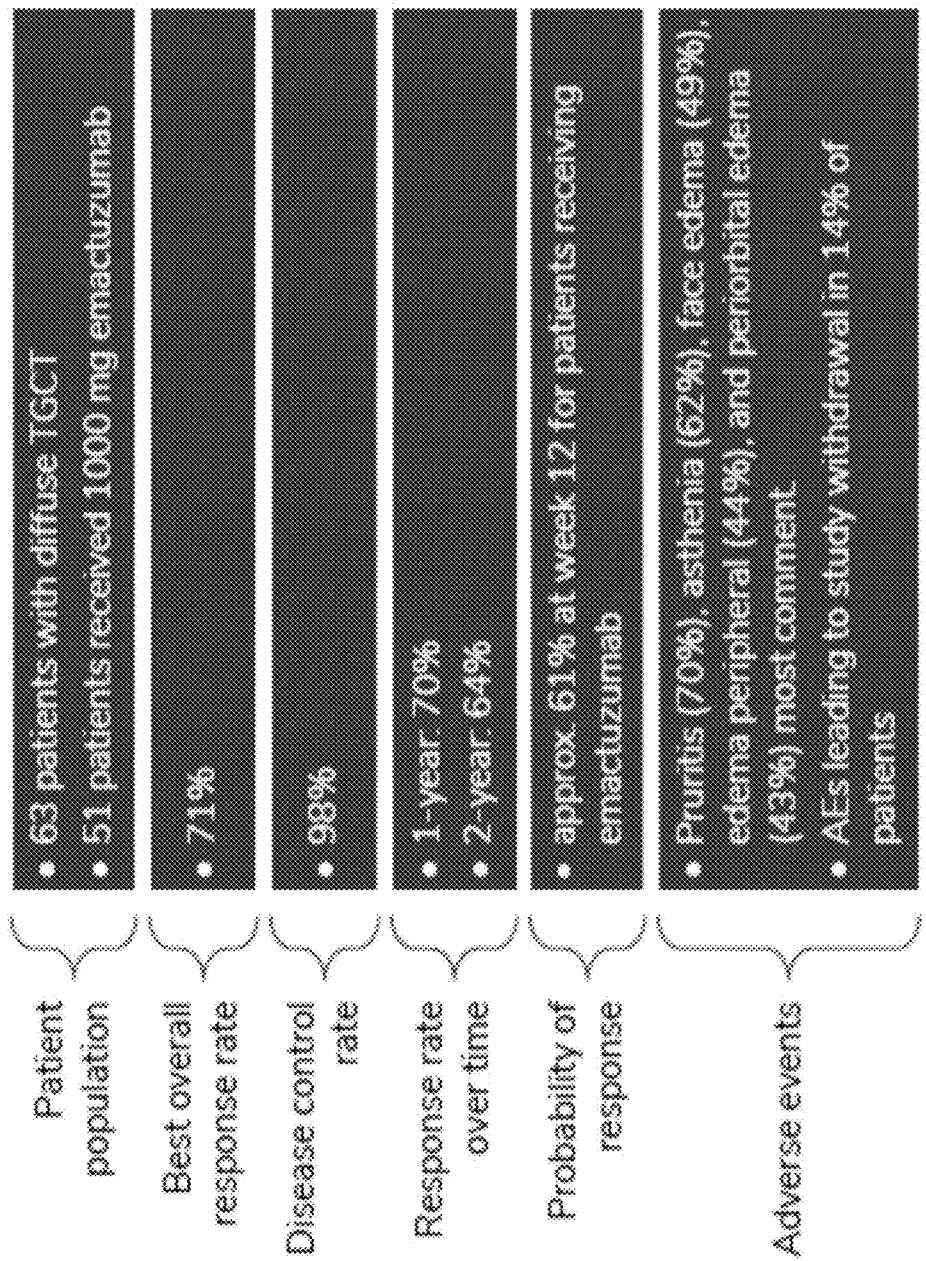
FIG. 6: Summary of results in Phase I study BP27772 in patients with TGCT receiving emactuzumab.

Emactuzumab is a humanized monoclonal antibody which binds specifically to human CSF-1R and is selective for the receptor dimerization interface of the human CSF-1R extracellular domain. Systemic therapy of patients with diffuse TGCT with emactuzumab in the Phase I study BP27772 showed a pronounced and durable response as assessed via the Response Evaluation Criteria in Solid Tumors version 1.1 (RECIST 1.1) associated with symptomatic improvement and a manageable safety profile (Cassier P A, et al. Long-term clinical activity, safety and patient-reported quality of life for emactuzumab-treated patients with diffuse-type tenosynovial giant-cell tumour. Eur J Cancer. 2020; 141:162-170) (ClinicalTrials.gov Identifier: NCT01494688; FIG. 4 to FIG. 6).

Objective. Although one therapy (pexidartinib/Turalio®) is already approved for the treatment of adult patients with symptomatic TGCT associated with severe morbidity or functional limitations and not amenable to improvement with surgery in the United States (US), this therapy can cause serious and potentially fatal liver injury (Turalio Prescribing Information. 2020. Website: //world-wide-web.turaliohcp.com/en/.). In the EU, pexidartinib marketing authorization was refused as safety and efficacy was considered not sufficiently demonstrated (Turalio Refusal Public Assessment Report. EMA/CHMP/431740/2020. 2020. Due to the severe long-term morbidity, there is a need for a safe, effective treatment to reduce disability and restore function in patients with TGCT.

Figure 7:
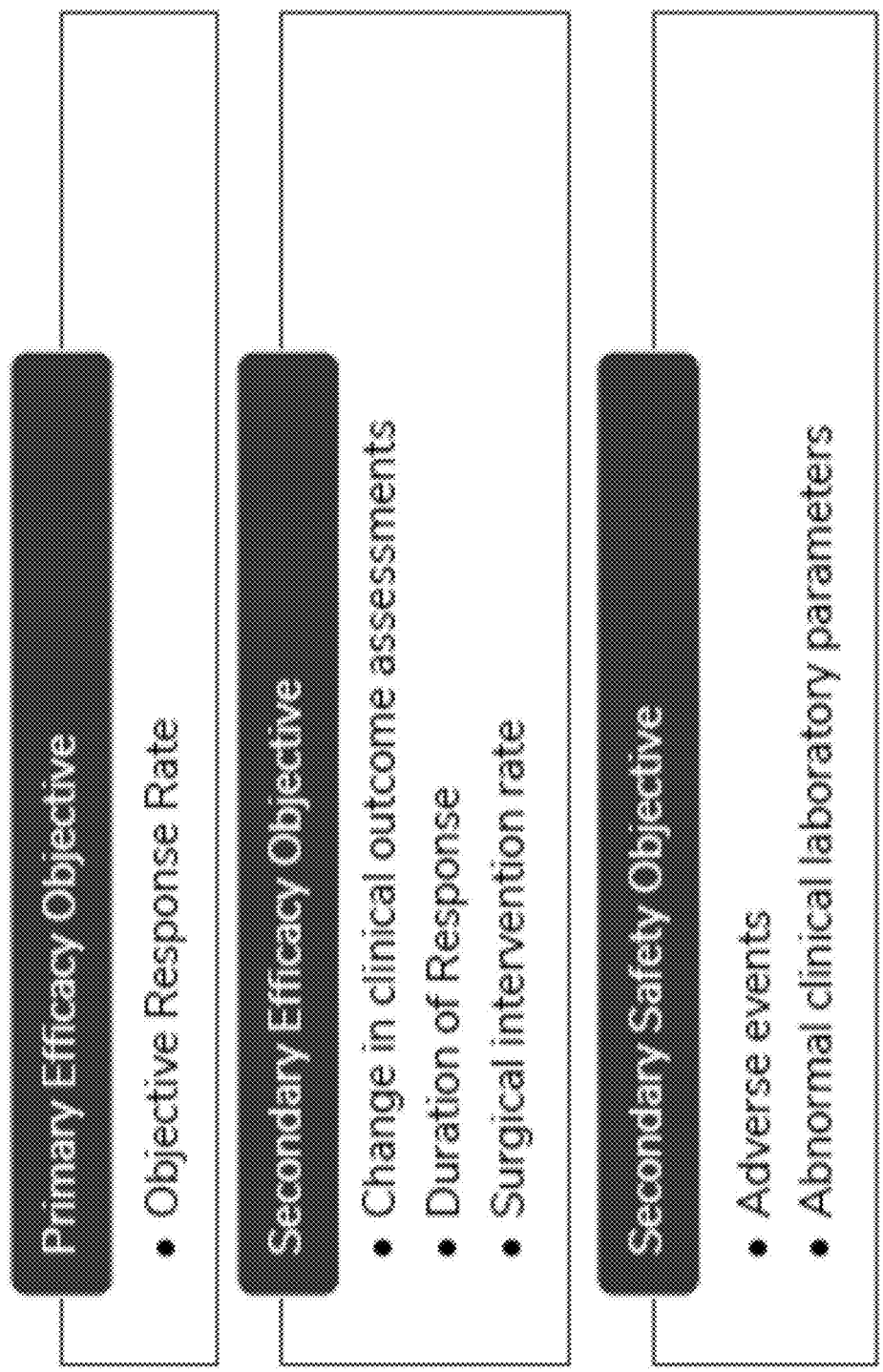
FIG. 7: Study objectives and endpoints.

The aim of this study is to assess the efficacy and safety of emactuzumab infusions in patients with TGCT. Efficacy is the primary objective assessed through tumor response. Efficacy will be further evaluated using clinical outcome assessments, duration of response, and surgical intervention rates. Safety and tolerability are secondary objectives assessed through adverse events (AEs) and abnormal clinical laboratory parameters (FIG. 7).

Figure 8:
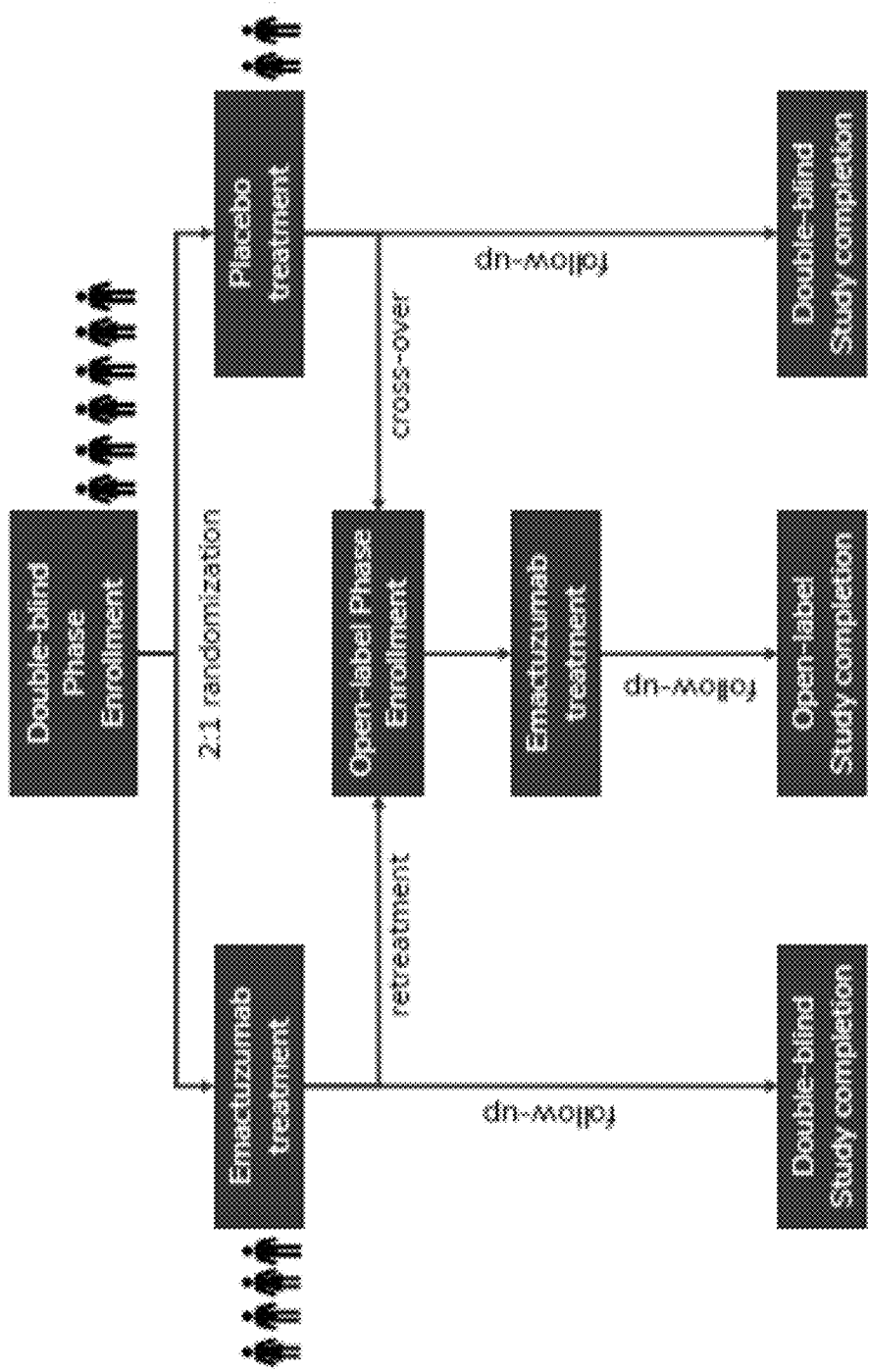
FIG. 8: Study Design

Study Design. This will be a randomized, double-blind, placebo-controlled, parallel-group, multicenter study of emactuzumab in adult patients with TGCT. Eligible patients will be randomized to receive either emactuzumab or placebo in a 2:1 ratio for about 10 weeks (5 cycles). Randomization will be stratified according to prior pexidartinib therapy and will be capped at one third of the total patient number. The study aims to randomize about 135 patients at approximately 50 sites across Europe and North America. Under certain conditions, patients may have the possibility to enter an open-label phase (FIG. 8). An independent Data Safety Monitoring Board will review safety data on a regular basis.

Study Populations. Patients with biopsy-confirmed TGCT in whom surgical resection would be associated with potentially worsening functional limitations, high risk of early recurrence, or any other morbidity associated with surgery will be eligible to participate in this study. Patients with autoimmune conditions or requiring systemic immunosuppression, and patients with underlying liver disease will be excluded.

Study Treatment. During the double-blind phase of the study, patients will receive intravenous infusions of the study drug once every 2 weeks (corresponding to 1 cycle), for a maximum of 5 cycles. Patients will receive either emactuzumab 1000 mg or matching placebo.

Study Assessments. Efficacy will be measured using RECIST 1.1 by magnetic resonance imaging and secondary endpoints such as clinical outcome assessments will be assessed using patient- and healthcare professional-reported outcome measures.

The incidence and severity of AEs, clinical laboratory, and other standard safety assessments will be recorded to determine tolerability.

Results. The study will investigate emactuzumab in patients who are not clinically indicated for surgery and for whom the disease is causing severe morbidity, as documented by clinical assessment from the patient's multidisciplinary health care team.

The level and duration of the emactuzumab dose regimen has been selected based on the Phase I study results to maximize the depletion of CSF-1R macrophages, whilst minimizing the potential for toxicity. Efficacy, safety, and HrQoL measurements will be assessed during treatment with study drug and after completing the treatment period on a monthly basis for 6 months, 3-monthly basis for up to 1 year, and thereafter at 18 months and 2 years. The approximate total duration of study participation is up to 2 years for each patient.

Liver safety monitoring and assessment will be performed in accordance with US FDA's guidance (FDA-2008-D-0128. 2008. Website: //world-wide-web.fda.gov/regulatory-information/search-fda-guidance-documents/drug-induced-liverinjury-premarketing-clinical-evaluation).

Dermatological adverse drug reactions (ADRs) will be evaluated by a central dermatologist. All expected low grade ADRs associated with the emactuzumab mechanism of action will be managed in accordance with standardized therapeutic guidance set out in the protocol.

Patients who respond to initial treatment with emactuzumab and then progress within 6 to 18 months will be eligible for emactuzumab retreatment in an open-label phase and will provide a mechanism to assess the utility of repeated therapy. Patients randomized to placebo may crossover at any timepoint to receive treatment with emactuzumab in the open-label phase.

Conclusions. Emactuzumab offers a short course of treatment and based on the available data to date, is believed to offer benefit to patients in the planned study of emactuzumab in patients with TGCT. By comparing to a placebo control, the current study intends to demonstrate that emactuzumab offers a safe and effective treatment in patients with TGCT associated with severe morbidity or functional limitations and not amenable to improvement with surgery, including those who have been unsuccessfully treated with other approved and unapproved agents. Given the detrimental impact of the disease to the lives of patients, the early indicators of emactuzumab efficacy and acceptable safety profile based on the identified risks in the monotherapy setting, it is considered clinically appropriate to conduct this study of emactuzumab in patients with TGCT.

Example 3

Emactuzumab is an investigational humanised monoclonal antibody that is being developed for intravenous (iv) infusion for the treatment of patients with tenosynovial giant cell tumours (TGCT).

The purpose of this Example is to describe a Phase III, multicentre, randomised, double-blind study to assess the safety and efficacy of emactuzumab vs. placebo in subjects with TGCT.

Study Rationale. The aim of this Phase III study is to assess the efficacy and safety of emactuzumab infusions in patients with tenosynovial giant cell tumour (TGCT). Efficacy is the primary objective assessed through tumour response. Efficacy will be further evaluated using clinical outcome assessments. Safety and tolerability are secondary objectives assessed through adverse events (AEs) and abnormal clinical laboratory parameters.

Due to the severe long-term morbidity associated with this insidious tumour, the inability to adequately resect some tumours, the poor outcomes associated with surgery and high recurrence rates, there is a need for a safe, effective treatment to reduce disability and restore function in TGCT patients. Although one treatment (pexidartinib) is already approved for the treatment of adults with TGCT associated with severe morbidity or functional limitations and not amenable to improvement with surgery in the United States (US), this therapy has safety limitations associated with liver toxicity and is not currently approved elsewhere (as of July 2021).

Therefore, due to therapeutic limitations (eg, limited responses, toxicities), and in Europe and many other countries where there are no approved therapies, the main treatment is surgery.

Emactuzumab offers a short course of treatment and based on the available data to date, is believed to offer benefit to patients through rapid and robust tumour reduction and improvements in functional ability which are expected to positively impact quality of life, in addition to an acceptable safety profile.

Background. TGCTs are a group of generally benign intra-articular and soft tissue tumours with common histologic features, broadly divided into localised (lTGCT) and diffuse (dTGCT) types. The lTGCT include giant cell tumours of tendon sheath and pigmented villonodular synovitis and are generally indolent. dTGCT encompass conventional pigmented villonodular synovitis and diffuse-type giant cell tumour and are locally aggressive, invading extra-articular tissue and often recur post surgery, estimated in at least 50% of cases. Most TGCT are located in the knee, ankle, wrist, and foot and are often severe and seriously debilitating. TGCT often leads to severe morbidity with accompanying pain and inability to undertake daily activities. Surgery is often restricted due to tumour location and characteristics. Further, surgery is often associated with long recovery times, poor outcomes and high recurrence rates, depending on the nature of the lesion. The disease often affects young adults who would otherwise be healthy and active. The impact of the disease on education, work and family life can be significant (Mastboom et al., 2018).

All TGCT are clonal neoplastic tumours driven by overexpression of macrophage colony stimulating factor (CSF-1). CSF-1 is a secreted cytokine/haematopoietic growth factor that plays an essential role in the proliferation, differentiation, and survival of monocytes, macrophages, and related cells. It is localised to the 1p13 breakpoint and appears to have a major oncogenic role in TGCT.

The M2-like subtype of tumour associated macrophages (TAMs) is implicated in promoting tumourigenesis and suppressing tumour immunity. Tumours are able to recruit and polarise macrophages into the M2-like subtype by secreting various cytokines such as CSF-1 and interleukin 10 (IL-10). CSF-1 is linked to neoplasia and poor prognosis. The CSF-1 receptor (CSF-1R) tyrosine kinase, responsible for mediating the cellular effects of CSF-1, is therefore an attractive target to selectively inhibit TAMs of the M2-like subtype.

Emactuzumab is an investigational humanised monoclonal antibody which binds specifically to human CSF-1R. Emactuzumab is not approved in a regulatory territory. Non-clinical data support its potential utility in TGCT reduction via CSF-1R inhibition. The pharmacokinetics (PK) is non-linear, showing target-mediated drug disposition. After administration of 900 mg in man, greater than dose proportional increases in exposure were observed, indicating receptor saturation.

Evidence of efficacy was demonstrated in Phase I protocol BP27772 involving 216 subjects with various underlying tumours. Of these, 63 subjects on monotherapy had TGCT, which included 51 subjects on the selected 1000 mg dose. The number of subjects with TGCT with a best unconfirmed complete response (CR) or partial response (PR; by central assessment) in the 1000 mg dose cohort was 35 of 51 subjects (68.6%). The Clinical Benefit Rate (CBR), ie, number of subjects with confirmed CR, PR, or stable disease (SD) by central assessment in the total cohort of subjects with TGCT was 96.8% overall (61 of 63 subjects). The confirmed CBR in the 1000 mg dose cohort (n=51) was 98.0%.

A detailed description of the chemistry, pharmacology, efficacy, and safety of emactuzumab is provided in the Investigator's Brochure (IB).

TABLE 2

Primary objectives and endpoints

| Objectives | Endpoints |
|---|---|
| Primary | |
| The primary efficacy objective of this study is to estimate the effect of emactuzumab on objective response rate (ORR) at 6 months from initiation of therapy in the blinded phase | ORR at 6 months from initiation of therapy |

TABLE 3

Secondary objectives and endpoints

| Objectives | Endpoints |
|---|---|
| Secondary | |
| Secondary efficacy objectives of the study are to estimate the effect of emactuzumab on: Physical functioning Pain Quality of life (QoL) To assess further antitumour activity of emactuzumab in TGCT compared to placebo | Key secondary endpoints Change in Patient-Reported Outcomes Measurement Information System (PROMIS) Physical Function TGCT from baseline to 6 months Change in PROMIS Paediatric and Parent-proxy Mobility and Upper Extremity Scale from baseline to 6 months |

TABLE 3-continued

Secondary objectives and endpoints

| Objectives | Endpoints |
|---|---|
| | Other secondary endpoints<br>Physician/Healthcare Professional (HCP)-Reported Joint Mobility Score by goniometry<br>Change in Worst Pain Numerical Rating Scale (NRS) from baseline to 6 months<br>Change in Short Form 12-Item Survey version 2 (SF-12 v2) from baseline to 6 months<br>Change in Worst Stiffness NRS from baseline to 6 months<br>Change in EuroQoL 5-Dimension, 5-Level questionnaire (EQ-5D-5L) from baseline to 6 months<br>Duration of response (DoR) as measured by Response Evaluation Criteria in Solid Tumours (RECIST) version 1.1 at the end of study<br>Disease control rate (DCR) as measured by RECIST v1.1<br>Change in Tumour volume score (TVS) |
| Surgical Intervention Rate | Surgical intervention rate: The number of subjects who undergo surgery during the study for TGCT tumour removal |
| The Safety Objective of this study is to monitor subject wellbeing and assess treatment tolerability | AEs and any laboratory abnormalities |
| To assess the health economic impact of treatment with emactuzumab | Healthcare utilisation<br>Ability to work |
| To assess the pharmacokinetic (PK) profile of emactuzumab | PK parameters |

Overall Design. This is a randomised, double-blind, placebo-controlled, parallel-group, multicentre study of emactuzumab in adult and adolescent subjects aged ≥12 years with TGCT. The study will be conducted at approximately 55 sites in the European Union (EU) and North America.

After screening, subjects will be randomised centrally using an Interactive Web Response System (IWRS) in a 2:1 ratio to receive an intravenous (iv) infusion of either emactuzumab or placebo once every 2 weeks for up to 5 cycles. Subjects will be stratified in terms of prior pexidartinib use, yes or no.

An unblinded Data Safety Monitoring Board (DSMB) will review study safety listings on a regular basis as defined in the DSMB Charter and confirm whether study treatment should continue at the current dose, or if any safety measures and/or protocol amendments are required.

Brief Summary. The purpose of this study is to measure efficacy and safety of iv infusions of emactuzumab compared to placebo in subjects with TGCT.

Study details include:
The study duration will be up to 2 years for each subject.
The treatment duration will be approximately 10 weeks with biweekly treatment for a maximum of 5 cycles.
The visit frequency will be every 2 weeks during the 3-month treatment period, with monthly visits thereafter up to 6 months, 3-monthly visits thereafter up to 1 year, and 6-monthly visits thereafter for up to 2 years during the Follow-up Period.
Subjects will initially participate in a Double-Blind Phase during which they will be randomised 2:1 to receive emactuzumab or placebo administered as iv infusion.
Subjects who respond based on RECIST v1.1 to initial treatment with emactuzumab during the Double-Blind Phase and then progress (with worsening symptoms and/or objective progressive disease on imaging) within 6-18 months of initial treatment, will be eligible for open-label retreatment in the Follow-up Period.
Subjects who progress per RECIST v1.1 and/or have clinically relevant deterioration as assessed by the Investigator, and confirmed by the Medical Monitor at any timepoint during the Double-Blind Treatment Period and who are randomised to placebo will be eligible to receive open-label treatment with emactuzumab in the Follow-up Period.

Number of Subjects. Approximately 160 subjects will be screened and assessed for eligibility to achieve 135 subjects randomly assigned to study intervention.

An interim analysis solely for the purposes of sample size re-estimation is planned after the 45th randomised subject has reached 6 months follow-up. This procedure will be conducted blind to the Sponsor by a fully independent statistical service provider. The conditional probability of reaching a statistically positive outcome for the primary endpoint and first key secondary endpoint with the planned N=135 randomised subjects will be assessed. Based on this assessment, sample size of N=135 may be increased up to a maximum of N=204 subjects to maintain adequate study power.

For sample size determination, refer to Section "Interim Analysis."

Note: Enrolled means a participant's, or their legally acceptable representative's, agreement to participate in a clinical study following completion of the informed consent process. All enrolled participants must have evidence of a personally signed and dated informed consent document indicating that the participant (or a legally acceptable representative) has been informed of all pertinent aspects of the study.

Intervention Groups and Duration. The approximate total duration of study participation for each subject is 2 years comprising the following periods:

Screening: within 14 days prior to randomisation (Screening Visit).

Double-Blind Treatment Period: 3 months from Day 1 (Visit 1) to Day 91 (Visit 7/End of Treatment/Early Discontinuation Visit).

Double-Blind Follow-up Period: 21 months beginning after Day 91 (Visit 7) to Day 721 (Visit 14/End of Study Visit).

For subjects that are eligible for treatment or retreatment with emactuzumab the study will include the following additional periods:

Open-Label Phase Treatment Period: 3 months Day 1-open-label (ol) (Visit 1-01) to Day 91-ol (Visit 7-ol/End of Treatment/Early Discontinuation Visit).

Open-Label Phase Follow-up Period: up to 2 years after randomisation in the Double-Blind Phase (ie, depending on time of subject entry into the Open-Label Phase, subjects may have a longer or shorter follow-up period).

Each subject will receive biweekly iv infusions of emactuzumab or placebo beginning on Day 1 for up to 5 cycles. The emactuzumab dose will be based on the body weight (BW) of the subject.

Group 1: 1000 mg (≥40 kg BW) or 500 mg (<40 kg BW) emactuzumab administered as iv infusion over 90 minutes.

Group 2: placebo administered as iv infusion over 90 minutes.

Subjects will be carefully monitored for toxicity and doses will be modified as necessary to accommodate individual subject tolerance to therapy, including temporary discontinuation, rechallenge, and discontinuation of study treatment.

Data Monitoring/Other Committee. A DSMB has been appointed for this study. The DSMB is a group of independent scientists who are appointed to monitor the safety and scientific integrity of a human research intervention, and to make recommendations to the Sponsor regarding possible modifications of study conduct to safeguard the interest of subjects. The composition of the committee is dependent upon the scientific skills and knowledge required for monitoring the particular study.

Schedule of Activities (SoA)
Double-Blind Phase

| Study Period | Screening Screening Visit | Treatment Period | | | Follow-up Period[k] | | | | | | End of Study |
|---|---|---|---|---|---|---|---|---|---|---|---|
| | | Cycle 1 (14 days) | | Cycle 2-5 (14 days) | End of treatment/ Early discontinuation | | | | | | |
| Visit | Visit | V1 | V2 | V3-V6 | V7 | V8 | V9 | V10 | V11 | V12 | V13 | V14 |
| Study Day | −14 to −1 | 1 | 5 | X | 91 | 121 | 151 | 181 | 271 | 361 | 541 | 721 |
| Cycle Day | | C1D1 | C1D5 | CXD1 | | | | | | | | |
| Window | | | +/−2 day | +/−3 days | +/−3 days | | | +/−14 days | | | | |
| Informed Consent[a] | X | | | | | | | | | | | |
| Inclusion/Exclusion Criteria | X | | | | | | | | | | | |
| Demographics and Medical History | X | | | | | | | | | | | |
| Concomitant Medications | X | X | X | X | X | | | X | | | X | X |
| ECG | X | | | X | X | | | X | | | | |
| Physical Examination[b] | X | X | X | X | X | | | X | | | | |
| Vital Signs | X | X | X | X | X | | | X | | | | |
| Height | X | | | X only Cycle 5 | | | | | | | | |
| Weight | X | X | | X | X | | | X | | | | |
| Haematology | X | X[c] | X | X | X | | | X | | | | |
| Serum Biochemistry[d] | X | X[c] | X | X | X | | | X | | | | |
| Urinalysis | X | | | | | | | | | | | |
| Pregnancy Test[e] | X | X | X | X | X | | | | | | | X |
| Emactuzumab ADA[f] | X | | | X | X | | | X | | | X | X |
| PK Sampling[g] | | X | X | X only Cycle 4 | | | | | | | | |
| Tumour Evaluation[h] | X | | | | X | | | X | | | X | X |

TABLE 5

Double-Blind Phase

| Study Period | Screening Screening | Treatment Period | | | Follow-up Period[k] | | | | | | End of Study |
|---|---|---|---|---|---|---|---|---|---|---|---|
| | | Cycle 1 (14 days) | | Cycle 2-5 (14 days) | End of treatment/ Early discontinuation | | | | | | |
| Visit | Visit | V1 | V2 | V3-V6 | V7 | V8 | V9 | V10 | V11 | V12 | V13 | V14 |
| Study Day | −14 to −1 | 1 | 5 | X | 91 | 121 | 151 | 181 | 271 | 361 | 541 | 721 |
| Cylce Day | | C1D1 | C1D5 | CXD1 | | | | | | | | |
| Window | | | +/−2 day | +/−3 days | +/−3 days | | | +/−14 days | | | | |
| PROMIS Scale | | X | | X | X | | | X | | | X | X |
| Upper Extremity Scale | | X | | X | X | | | X | | | X | X |
| NRS "Pain"[i] | | X | | X | X | | | X | | | X | X |
| SF-12 v2 | | X | | X | X | | | X | | | X | X |
| NRS "Stiffness" | | X | | X | X | | | X | | | X | X |
| Goniometry | | X | | X | X | | | X | | | X | X |
| EQ-5D-5L | | X | | X | X | | | X | | | X | X |
| Health Economics | | X | | X | X | | | X | | | X | X |
| Subject Interview[j] | | X | | | X | | | | | | | X |
| IMP Radomisation | | X | | | | | | | | | | |
| IMP Infusion | | X | | X | | | | | | | | |
| Adverse Event Evaluation | | X | | X | X | | X | | | | X | X |

Abbreviatons: ADA = anti-drug antibody; ALP = alkaline phosphatase; ALT = alanine aminotransferase; AST = aspartate aminotransferase; CPK = creatine phosphokinase; ECG = electrocardiogram; EQ-5D-5L = EuroQol 5-Dimension 5-Level questionnaire: IMP = investigational medicinal product; LDH = lactate dehydrogenase; MRI = Magnetic resonance imaging; NRS= Numerical Rating Scale; PK = pharmacokinetic; PROMIS = Patient-Reported Outcomes Measurement Information System; SF-12 v2 = Short Form 12-Item Survey version 2; TVS = Tumour Volume Score.
Footnote:
[a]For adolescents; parental/legal guardian consent.
[b]Complete physical exam at Screening and Visit 1, targeted physical exam at all following visits.
[c]For Day 1, blood draws do not need repeating if Pre-study sample taken within 72 hours of Day 1.
[d]Biochemistry parameters: sodium, potassium, magnesium, urea, creatinine, total protein, albumin, glucose, CPK, bilirubin, ALP, ALT, AST, calcium, phosphate, LDH, amylase.
[e]At Screening: Serum pregnancy test (women of childbearing potential): at all other visits: urine pregnancy test prior to infusion.
[f]Samples to be taken prior to infusion.
[g]Samples will be collected prior to infusion and at 5 minutes to 2 hours following the end of drug infusion at Visit 1 (cycle 1), 5 days following the end of drug infusion Visit 2 (cycle 1), and prior to infusion and 5 minutes to 2 hours following the end of drug infusion at Visit 5 (cycle 4).
[h]MRI evaluation every 3 monthe (+/−14 days), or at unscheduled withdrawal. All MRIs will also be assessed centrally for RECIST v1.1 and TVS at the end of the study.
[i]Subjects will be required to complete the NRS 'pain' for each of the 7 days prior to the clinic visit using a subject diary.
[j]Subjects will have periodic (quarterly) interviews with the Investigator on the personal impact of disease and treatment.
[k]All study data will remain blinded until the last subject completes Visit 10 (Day 1 + 6 months).

TABLE 6

Open-Label Phase

| Study Period | Eligibility[a] | Treatment Period | | | | Follow-up Period | | | | | | End of Study |
|---|---|---|---|---|---|---|---|---|---|---|---|---|
| | | Cycle 1-ol (14 days) | | Cycle 2-ol to 5-ol (14 days) | End of treatment/ Early discontinuation | | | | | | | |
| Visit | Eligibility Visit | V1-ol | V2-ol | V3-ol to V6-ol | V7-ol | V8-ol | V9-ol | V10-ol | V11-ol | V12-ol | V13-ol | V14-ol |
| Study Day | −14 to −1 | 1 | 5 | X | 91 | 121 | 151 | 181 | 271 | 361 | 541 | 721 |
| Cycle Day | | C1D1 | C1D5 | CXD1 | | | | | | | | |
| Window | | | +/−2 day | +/−3 days | +/−3 days | | | +/−14 days | | | | |
| Inclusion/Exclusion Criteria | X | | | | | | | | | | | |
| Concomitant Medications | X | X | X | X | X | | | X | | | X | X |
| ECG | X | | | X | X | | | X | | | | |
| Physical Examination[b] | X | X | X | X | X | | | X | | | | |
| Vital Signs | X | X | X | X | X | | | X | | | | |
| Height | X | | | X only Cycle 5 | | | | | | | | |

TABLE 6-continued

| | | Open-Label Phase | | | | | | | | | |
|---|---|---|---|---|---|---|---|---|---|---|---|
| | | Treatment Period | | | Follow-up Period | | | | | | |
| | Eligibility[a] | Cycle 1-ol (14 days) | Cycle 2-ol to 5-ol (14 days) | End of treatment/ Early discontinuation V7-ol | | | | | | | End of Study |
| Study Period Visit | Eligibility Visit | V1-ol | V2-ol | V3-ol to V6-ol | | V8-ol | V9-ol | V10-ol | V11-ol | V12-ol | V13-ol | V14-ol |
| Weight | X | X | | X | X | | | X | | | | |
| Haematology | X | X[c] | X | X | X | | | X | | | | |
| Serum Biochemistry[d] | X | X[c] | X | X | X | | | X | | | | |
| Urinalysis | X | | | | | | | | | | | |
| Pregnancy Test[e] | X | X | X | X | X | | | | | | | X |

TABLE 7

| | | Open-Label Phase | | | | | | | | | |
|---|---|---|---|---|---|---|---|---|---|---|---|
| | | Treatment Period | | | Follow-up Period | | | | | | |
| | Eligibility[a] | Cycle 1-ol (14 days) | Cycle 2-ol to 5-ol (14 days) | End of treatment/ Early discontinuation | | | | | | | End of Study |
| Study Period Visit | Eligibility Visit | V1-ol | V2-ol | V3-ol to V6-ol | V7-ol | V8-ol | V9-ol | V10-ol | V11-ol | V12-ol | V13-ol | V14-ol |
| Study Day | −14 to −1 | 1 | 5 | X | 91 | 121 | 151 | 181 | 271 | 361 | 541 | 721 |
| Cycle Day | | C1D1 | C1D5 | CXD1 | | | | | | | | |
| Window | | | +/−2 day | +/−3 days | +/−3 days | | | +/−14 days | | | | |
| Emactuzumab ADA[f] | X | | | X | X | | | X | | | X | X |
| PK sampling[g] | | X | X | X only Cycle 4 | | | | | | | | |
| Tumour Evaluation[h] | X | | | | X | | | X | | | X | X |
| PROMIS Scale | | X | | X | X | | | X | | | X | X |
| Upper Extemity Scale | | X | | X | X | | | X | | | X | X |
| NRS "Pain"[i] | | X | | X | X | | | X | | | X | X |
| SF-12 v2 | | X | | X | X | | | X | | | X | X |
| NRS "Stiffness" | | X | | X | X | | | X | | | X | X |
| Goniometry | | X | | X | X | | | X | | | X | X |
| EQ-5D-5L | | X | | X | X | | | X | | | X | X |
| Health Economics | | X | | X | X | | | X | | | X | X |
| Subject Interview[j] | | X | | | X | | | | | | | X |
| IMP Kit Assignment[k] | | X | | | | | | | | | | |
| IMP Infusion | | X | | X | | | | | | | | |
| Adverse event Evaluation | X | X | X | X | X | | | | | | X | X |

Abbreviatons: ADA = anti-drug antibody; ALP = alkaline phosphatase; ALT = alanine aminotransferase; AST = aspartate aminotransferase; CPK = creatine phosphokinase; ECG = electrocardiogram; EQ-5D-5L = EuroQol 5-Dimension 5-Level questionnaire: IMP = investigational medicinal product; LDH = lactate dehydrogenase; MRI = Magnetic resonance imaging; NRS= Numerical Rating Scale; PK = pharmacokinetic; PROMIS = Patient-Reported Outcomes Measurement Information System; SF-12 v2 = Short Form 12-Item Survey version 2; TVS = Tumour Volume Score.
Footnote:
[a]Eligibility procedures for the Open-Label Phase, except inclusion/exclusion criteria, are only required if the subject's last assessment of a respective procedure is performed >14 days priot to the Eligibility Visit.
[b]Complete physical exam at Screening and Visit 1, targeted physical exam at all following visits.
[c]For Day 1, blood draws do not need repeating if Pre-study sample taken within 72 hours of Day 1.
[d]Biochemistry parameters: sodium, potassium, magnesium, urea, creatinine, total protein, albumin, glucose, CPK, biliruin, ALP, ALT, AST, calcium, phosphate, LDH, amylase.
[e]At eligibility: Serum pregnancy test (women of childbearing potential): at all other visits: urine pregnancy test prior to infusion.
[f]Samples to be taken prior to infusion.
[g]Samples will be collected prior to infusion and at 5 minutes to 2 hours following the end of drug infusion at Visit 1 (cycle 1), 5 days following the end of drug infusion Visit 2 (cycle 1), and prior to infusion and 5 minutes to 2 hours following the end of drug infusion at Visit 5 (cycle 4).
[h]MRI evaluation every 3 monthe (+/−14 days), or at unscheduled withdrawal. All MRIs will also be assessed centrally for RECIST v1.1 and TVS at the end of the study.
[i]Subjects will be required to complete the NRS 'pain' for each of the 7 days prior to the clinic visit using a subject diary.
[j]Subjects will have periodic (quarterly) interviews with the Investigator on the personal impact of disease and treatment.
[k]For subject to be eligible to enter the Open-Label Phase and be allocated emactuzumab, the subject's randomised treatment allocation is to Study Rationale. The aim of this Phase III study is to assess the efficacy and safety of emactuzumab infusions in patients with TGCT. Efficacy is the primary objective assessed through tumour response. Efficacy will be further evaluated using clinical outcome assessments. Safety and tolerability are secondary objectives assessed through adverse events (AEs) and abnormal clinical laboratory parameters.

Due to the severe long-term morbidity associated with this insidious tumour, the inability to adequately resect some tumours, the poor outcomes associated with surgery and high recurrence rates, there is a need for a safe, effective treatment to reduce disability and restore function in TGCT patients. Although one treatment (pexidartinib) is already approved for the treatment of adults with TGCT associated with severe morbidity or functional limitations and not amenable to improvement with surgery in the United States (US), this therapy has safety limitations associated with liver toxicity and is not currently approved elsewhere (as of July 2021).

Therefore, due to therapeutic limitations (e.g., limited responses, toxicities), and in Europe and many other countries where there are no approved therapies, the main treatment is surgery.

Emactuzumab offers a short course of treatment and based on the available data to date, is believed to offer benefit to patients through rapid and robust tumour reduction and improvements in functional ability which are expected to positively impact quality of life, in addition to an acceptable safety profile.

Benefit/Risk Assessment. Emactuzumab is expected to be well tolerated and early clinical evidence of efficacy indicate a favourable benefit-risk profile.

The major safety findings noted in non-clinical studies at all dose levels were consistent with the mechanism of action of CSF-1R inhibition, including the associated depletion of Kupffer cells in the liver (Radi et al., 2011). Specifically, the following observations have been noted:

Periorbital oedema.

Increased alanine aminotransferase (ALT), aspartate aminotransferase (AST), creatine phosphokinase (CPK) and lactate dehydrogenase (LDH).

Reduction of M2-like macrophages in the liver and colon, as detected by immunohistochemistry.

Marked suppression of bone biomarkers (CTx, TRAP 5b, osteocalcin, P1NP) and associated increases in parathyroid hormone (PTH) and vitamin D3. Non-significant, slight increases in bone mass at the lumbar spine were consistent with the suppression of bone turnover in these animals.

Periorbital oedema and increased transaminases were also detected in clinical study BP27772. In addition, cutaneous lupus erythematosus was observed in a minority of subjects. The non-clinical and clinical findings have informed the comprehensive safety monitoring plan within this protocol.

More detailed information about the known and expected benefits and risks and reasonably expected AEs of emactuzumab may be found in the IB.

TABLE 8

Risk Assessment

| Potential Risk of Clinical Significance | Summary of Data/Rationale for Risk | Mitigation Strategy |
|---|---|---|
| Study Intervent ion | | |
| Periorbital oedema | IB Section 6.4 "Identified Risks and Adverse Drug Reactions" | No specific therapy is required for mild periorbital oedema in patients receiving emactuzumab. In more severe cases, a short pulse of diuretics and occasional use of topical treatment with 1% hydrocortisone plus 0.25% phenylephrine may be beneficial. Symptomatic patients may be referred toan ophthalmologist for further examination. |
| Dermatologic reactions/skin rash | IB Section 6.4 "Identified Risks and Adverse Drug Reactions" | To reduce the potential risk of the development of skin changes, it is recommended to avoid sun exposure and use strict sun precautions. A dermatologist should evaluate persistent and/or severe rash or pruritus. A biopsy should be performed if appropriate, and, if possible, photos of the rash should also be obtained and submitted for Central Dermatology review. Low-graderash and pruritus inflammatory disorder AEs have been treated with symptomatic therapy (eg, moisturiser, antihistamines). Topical or parenteral corticosteroids may be required for more severe symptoms. Any |

TABLE 8-continued

Risk Assessment

| Potential Risk of Clinical Significance | Summary of Data/Rationale for Risk | Mitigation Strategy |
|---|---|---|
| | | considerations for the use of systemic corticosteroids for rash and/or pruritus should be discussed with the MedicalMonitor. |
| Elevation of Liver Function Enzymes | IB Section 6.4 "Identified Risks and Adverse Drug Reactions" | Study subjects should undergo close monitoring of liver function. To qualifyfor treatment with emactuzumab, subjects must have adequate liver function, as defined by total bilirubin ≤1.5 × upper limit of normal (ULN) (excluding Gilbert syndrome), AST, and/or ALT ≤3 × ULN in subjects with liver metastases. |
| Infusion related reactions | IB Section 6.5.1.2 "Riskof Infusion-Related Reactions and Hypersensitivity Reactions Including Anaphylaxis" | If infusion-associated signs or symptoms occur, subjects should bemonitored until complete resolution. |

Study Procedures

| | | |
|---|---|---|
| Venipuncture will be performed during the study | There is the risk of bleeding, bruising, haematoma formation, and infection at the venipuncture site. | Only appropriately qualified personnelwould obtain the blood draw. |

Other

| | | |
|---|---|---|
| Contrast medium maybe used during the study | There is a risk of potentially serious allergicreactions when receiving contrast medium. | If serious allergic reactions occur, subjects should receive any necessary treatment according to local guidelines. |
| Risk of exposure to severe acute respiratory syndrome coronavirus 2 (SARS-CoV-2) during the pandemic | Subjects have to make in-person visits to study sitesfor study visits, which increases exposure to SARS-CoV-2. | The study will follow the national guidance and local site policy in the management of the clinical study duringthe Coronavirus Disease 2019 (COVID-19) pandemic to appropriatelyensure the safety of the subjects. |

Benefit Assessment. Benefits to individual participants may include:
  Receipt of a potentially efficacious TGCT humanised monoclonal antibody treatment.
  Contributing to the process of developing new therapies in an area of unmet need.

Overall Benefit Risk Conclusion. Taking into account the measures taken to minimise risk to subjects participating in this study, the potential risks identified in association with emactuzumab are justified by the anticipated benefits that may be afforded to subjects with TGCT.

| 3. Objectives and Endpoints | |
|---|---|
| Objectives | Endpoints |
| Primary | |
| The primary efficacy objective of this study is to estimate the effect of emactuzumab on objective response rate (ORR) at 6 months from initiation of therapy in the blinded phase | ORR at 6 months from initiation of therapy |

| 3. Objectives and Endpoints | |
|---|---|
| Objectives | Endpoints |
| Secondary | |
| Secondary efficacy objectives of the study are to estimate the effect of emactuzumab on:<br>Physical Functioning<br>Pain<br>Quality of Life (QoL) | Key secondary endpoints<br>Change in Patient-Reported Outcomes Measurement Information System (PROMIS) Physical Function TGCT from baseline to 6 months<br>Change in PROMIS Paediatric and Parent-proxy Mobility and Upper Extremity Scale from baseline to 6 months<br>Other secondary endpoints<br>Physician/Healthcare Professional (HCP)-Reported Joint Mobility Score by goniometry<br>Change in Worst Pain Numerical Rating Scale (NRS) from baseline to 6 months<br>Change in Short Form 12-Item Survey version 2 (SF-12 v2) from baseline to 6 months<br>Change in Worst Stiffness NRS from baseline to 6 months<br>Change in EuroQol 5-dimension, 5-level questionnaire (EQ-5D-5L) from baseline to 6 months |
| To assess further antitumour activity of emactuzumab in TGCT compared to placebo<br>Surgical Intervention Rate<br>The Safety Objective of this study is to monitor subject wellbeing and assess treatment tolerability | Duration of response (DoR) as measured by Response Evaluation Criteria in Solid Tumours (RECIST) version 1.1 at the end of study<br>Disease control rate (DCR) as measured by RECIST v1.1<br>Change in Tumour volume score (TVS)<br>Surgical intervention rate: The number of subjects who undergo surgery during the study for TGCT tumour removal<br>AEs and any laboratory abnormalities |
| To assess the health economic impact of treatment with emactuzumab | Healthcare utilisation<br>Ability to work |
| To assess the PK profile of emactuzumab | PK parameters |

Overall Design. This is a randomised, double-blind, placebo-controlled, parallel-group, multicentre study of emactuzumab in adult and adolescent subjects aged ≥12 years with TGCT.

Approximately 160 subjects will be screened and assessed for eligibility to achieve 135 subjects randomly assigned to study treatment at approximately 55 sites in the European Union (EU) and North America. For sample size determination, refer to section "Interim Analysis".

Double-Blind Phase. After screening, eligible subjects will be randomised in a 2:1 ratio to one of two treatment groups:

Group 1: Subjects receiving emactuzumab 1000 mg (≥40 kg body weight [BW]) or 500 mg (<40 kg BW) administered as iv infusion over 90 minutes, beginning on Day 1 and repeated every 2 weeks for about 10 weeks (5 cycles).

Group 2: Subjects receiving placebo administered as iv infusion over 90 minutes, beginning on Day 1 and repeated every 2 weeks for about 10 weeks (5 cycles).

Randomisation will be done centrally using an Interactive Web Response System (IWRS).

After completing the Double-Blind Treatment Period, safety and efficacy will be followed post-treatment on a monthly basis for 6 months, 3-monthly basis up to 1 year, and thereafter at 18 months and 2 years in the Double-Blind Follow-up Period.

Stratification Factors. Subjects will be stratified in terms of prior pexidartinib use (yes/no). The prior use of pexidartinib stratum will be capped at one third of the total number of subjects required, ie, up to 45 subjects, but no more, will be randomised into this stratum. The no prior use of pexidartinib stratum will therefore have at least 90 randomised subjects so that the distribution of subjects in terms of prior use, yes:no, will be ≤45:≥90. Randomisation will cease when a total of 135 subjects have been randomised into the study. Thus, if the cap of 45 subjects is reached in the prior use stratum, before reaching 90 subjects in the no prior use stratum, randomisation will cease in the prior use stratum and continue only in the no prior use stratum, stopping when a total of 135 subjects have been randomised into the study across the two strata combined.

Open-Label Phase. Study data will stay blinded until the first database lock which will occur once the last subject has passed the 6 months blinded period (Visit 10-3 months treatment and 3 months observation). All follow-up data collected after this time point will be unblinded due to breaking of the study blind for data analysis.

Individual subject unblinding may occur earlier, eg, for safety emergencies, treatment or retreatment with emactuzumab, as described below. For all other study participants (subjects, Investigators, Sponsor) the overall study remains blinded until the last subject has completed Visit 10 (6 months).

Retreatment of Subjects Randomised to Emactuzumab. Subjects who respond based on RECIST v1.1 to initial treatment with emactuzumab during the Double-Blind Phase and then progress (with worsening symptoms and/or objective progressive disease on imaging) within 6-18 months of initial treatment, will be eligible for retreatment in the Open-Label Phase of the study. Retreatment will be at the discretion of the local Investigator following agreement with the Sponsor. A minimum 3-month washout period is included between treatments.

Subjects eligible for retreatment during the Open-Label Phase will be treated and assessed in accordance with the schedule of activities for the Open-Label Phase Treatment Period, which follows the same schedule as the Double-Blind Phase. After completing the treatment period, subjects will enter the Open-Label Phase Follow-up Period. Subjects who do not respond to emactuzumab will not be eligible for retreatment. Subjects are only allowed to be retreated one time.

Change to Open-Label Treatment with Emactuzumab for Subjects Randomised to Placebo. Subjects who progress per RECIST v1.1 and/or have clinically relevant deterioration as assessed by the Investigator, and confirmed by the Medical Monitor at any timepoint during the Double-Blind Phase will be unblinded to determine which group the subject is randomised to.

Subjects randomised to placebo will be eligible for treatment with emactuzumab in the Open-Label Phase. No washout period is required for subjects changing from placebo to emactuzumab.

These subjects will be treated and assessed in accordance with the schedule of activities for the Open-label Phase Treatment Period. After completing the treatment period, subjects will enter the Open-Label Phase Follow-up Period.

The approximate total duration of study participation is up to 2 years for each subject. The study comprises the following periods of participation:
a. Screening: within 14 days prior to randomisation (Screening Visit).
b. Double-Blind Treatment Period: 3 months from Day 1 (Visit 1) to Day 91 (Visit 7/End of Treatment/Early Discontinuation Visit).
c. Double-Blind Follow-up Period: 21 months beginning after Day 91 (Visit 7) to Day 721 (Visit 14/End of Study Visit).

For subjects that are eligible for treatment or retreatment with emactuzumab, the study will include the following additional periods:
d. Open-Label Treatment Period: 3 months from Day 1-ol (Visit 1-ol) to Day 91-ol (Visit 7-ol/End of Treatment/Early Discontinuation Visit).
e. Open-Label Follow-up Period: up to 2 years after randomisation in the Double-Blind Phase (ie, depending on time of subject entry into the Open-Label Phase, subjects may have a longer or shorter follow-up period).

During the study, an unblinded Data Safety Monitoring Board (DSMB) will review study safety listings on a regular basis as defined in the DSMB Charter and will issue a blinded report to the Sponsor, which should confirm whether study treatment should continue at the current dose, or if any safety measures and/or protocol amendments are required. Additionally, although emactuzumab is not expected to cause liver injury, rigorous liver monitoring will be undertaken during the study to establish whether liver injury arises in any treated subjects, to enable early protective intervention should this be needed, to characterise the clinical course and outcome, and to explore causality. Cases of suspected liver injury will be evaluated by appropriate specialists as part of the DSMB review. Details on the DSMB are provided in Section "Committees Structure".

The database will be locked for the primary analysis after the last subject has had their primary endpoint event. A final study analysis will be performed after study completion.

Study Management During the COVID-19 Pandemic. Due to the COVID-19 pandemic additional measures may need to be implemented for reasons which might include a study subject being in self-isolation/quarantine, limited access to public places (including hospitals) due to the risk of spreading infection, and the availability of study staff to perform visits. These challenges could have an impact on the study protocol including the completion of study assessments, study visits or the provision of Investigational Medicinal Products (IMPs). The safety of the study participants is of primary importance.

Actions undertaken due to the COVID-19 pandemic will be proportionate and based on benefit-risk considerations, with priority given to the impact on the health and safety of the study subject. The Sponsor will reassess risks as the situation develops and document any reassessment in the TMF. If an Investigator-driven risk assessment might be necessary, this assessment will be documented in the Investigator's site master file and communicated to the Sponsor.

Any changes to study conduct initiated by the Sponsor will be agreed with and communicated clearly to the Investigators. If there is a need for an Investigator to initiate a change to study conduct because of an urgent safety measure, the change will be reported as soon as possible by the Investigator to the Sponsor. Study subjects will be informed by the Investigator, in a timely manner, about changes in the conduct of the clinical study relevant to them (eg, cancellation of visits, a change in laboratory testing, or delivery of IMP).

Changes in the distribution of the IMP may be necessary to prevent avoidable visits to sites and to provide the study subjects with needed treatments. If it becomes necessary, Sponsors will assess the risks relating to the product and consider any alternative shipping and storage arrangements.

The Sponsor will maintain appropriate records of all changes due to the COVID-19 pandemic that need to be implemented in the study master file. Any necessary mitigating measures will be detailed in an appropriate protocol amendment in accordance with all applicable regulatory requirements.

Scientific Rationale for Study Design. The study will investigate emactuzumab in subjects who are not clinically indicated for surgery and for whom the disease is causing severe morbidity, as documented by clinical assessment from the subject's multidisciplinary health care team. Although TGCT may occur at any age, it is a rare condition and is extremely rare in young children. The study population will therefore be from age 12 years and above. Any severe comorbidity, including liver disease, will render the subject ineligible to enter the study.

Approximately 135 eligible subjects will be randomised to receive either emactuzumab or placebo in a 2:1 ratio for a maximum of 10 weeks. Groups of subjects with pre-existing co-morbidities that would place them at greater risk through participation in the study will be excluded from the study. The level and duration of the emactuzumab dose regimen has been selected based on the Phase I results to maximise the depletion of CSF-1R macrophages, whilst minimising the potential for toxicity. Subjects will be closely monitored throughout the study for safety and efficacy.

By comparing to a placebo control, the current study intends to demonstrate that emactuzumab offers a safe and effective treatment in subjects experiencing TGCT associated with severe morbidity or functional limitations and not amenable to improvement with surgery, including those who have been unsuccessfully treated with other approved and unapproved agents. Given the detrimental impact of the disease to the lives of patients, the early indicators of emactuzumab efficacy and acceptable safety profile based on the identified risks in the monotherapy setting, it is considered clinically appropriate to conduct a Phase III study of emactuzumab in subjects with TGCT. Expected low grade adverse drug reactions (ADRs) associated with the emactuzumab mechanism of action will be managed in accordance with standardised therapeutic guidance set out in the protocol.

Subjects who respond to initial treatment with emactuzumab and then progress within 6-18 months will be eligible for open-label retreatment, allowing an adequate washout period between treatments.

Subjects receiving placebo and progressing at any timepoint during the study will be eligible to change to open-label treatment with emactuzumab; no washout period is required for subjects changing from placebo to emactuzumab. This will provide a mechanism for subjects who were randomised to placebo to receive active drug in the study as well as assessing the utility of repeated therapy.

Justification for Dose. The results of the Phase I study BP27772 concluded that 1000 mg once every 2 weeks (Q2W) was the Optimal Biological Dose for all subjects ≥40 kg and, therefore, the most suitable dose to investigate in the current registration study. At this dose, 100% receptor saturation was achieved.

Dose Reduction for Subjects <40 kg. Emactuzumab was delivered as a flat dose in Phase I/II trials and supported by extensive PK and pharmacodynamic modelling (see IB). This can be broken down to an average dose of 12.5 mg/kg, consequently, a subject of 40 kg would receive a dose of 500 mg. Therefore, the dose will be halved for subjects <40 kg to 500 mg Q2W.

Study treatment will be limited to 5 cycles, because in the Phase I study, higher grade AEs were seen to be emergent from 6 cycles onwards, without significant improvement in response.

For any required dose modifications, see to Section "Dose Modification".

End of Study Definition. The end of the study is defined as the date of the last visit of the last subject in the study. A subject is considered to have completed the study if he/she has completed all periods of the study including the last visit.

Study Population. Prospective approval of protocol deviations to recruitment and enrolment criteria, also known as protocol waivers or exemptions, is not permitted.

Inclusion Criteria. Participants are eligible to be included in the study only if all of the following criteria apply:
1. Written informed consent.
2. Biopsy-confirmed (standard of care diagnosis history) TGCT where surgical resection would be associated with potentially worsening functional limitations, high risk of early recurrence or any other morbidity associated with the surgery.
3. Measurable disease: longest diameter >20 mm.
4. Age >12 years.
5. Adequate organ and bone marrow function: Hb >10.0 g/dL, neutrophils >1.5×109/L and platelets >100×109/L.
6. Women of childbearing potential (WOCBP) must have a negative urine and serum pregnancy test prior to starting treatment. Both WOCBP and men must agree to use a highly effective method of contraception throughout the treatment period and for 5 months after discontinuation of treatment. Acceptable methods of contraception are:
   Hormonal contraception associated with inhibition of ovulation. Oral contraception and parenteral hormonal contraceptives (patches, injectables and implants) that may be affected by enzyme-inducing drugs should only be used in combination with a barrier method.
   Intrauterine device (IUD).
   Intrauterine hormone-releasing system (IUS).
   Bilateral tubal occlusion.
   Vasectomised partner.
   Condom with spermicide.
   Sexual abstinence, in line with the preferred and usual lifestyle of the subject. Periodic abstinence (such as calendar, ovulation, symptothermal, post-ovulation methods) and withdrawal are not acceptable methods of contraception.
All males with partners of childbearing potential or whose partners are pregnant must use barrier contraception for the duration of dosing and for 5 months post-dosing, unless surgically sterile.
7. For Open-Label Phase ONLY: Subjects must either:
   Have responded based on RECIST v1.1 to initial treatment with emactuzumab during the Double-Blind Phase and then progressed (with worsening symptoms and/or objective progressive disease on imaging) within 6-18 months of initial treatment; or
   Have progressed based on RECIST v1.1 at any timepoint during the Double-Blind Phase and received placebo.

Exclusion Criteria. Participants are excluded from the study if any of the following criteria apply:
1. Pregnant or breast feeding.
2. Pre-existing auto-immune conditions requiring systemic treatment. All Lupus Erythematosus are excluded irrespective of treatment.
3. Medical conditions requiring systemic immunosuppression.
4. Pexidartinib, nilotinib, imatinib; other chemotherapy, radiotherapy, or investigational therapy within 4 weeks of Screening.
5. Unresolved clinically significant toxicity from a previous treatment or any history of serious liver toxicity.
6. Current or chronic history of liver disease. This includes, but is not limited to, hepatitis virus infections, drug- or alcohol-related liver disease, nonalcoholic steatohepatitis, autoimmune hepatitis, haemochromatosis, Wilson's disease, α-1 antitrypsin deficiency, primary biliary cholangitis, primary sclerosing cholangitis, or any other liver disease which in the opinion of the Investigator is considered clinically significant.
7. Renal function: Serum creatinine >1.5× upper limit of normal (ULN), or creatinine clearance <60 mL/min (Cockcroft-Gault formula).
8. Liver function: ALT >3.0×ULN; OR total bilirubin >1.5× ULN.

9. Within 6 months of baseline has experienced: clinically significant myocardial infarction, severe/unstable angina pectoris, congestive heart failure New York Heart Association (NYHA) Class III or IV, or pulmonary disease (NYHA Criteria 1994).

10. Clinically significant active infection requiring systemic antibiotic treatment.

Rescreening may occur any time after 7 days post completion of treatment.

11. Systemic antiretroviral therapy within 3 months of baseline.

12. History of malignancy other than TGCT, unless there is the expectation that the malignancy has been cured, and tumour specific treatment for the malignancy has not been administered within the previous 5 years.

13. Planned surgery during the course of the study with the exception of dental treatment.

14. Inability to comply with the study procedures.

15. For the Double-blind Phase ONLY:

Previous exposure to emactuzumab and/or neutralising antibodies.

Participants Receiving a COVID-19 Vaccination. During the study, a subject should advise the study team if they receive an invitation to receive a COVID-19 vaccine as soon as possible and before they receive the vaccine. The study team will inform the study subject of any potential risks associated with receipt of a COVID-19 vaccine—in the context of this study—and if necessary, how the risk(s) will be mitigated.

If a study subject receives a COVID-19 vaccine prior to or during the study, the date and details of the COVID-19 vaccine received will be recorded in the electronic case report form (eCRF) and study visits will continue as planned if possible and appropriate.

If the study participant discontinues or withdraws from the study, the procedures outlined in Section "Participants Discontinuation/Withdrawal from the Study" should be followed.

Lifestyle Considerations. Emactuzumab may induce cutaneous reactions in subjects that include non-specific findings such as pruritus and xerosis, as well as specific dermatologic toxicities including cutaneous lupus and dermatomyositis. To minimise the risk of these toxicities, subjects should be counselled to avoid long, hot showers and harsh soaps and cleansers. Short showers, tepid water and gentle, fragrance free cleansers followed by application of bland, cream or ointment-based emollients are best for decreasing risk of dry skin and itch. Daily application of broad spectrum, high sun protection factor (SPF) sunscreen should be recommended for all exposed areas of skin (face, neck, chest, arms, hand, etc) regardless of season or weather. Physical blockers including zinc oxide and titanium dioxide, provide broad spectrum coverage, but any SPF 30 or greater that also states 'broad spectrum' for ultraviolet A coverage will suffice. This should be reapplied every 2 hours when outdoors for prolonged periods. When possible, sun protective clothing should be worn (including hats) and exposure to direct sunlight avoided (seek shade). Tanning beds and sunbathing should be explicitly avoided. If subjects remain on the study drug for prolonged periods and are vigilant about sun protection, consider checking vitamin D serum levels and supplementing when deficient.

Screen Failures. A screen failure occurs when a participant who consents to participate in the clinical study is not subsequently randomly assigned to study intervention. A minimal set of screen failure information is required to ensure transparent reporting of screen failure participants to meet the Consolidated Standards of Reporting Trials (CONSORT) publishing requirements and to respond to queries from regulatory authorities. Minimal information includes demography, screen failure details, eligibility criteria, and any serious adverse event (SAE).

Subjects who consent to participate and undergo screening procedures (enrolled) but are found to be ineligible for inclusion may be rescreened up to 2 times. Rescreened participants should be assigned a new participant number for every screening/rescreening event.

Study Interventions and Concomitant Therapy. Study intervention is defined as any investigational intervention(s), marketed product(s), placebo, or medical device(s) intended to be administered to a study participant according to the study protocol.

Study Interventions Administered. Emactuzumab is a recombinant, humanised mAb directed against the human CSF-1R molecule and will be presented as a 25 mg/mL sterile, colourless concentrate for infusion, in a single-use 10 mL vial. Each vial contains 250 mg of emactuzumab buffered at pH 6.0, and contains no preservatives. Solution excipients are histidine, trehalose dihydrate, polysorbate 20 and water.

The treatment dose will be 1000 mg for subjects with ≥40 kg BW and 500 mg for subjects with <40 kg BW, administered as iv infusion over 90 minutes, repeated every 2 weeks for a maximum of 10 weeks (5 cycles).

Placebo will be presented as a sterile, colourless concentrate of excipients only, buffered at pH 6.0, in a single-use 10 mL vial. Solution excipients are histidine, trehalose dihydrate, polysorbate 20, and water. The placebo will be administered as iv infusion over 90 minutes, repeated every 2 weeks for a maximum of 10 weeks (5 cycles).

The container closure system consists of a glass vial, stopper, and cap. The vial is a 10 mL, Type I, colourless, borosilicate glass container. The stopper is a 20 mm, butyl rubber fluoro-resin laminated, liquid-type. The cap is a 20 mm, aluminium seal with plastic flip-off cover. The materials of construction meet EU and North American pharmacopoeial standards. Package labels for the IMP will contain information in compliance with FDA 21 CFR 312, and the ICH Q7 Good Manufacturing Practice (GMP) Guideline. IMP supplies will be packaged and labelled by the Sponsor; and provided to Investigators ready for dispensing.

Preparation and Handling. The pharmacist or designee will be unblinded due to the nature of the product. In general, local pharmacy/clinic procedures will be followed for the ordering, preparation and dispensing of IMP as an infusion solution. The infusion volume is 250 mL. Concentrate should be withdrawn aseptically from vials and further diluted in sterile 0.9% (weight/volume [w/v]) sodium chloride solution; prior to administration as an iv infusion at room temperature (18-24° C.). Before adding the appropriate volume of IMP to the infusion bag, the respective volume of 0.9% (w/v) sodium chloride solution is withdrawn from the infusion bag and discarded.

The final IMP solution will be administered intravenously by a continuous rate-controlled (167 mL/hr) pump using an inline 0.2 μm filter, and should be used immediately. The administration set and infusion bag should have low adsorption contact surfaces of polyethylene or polypropylene, in the inline filter product contact surface should be polyethersulphone.

Exposure to direct sunlight should be avoided. The IMP does not contain any preservative, and if not used immediately, in-use storage should not be longer than 4 h at 18-24°

C., or 24 h at 2-8° C. DO NOT SHAKE; AND DO NOT FREEZE VIAL CONTENTS.

The IMP should be inspected visually for particulates prior to administration. If particulates are observed, the bag should be discarded and a replacement IMP kit requested using the central IWRS (see Section "Method of Assigning Subjects to Treatment"). Any IMP quality issues should be recorded in the unblinded drug accountability records.

In the event of accidental spillage, mop or flush the contaminated area with water. Similarly, in case of eye or skin contact, drench with tap water.

Storage. Drug supplies must be stored at 2-8° C. and protected from direct sunlight, in a secure, restricted access area. Regular/continuous temperature monitoring records should be maintained and available for inspection.

Drug Accountability. When a drug shipment is received from the Sponsor, the unblinded pharmacist or designee will check the amount and condition of the IMP, appropriate labelling, and drug expiration date. The unblinded pharmacist or designee will then document receipt and condition in the IMP Shipment Inventory. If there is a problem with the shipment, the unblinded pharmacist or designee should notify the unblinded Clinical Monitor as soon as possible.

A Drug Accountability Record must be kept current and should contain: the dates and quantities of drug received at site as study supplies; subject level dispensing details including Treatment Number, event date, product name, and quantity of units dispensed. All records will be reviewed by the unblinded Clinical Monitor.

At the end of the study, or as directed, all unused vials of IMP will be returned to a designee as instructed by the Sponsor. IMP will be returned only after the unblinded Clinical Monitor has completed a final inventory to verify the quantity to be returned. The return of IMP must be documented, and the documentation included in the shipment. At the end of the study, a final Investigational Product reconciliation statement must be completed by the Investigator or designee and provided to the Sponsor.

All Drug Accountability documents as described above must be made available on request for inspection by a Sponsor representative or designee and regulatory agency inspectors. The Investigator is responsible for the accountability of all used and unused study supplies at the site.

Measures to Minimise Bias: Randomisation and Blinding. Investigators will maintain a Subject Identification Log of all consented study candidates that includes the subject's name, and clinic identification details. On providing written informed consent, subjects will be considered enrolled, and assigned a Subject Identification Number. This Subject Identification Number will also be recorded on the Subject Identification Log. The Subject Identification Log will not be copied or removed from the site by the Sponsor or designees.

The Investigator will separately maintain a Screening Log of all consented subjects including Subject Identification Number, date of consent, and outcome of the screening process (ie, enrolled in the study, reason for ineligibility, refusal to participate etc).

Method of Assigning Subjects to Treatments. Study treatment will be assigned centrally using an IWRS. This will be designed to ensure random 2:1 assignment across the study, to either emactuzumab or placebo (randomisation).

Following successful completion of the Screening evaluations, at the randomisation visit (Visit 1/Day 1) the Investigator will contact the IWRS, and enter site and subject details. The IWRS will then assign a blinded Treatment Number. A hard copy of the randomisation report should be retained in the subject's study records.

The Investigators will maintain an Enrolment Log showing informed consent date, Subject Identification Number, Treatment Number and study withdrawal/completion date. This, in combination with the Subject Identification Log, allows the Investigator to link an IMP to the identity of any subject when necessary.

Treatment Blinding Codes & Unblinding. The first part of this study, the Double-Blind Phase, will be performed in a double-blind fashion. The subjects, Investigator, and Sponsor (or designee) staff will remain blinded to the treatment assignment until the first database lock of the study. The IMP and the placebo are not indistinguishable, therefore an independent unblinded team will be in place.

Pre-study: an independent Statistician, who will not be involved in the decision-making, conduct, or analysis of the study, will computer-generate a random scheme of treatment allocations, and assign code numbers to each. The IMPs will be labelled accordingly with the code number only, and the randomisation codes programmed into the IWRS.

The randomisation code list is kept strictly confidential during the clinical phase. It will normally be accessible only to authorised persons who are not involved in the conduct of the study (eg, DSMB). The randomisation code list will otherwise be kept secure.

The blind should be broken for site staff only on a case-by-case basis. In such cases the Principal Investigator should contact the Medical Monitor and discuss the case. If the Sponsor agrees the unblinding is justified, the Medical Monitor will access the IWRS, and request the treatment assignment is sent to the Investigator. The Study Statistician should be informed that a specified code has been released for safety reasons, but not informed of the identity of the associated treatment.

The reasons for breaking the blind are:
Medical emergencies if specific emergency treatment would be dictated by knowing the study medication status of the subject.
Change to open-label treatment with emactuzumab for subjects randomised to placebo.
Disease progression after initial response for subjects randomised to emactuzumab (retreatment).

The Study Pharmacovigilance staff will perform unblinding for regulatory reporting of suspected unexpected serious adverse reactions (SUSARs). The information will be maintained securely and only blinded SUSAR information will be shared with blinded Sponsor team members and site staff.

Formal unblinding of all subject treatments will take place once hard database lock procedures have been completed. The Study Statistician will then release the randomisation list for the purpose of presenting study results, and any associated analyses.

Study Intervention Compliance. Subjects will receive study intervention directly from the Investigator or designee, under medical supervision. IMP infusion timings and dates, and counts of used dose units will be recorded for each subject in the Drug Accountability Log. These will be used to calculate apparent drug compliance. This information will also be entered in the eCRF. Any gross non-compliance with the prescribed treatment regimen will be discussed with the Medical Monitor.

Dose Modification. All subjects will be carefully monitored for toxicity as described in Section "Adverse Events (AEs), Serious Adverse Events (ASEs) and Other Safety Reporting, and doses will be modified as necessary to accommodate individual subject tolerance to therapy. No more than 2 dose delays will be permitted (including 2 adjacent dose delays). Details on temporary discontinuation of IMP and rechallenge due to skin-related toxicities and liver abnormalities are described in Section Temporary discontinuation.

Retreatment Criteria. All subjects entered into the study will be treated beginning on Day 1 and repeated every 2 weeks for a maximum of 10 weeks (5 cycles). A subject may receive additional study interventions in the Open-Label Phase if they meet the following criteria as determined by the Investigator and agrees to be treated. Study intervention on a per subject basis will be unblinded at the start of the Open-Label Phase:

Retreatment of subjects randomised to emactuzumab:
Subjects who respond to initial treatment with emactuzumab during the Double-Blind Phase and then progress (with worsening symptoms and/or objective progressive disease on imaging) within 6-18 months of initial treatment.

Change to open-label treatment with emactuzumab for subjects randomised to placebo:
Subjects who progress (with worsening symptoms and/or objective progressive disease on imaging) at any timepoint during the Double-Blind Phase and are receiving or received placebo, as determined after unblinding. Refer to Section "Overall Design" for more details.

Continued Access to Study Intervention after the End of the Study. Continued access to study intervention is not planned after study end.

Treatment of Overdose. For this study, any dose greater than 1000 mg/day (≥40 kg) or 500 mg/day (<40 kg) within the specified infusion schedule will be considered an overdose.

There is no known antidote to emactuzumab, however doses of up to 3000 mg have been safely administered in subjects in previous studies. In the event of an overdose, the Investigator should:

Contact the Medical Monitor immediately, who will seek further advice from the Sponsor Chief Medical Officer as required.

Evaluate the participant to determine, in consultation with the Medical Monitor, whether study intervention should be interrupted or whether the subsequent dose should be modified.

Closely monitor the participant for any AE/SAE and laboratory abnormalities until resolution.

All planned or unexpected dose modifications, including overdosing, underdosing or changes in frequency, should be recorded in the eCRF. Planned dose modifications are not permitted outside of the defined safety management criteria unless discussed with the Medical Monitor.

Document the quantity of the excess dose as well as the duration of the overdose.

Concomitant Therapy. Any medication or vaccine (including COVID-19 vaccine, over-the-counter or prescription medicines, recreational drugs, vitamins, and/or herbal supplements) or alternative or complementary treatments that the participant is receiving at the time of enrolment or receives during the study must be recorded in the eCRF along with:

Reason for use.
Dates of administration including start and end dates.
Dosage information including dose and frequency.

The Medical Monitor should be contacted if there are any questions regarding concomitant or prior therapy.

Subjects cannot receive pexidartinib, nilotinib, imatinib, or any other concomitant chemotherapy, immune-suppressants, radiotherapy, or other investigational therapy while participating in this study. Concomitant use of dietary supplements, medications not prescribed by the Investigator, and alternative or complementary treatments is discouraged.

Specifically, Table 9 presents the standardised approaches that should be adopted for management of expected ADRs.

TABLE 9

Management of Dermatological Adverse Events

| Event | Grade | Treatment |
|---|---|---|
| Periorbital oedema | Grade 1 (Soft, non-pitting) | Cool compresses |
| | Grade 2 (Indurated or putting oedema; topical intervention indicated) | Topical hydrocortisone 1-2.5%, 0.25% phenylephrine. If persistent Grade 2, add oral diuretics, consider referral to an ophthalmologist for further examination. |
| | Grade 3 (oedema associated with visual disturbance, increased intraocular pressure, glaucoma or retinal haemorrhage; optic neuritis; diuretics indicated; operative intervention indicated | As in Grade 2, consider oral steroids |
| Dermatologic reactions/ skinrash | Grade 0 (Prevention) | Daily high SPF, broad spectrum sunscreen on exposed skin; sun protective clothing and sunavoidance. |
| | Grade 1 Mild (<10% body surface area [BSA] with or without symptoms) | Topical steroids, oral antihistamines ifpruritic. For focal lesions, consider intralesional steroids |
| | Grade 2 Moderate (10-30% BSA) With or without symptoms; limiting instrumental activities of daily living (ADLs): Rash >30% with or without mild symptoms | As in Grade 1, increase potency of topical steroids. Consider dermatology consultation and biopsy for classification. For persistent Grade 2 reactions lasting greater than 4 weeks despite intervention, initiate |

TABLE 9-continued

Management of Dermatological Adverse Events

| Event | Grade | Treatment |
|---|---|---|
| | Grade 3 Severe (>30% BSA) With moderate or severe symptoms; limiting self-care ADL | dermatologic disease specific interventions* As in Grade 2; Consult dermatology. Consider systemic steroids 0.5-1 mg/kg perday tapered over 10-14 days. If flares with initial taper of steroids, slow taper and add dermatologic disease specific intervention* |
| | Grade 4 Life threatening | Admission, dermatology consultation |
| Pruritus | Grade 0 (Prevention) | Bland emollients; tepid showers; gentle cleansers |
| | Grade 1 Mild or localised; topical intervention indication | Liberal bland emollients; topical steroids if focal pruritis; oral antihistamines |
| | Grade 2 Moderate; widespread and intermittent; skin changes from scratching; oral intervention indicated; limiting instrumental ADLs; oral intervention indicated | As in Grade 1 Maximise oral antihistamines and topical steroids. Add oral gaba agonist and titrate. If persistent Grade 2, consider oral prednisone 0.5 mg/kg equivalent tapered over 10-14 dayswhile initiating next itch specific intervention. Consider doxepin, naltrexone, aprepitant depending on comorbidities. |
| | Grade 3 Severe; Widespread and constant; limiting selfcare ADLs or sleep; systemic therapy indicated | As in Grade 2; Initiate prednisone 0.5 mg/kg prednisone tapered over 10-14 days while initiating itch specific interventions including gaba agonist/doxepin/naltrexone/apr epitant. While UVB can be beneficial for pruritus, this should be used with extreme caution, given photosensitivity concerns with this agent. |

*When present, for persistent Grade 2 or Grade 3 reactions, disease specific interventions should be considered. Specifically, if sun avoidance and topicals are insufficient for improving Grade 2 cutaneous lupus or Grade 3 reactions flare with initial taper of oral steroids, hydroxychloroquine should be added if not otherwise contraindicated and the subject and Investigator feel it is in the subject's best interest to remain on study. Additional immunosuppression should be considered in collaboration with dermatology and/or rheumatology ona case-by-case basis. For foci of discoid lupus, intralesional steroids can be initiated in place of systemic steroids for persistent lesions.

Discontinuation of Study Intervention. The decision to discontinue IMP for an individual subject will be based on the subject's response (response and toxicity) to study treatment. The Investigator is encouraged to consult with the Medical Monitor where possible before discontinuing a subject from IMP.

The Investigator will record any discontinuations from IMP, together with the reason for the decision. IMP may be discontinued for any of the following reasons:

Adverse event (including any SAEs), clinically significant AE, severe laboratory abnormality, intercurrent illness, or other medical condition) that indicates to the Investigator that continued participation is not in the best interest of the subject. This includes treatment-emergent toxicity requiring >2 doses delays.

Investigator discretion in case of occurrence of any medical condition, requirement for prohibited concomitant medication or treatment, or circumstances that would not allow the subject to adhere to protocol requirements (eg, need for therapy to alleviate pain or local symptoms associated with an existing lesion).

Pregnancy.

Progressive disease.

Surgical intervention for TGCT will result in the discontinuation of treatment.

When subjects discontinue IMP an early discontinuation visit (Visit 7 during Double-Blind Phase or Visit 7-ol during Open-Label Phase) will be performed according to the section "Schedule of Activities (SoA)" and they will remain on study for the Follow-up Period unless they specifically withdraw their consent to continue follow up.

Temporary Discontinuation. No more than 2 dose delays will be permitted (including 2 adjacent dose delays).

Temporary Discontinuation due to Dermatological Events. As has been previously discussed, the side effect profile of emactuzumab suggests that it is very well tolerated, and main toxicity is skin related. IMP can be temporarily discontinued due to toxicities according to the guidelines in Table 10.

A new cycle of therapy should not begin until resolution of the toxicity to less than or equal to Grade 1 status.

TABLE 10

Guidelines for Drug Dose Discontinuation and Rechallenge for Dermatology

| Event | Grade | Course of Action |
|---|---|---|
| Periorbital oedema | Grade 1 (Soft, non-pitting) | No change |
| | Grade 2 (Indurated or putting oedema; topical intervention indicated) | No change |
| | Grade 3 (oedema associated with visual disturbance, increased intraocular pressure, glaucoma or retinal haemorrhage; optic neuritis; diuretics indicated; operative intervention indicated | Hold until Grade 1, consider re-challenge with close ophthalmology follow-up and ophthalmologic disease specific interventions in place |
| Dermatologic reactions/ skinrash | Grade 1 Mild (<10% body surface area [BSA] with or without symptoms) | No change |
| | Grade 2 Moderate (10-30% BSA) With or without symptoms; limiting instrumental activities of daily living (ADLs): Rash >30% with or without mild symptoms | No change required; For persistent Grade 2 reactions that do not respond to initial interventions within 4 weeks, hold drug until Grade 1, consider dermatology consultation and dermatologicdisease specific intervention. Resume at fulldose with dermatology follow-up |
| | Grade 3 Severe (>30% BSA) With moderate or severe symptoms; limiting self-care ADLs | Hold until Grade 1. Resume drug at full dose with close dermatology follow-up |
| | Grade 4 Life threatening | Discontinue |
| Pruritus | Grade 1 Mild or localised; topical intervention indication | None |
| | Grade 2 Moderate; widespread and intermittent; skin changes from scratching; oral intervention indicated; limiting instrumental ADLs; oral intervention indicated | None |
| | Grade 3 Severe; Widespread and constant; limiting selfcare ADLs or sleep; systemic therapy indicated | Hold until Grade 1, resume at full dose with pruritus specific interventions in place |

Temporary Discontinuations due to Liver Abnormalities. In case of liver abnormalities, IMP can be temporarily discontinued due to toxicities according to the guidelines in Table 11.

In addition to routine liver monitoring at the scheduled timepoints, see section "Schedule of Activities (SoA)", the following clinical signs and symptoms should be considered for further liver investigations, as appropriate, including: anorexia, nausea, vomiting, fatigue, right upper abdominal discomfort and itching.

In all cases of suspected or confirmed liver toxicity, other potential underlying causes should be investigated (infectious agents, concomitant drugs, nonalcoholic steatohepatitis, hepatobiliary obstruction etc) and eliminated as appropriate.

TABLE 11

Liver Monitoring and Course of Action

| Liver Abnormality | Clinical Monitoring | Course of Action |
|---|---|---|
| ALT ≥3 × ULN | Prompt repeat testing to confirm the abnormality, determine whether values are increasing or decreasing and assess clinical symptoms. Regular re-testing and monitoring until values return to normal ranges | No treatment pause initially Treatment pause if values continue to be ≥3 × ULN Discontinue treatment if more than 2 consecutive doses are missed |
| ALT ≥3 × ULN with theappearance of fatigue, nausea, vomiting, right upper quadrant pain or tenderness, fever, rash, and/or eosinophilia (>5%) | Prompt repeat testing to confirm the abnormality, determine whether valuesare increasing or decreasing and further assess clinical symptoms Regular re-testing and monitoring untilvalues return to normal ranges and clinical signs and symptoms have improved | Pause treatment Discontinue treatment if more than 2 consecutive doses are missed. |
| ALT ≥3 × ULN and total Bilirubin >2 × ULN | Prompt repeat testing to confirm the abnormality, determine whether values are increasing or decreasing and further assess clinical symptoms Regular re-testing and monitoring untilvalues return to normal ranges | Pause treatment Discontinue treatment if re-testing confirms ALT ≥3 × ULN and total Bilirubin >2 × ULN |
| ALT ≥5 × ULN for more than 2 weeks | Regular re-testing and monitoring until values return to normal ranges | Pause treatment |
| ALT ≥8 × ULN | Regular re-testing and monitoring until values return to normal ranges | Discontinue treatment |

Rechallenge. Rechallenge after temporary discontinuation of IMP due to dermatological toxicities and/or liver stopping criteria will be performed according to the guidelines described in Section "Temporary Discontinuation". Only 1 rechallenge is allowed.

Participant Discontinuation/Withdrawal from the Study. A subject may withdraw from the study at any time at his/her own request or may be withdrawn at any time at the discretion of the Investigator for safety, behavioural, or compliance reasons. This is expected to be uncommon.

The subject will be permanently discontinued from the study if the study is terminated by the Sponsor or regulatory authorities.

At the time of discontinuing from the study, if possible, an early discontinuation visit (Visit 7 during Double-Blind Phase or Visit 7-ol during Open-Label Phase) should be conducted, as shown in the "Schedule of Activities (SoA) section, see SoA for data to be collected at the time of study discontinuation and follow-up and for any further evaluations that need to be completed. The Investigator will complete and report the observations as thoroughly as possible up to the date of withdrawal, including the date of last treatment, and the reason for withdrawal.

If the subject is withdrawn due to an AE, the Investigator will make every effort to follow the subject until the AE has resolved or stabilised. The subject will be permanently discontinued from the study intervention and the study at that time. If the subject withdraws consent for disclosure of future information, the Sponsor may retain and continue to use any data collected before such a withdrawal of consent. If a subject withdraws from the study, they may request destruction of any samples taken and not tested, and the Investigator must document this in the site study records. Subjects who are withdrawn prior to receiving IMP will be replaced by other subjects. Subjects enrolled to treatment who discontinue prematurely will not be replaced.

Lost to Follow up. A participant will be considered lost to follow-up if they repeatedly fail to return for scheduled visits and is unable to be contacted by the study site.

The following actions must be taken if a participant fails to return to the clinic for a required study visit:

The site must attempt to contact the participant and reschedule the missed visit as soon as possible, counsel the participant on the importance of maintaining the assigned visit schedule, and ascertain whether the participant wishes to and/or should continue in the study.

Before a participant is deemed lost to follow-up, the Investigator or designee must make every effort to regain contact with the participant (where possible, 3 telephone calls, and if necessary, a certified letter to the participant's last known mailing address or local equivalent methods). These contact attempts should be documented in the participant's medical record.

Should the participant continue to be unreachable, they will be considered to have withdrawn from the study.

Study Assessments and Procedures

Study procedures and their timing are summarised in the SoA, see Section "Schedule of Activities (SoA)". Protocol waivers or exemptions are not allowed.

Immediate safety concerns should be discussed with the Sponsor immediately upon occurrence or awareness to determine if the subject should continue or discontinue study intervention.

Adherence to the study design requirements, including those specified in the SoA, is essential and required for study conduct.

All screening evaluations must be completed and reviewed to confirm that potential participants meet all eligibility criteria. The Investigator will maintain a screening log as detailed in Section "Measures to Minimise Bias: Randomisation and Blinding".

Procedures conducted as part of the participant's routine clinical management (eg, blood count) and obtained before signing of the ICF may be utilised for screening or baseline purposes provided the procedures met the protocol-specified criteria and were performed within the timeframe defined in the SoA.

Anti-drug antibody (ADA) results that could unblind the study will not be reported to investigative sites or other blinded personnel until the study has been unblinded.

Additional visits (unscheduled visits) can be performed as appropriate and at the discretion of the Investigator. Testing may include any previously described assessment including timed pharmacokinetics.

Repeat or unscheduled samples may be taken for safety reasons or for technical issues with the samples.

Efficacy Assessments. Planned timepoints for all efficacy assessments are provided in the SoA Section "Schedule of Activities (SoA)". All assessments will be performed prior to study drug administration unless otherwise specified.

Primary Efficacy Variable. Magnetic Resonance Imaginq (MRI) Scan. Scanning should be with contiguous slices sized <5 mm.

Scan parameters, equipment, and procedures may follow local institution standard operating procedures (SOPs), but should be kept consistent between follow-up assessments. Further information regarding MRI scanning and review are provided in the Imaging Manual.

Disease Measurement. A target lesion at the diseased joint or tendon will be followed from Baseline for serial measurement. This should have its longest diameter ≥20 mm. Tumour assessments will be made on the longest diameter (LD) for the target lesion.

If during the study the lesion becomes too small to measure, a default value of 5 mm should be assigned. If the lesion disappears completely, the lesion should be recorded as 0 mm.

Response to treatment will be determined from serial radiographic LD measurements made in accordance with the SoA. Classification will be by use of RECIST v1.1 (Eisenhauer et al., 2009). Observed disease response (PR, CR) will be based on the best centrally adjudicated, single time-point tumour assessment.

Independent Response Confirmation. Blinded, pseudonymised, MRI image digital data will be uploaded by the Investigator to a central Independent Radiology Review website. The data will then be evaluated by two separate blinded reviewers, who identify lesions, measure, track, and rate for response.

Key Secondary Efficacy Variables. Patient-Reported Outcomes Measurement Information System (PROMIS). Developed from a 5-year National Institutes for Health collaborative initiative, the Physical Function Scale is one of a group Patient-Reported Outcomes Information System instruments. It is a self-assessed measure of capability (rather than actual performance) in the dimensions of Coordination; Functional Mobility; Strength; and Upper Extremity Function.

Raw score totals are normalised by reference to US population metrics, to generate a standardised T-score with a mean of 50, and a standard deviation of 10. A higher T-score reflects higher better physical function and a lower T-score reflects worse physical function. A 3-point change in score has been reported to have implications for a patient's physical functioning in the population (Rose et al., 2014; HealthMeasures, 2021).

The PROMIS Physical Function Scale has been validated in TGCT subjects, and the Short Form version will be used as a quality of life instrument in the study (Gelhorn et al., 2019).

For paediatric subjects, the PROMIS Paediatric and Parent-proxy Mobility and Upper Extremity Scale will be used.

The assessment will be made by the subject on a form provided by the Investigator; the Investigator is to assure that the subject has completed the form and that no multiple answers are given. The data will be entered in the clinical database by the responsible data manager.

Secondary Efficacy Variables. Other Patient-Reported Outcomes, Pain and Quality of Life Measurements. Healthcare Professional (HCP)-Reported Joint Mobility Score. An HCP-reported joint range of motion score (by goniometry) will be used as a quantitative measure of disease status, in accordance with the SoA. The data will be documented by the Investigator in the subject's medical file and recorded in the eCRF.

*Worst Pain Numerical Rating Score (NRS).* Worst Pain NRS assesses subject-reported pain ranging from 0 (no pain) to 10 (pain as bad as you can imagine). It is recommended by industry guidelines from a consortium of pain specialists (//world-wide-web.immpact.org/) and is widely used in clinical trials to measure pain severity. Using a separate NRS item allows this to be administered in line with industry best practices for electronic assessment of this measure.

The assessment will be made by the subject on each of the 7 days preceding the clinic visit, using a diary. The Investigator is to assure that the subject has completed the diary and that no multiple answers are given. The data will be entered in the clinical database by the responsible data manager.

*Short Form 12-Item Survey version 2 (SF-12 v2).* The SF-12 v2 measures 8 quality of life domains: physical functioning, role physical, bodily pain, general health, vitality, social functioning, role emotional and mental health. Two summary components are calculated: Physical Component Summary (PCS) and Mental Component Summary (MCS). General population norms are available for comparison.

The SF-12 has previously been used in a longitudinal clinical study of TGCT. In this study both summary scores changed over time: there was a clinically relevant decline in PCS in the overall sample, and MCS scores declined in females and those who experienced a recurrence of TGCT, suggesting that the measure is responsive to change in this population (which included subjects with localised and diffuse TGCT) (Mastboom et al., 2018). The SF-36 (from which the SF-12 was developed) has been used in a longitudinal study of TGCT and detected clinically relevant change over time (Verspoor et al., 2019).

The SF-12 has been used in adolescents (Lin et al., 2020; Tong et al., 2013). A study comparing SF-12 and SF-36 in adolescents in China found that the SF-12 performed as well as the SF-36, if not better. However, 2 domains (bodily pain and social functioning) were highlighted as potentially not easy for teenagers to understand.

Self-assessment will be made by the subject on a form provided by the Investigator; the Investigator is to assure that the subject has completed the form and that no multiple answers are given. The data will be entered in the clinical database by the responsible data manager.

*Worst Stiffness NRS.* Worst Stiffness NRS assesses worst stiffness ranging from 0 (no stiffness) to 10 (stiffness as bad as can be imagined). The assessment will be made by the subject on a form provided by the Investigator; the Investigator is to assure that the subject has completed the form and that no multiple answers are given. The data will be entered in the clinical database by the responsible data manager.

*EuroQoL 5-Dimension 5-Level Questionnaire (EQ-5D-5L).* The 5-level version of the EuroQol Group 5-dimensional, 5-level QoL questionnaire will be used as a patient-reported measure of general health and well-being. The EQ-5D-5L consists of 2 pages: the EQ-5D descriptive system and the EQ visual analogue scale (EQ-VAS).

The descriptive system comprises 5 dimensions: mobility, self-care, usual activities, pain/discomfort and anxiety/depression. Each dimension has 5 levels: no problems, slight problems, moderate problems, severe problems and extreme problems. The subject is asked to indicate his/her health state by ticking the box next to the most appropriate statement in each of the 5 dimensions. This decision results in a 1-digit number that expresses the level selected for that dimension. The digits for the 5 dimensions can be combined into a 5-digit number that describes the subject's health state (Janssen et al., 2013).

The EQ VAS records the subject's self-rated health on a vertical visual analogue scale, where the endpoints are labelled 'The best health you can imagine' and 'The worst health you can imagine'. The VAS can be used as a quantitative measure of health outcome that reflect the subject's own judgement (Stolk et al., 2019).

The EQ-5D-5L is available in more than 130 languages, and has been validated in the TGCT Observational Platform Project (Palmerini et al., 2020).

The assessment will be made by the subject on a form provided by the Investigator; the Investigator is to assure that the subject has completed the form and that no multiple answers are given. The data will be entered in the clinical database by the responsible data manager.

Antitumour Activity. Duration of Response. DoR will be measured from the date of first record of RECIST v1.1 response until tumour progression is recorded.

Disease Control Rate. The DCR will be calculated as the combined percentage of subjects who have achieved CR, or PR, or SD per RECIST v1.1.

Tumour Volume Score (TVS). One difference with handling of benign TGCT data (both RECIST v1.1 and TVS) is that unlike for malignant tumours, multifocal, non-target and new lesions are not present, so the data for TGCT remains continuous rather than becoming nominal.

Given the asymmetrical pattern of change most commonly seen with TGCT, the TVS threshold for progressive disease (PD) is more sensitive for progression than the RECIST v1.1 and the TVS threshold for PR is less sensitive for improvement than the RECIST v1.1. This makes the discriminative power observed with TVS a useful measure.

As a secondary disease measurement, the relative volume of the lesion at the diseased joint or tendon will be followed from Baseline using TVS, which estimates the volume of the tumour relative to that of the synovial cavity of the diseased joint or tendon in 10% increments.

Surgical Intervention. Surgical interventions as a result of tumour reduction (of any magnitude) will be documented by the Investigator in the subject's medical file and recorded in the eCRF.

Safety Assessments. Planned timepoints for all safety assessments are provided in the SoA, Section "Schedule of Activities (SoA)". All assessments will be performed prior to study drug administration unless otherwise specified, however, adverse events occurring during or post infusion will also be captured.

Physical Examinations. The subject's general physical condition, height, and weight will be assessed according to the SoA. Complete physical examinations will evaluate the following body systems/organs: general appearance; dermatological; head and eyes; ears, nose, mouth, and throat; pulmonary; cardiovascular; abdominal; genitourinary (optional); lymphatic; musculoskeletal/extremities; and neurological. Targeted physical examinations will be guided by any signs or symptoms previously identified or any new symptoms that the subject has experienced since the last visit.

Information on the physical examination must be included in the source documentation at the site. Any significant findings will be recorded by the Investigator in the eCRF.

Vital Signs. Vital signs will be measured after 5 minutes rest and will include temperature (° C.), systolic and diastolic blood pressure (mmHg), heart rate (bpm), and respiratory rate (breaths per minute). All vital sign readings will be documented by the Investigator in the eCRF.

Electrocardiograms. 12-lead electrocardiogram (ECG) measurements will be taken throughout the study. Automated diagnostic reads will be accepted for determining any clinically significant changes from the pre-treatment assessments. All laboratory reports should be reviewed and signed by the Investigator. Results which are recorded as abnormal should be annotated by the Investigator as being "clinically significant", or "not clinically significant". Worsening from the baseline status should be considered as an AE, and reported as described in Section "Adverse Events (AEs), Serious Adverse Events (SAEs), and Other Safety Reporting".

ECG changes of Common Terminology Criteria for Adverse Events (CTCAE) Grade 3 or 4 occurring during the clinical study will be repeated, and followed until test results return to normal (or baseline), stabilise, or are no longer clinically significant.

Clinical Safety Laboratory Tests. The clinical laboratory safety parameters listed below will be monitored throughout the study. Analysis will be at a Good Laboratory Practice accredited laboratory, in accordance with the Study Laboratory Procedures Manual.

- Full Blood Count: Red blood cell count, haemoglobin, haematocrit, platelet count, white blood cell count with absolute differential.
- Serum Biochemistry: sodium, potassium, magnesium, urea, creatinine, total protein, albumin, glucose, CPK, bilirubin, alkaline phosphatase (ALP), ALT, AST, calcium, phosphate, amylase and LDH.
- Urine: protein, glucose, occult blood, ketones.
- All laboratory reports should be reviewed and signed by the Investigator. Results which are outside the limit of normal (laboratory ranges) should be annotated by the Investigator as being "clinically significant", or "not clinically significant". Worsening from the Baseline status should be considered as an AE and reported as described in Section "Adverse Events (AEs), Serious Adverse Events (SAEs), and Other Safety Reporting".

Laboratory values of CTCAE Grade 3 or 4 occurring during the clinical study will be repeated and followed until test results return to normal (or baseline), stabilise, or are no longer clinically significant.

- All out of range laboratory tests during participation in the study should be recorded, with values assessed as clinically significantly abnormal or not by the Investigator. All clinically significant out of range values should be followed until return to normal or baseline, or are no longer considered clinically significant by the Investigator or Medical Monitor.
- If clinically significant values do not return to normal/baseline within a period of time judged reasonable by the Investigator, or within the timeframes specified for liver elevations in Table 11, the aetiology should be identified, and the Sponsor notified.
- If laboratory values from non-protocol-specified laboratory tests performed at the institution's local laboratory require a change in participant management or are considered clinically significant by the Investigator (eg, SAE or AE or dose modification), then the results must be recorded along with any associated investigations or diagnoses.
- Special attention should be given to liver enzyme function tests, where the pre-defined criteria for treatment pause and permanent discontinuations should be followed.
- Protocol-specific requirements for inclusion or exclusion of participants are detailed in Section "Study Population" of the protocol.
- Additional tests may be performed at any time during the study as determined necessary by the Investigator or required by local regulations.

Pregnancy Testing. Refer to Section "Inclusion Criteria" for pregnancy testing entry criteria. Pregnancy testing (urine or serum as required by local regulations) should be conducted according to the SoA during treatment and at the end of relevant systemic exposure.

Additional serum or urine pregnancy tests may be performed, as determined necessary by the Investigator or required by local regulation, to establish the absence of pregnancy at any time during the subject's participation in the study.

Anti-drug Antibody (ADA). Serum ADA to emactuzumab will be monitored throughout the study, according to the SoA, including at the final visit and for subjects who discontinued study intervention or were withdrawn from the study. Serum samples will be collected prior to study drug administration.

Emactuzumab ADA will be measured using validated assays. Samples may be stored following the last subject's last visit for the study at a facility selected by the Sponsor to enable further analysis of immune responses to emactuzumab.

The results of ADA laboratory analyses will not be reported to the Investigators or blinded Sponsor representatives until after the study blind is formally broken, following database lock. Nevertheless, ADA data may be used for safety evaluation by the DSMB, or where required during individual subject emergency unblinding.

Adverse Events (AEs), Serious Adverse Events (SAEs), and Other Safety Reporting. Safety will be monitored and assessed by AEs/SAEs. AEs may be identified by the Investigator and/or the subject (or, when appropriate, by a caregiver, surrogate, or the subject's legally authorised representative). The Investigator and any qualified designees are responsible for detecting, documenting, and recording events that meet the definition of an AE or SAE and remain responsible for following up all AEs (see Section "Discontinuation of Study Intervention and Participant Discontinuation/Withdrawal"). All types of AE should be recorded in the study records and eCRF.

The Investigator will follow up the subject in accordance with the SoA. All AEs and SAEs will be collected from the signing of the informed consent form (ICF) until the final visit at the timepoints specified in the SoA (see Section "Schedule of Activities (SoA)). All SAEs will be recorded and reported to the Sponsor or designee immediately and under no circumstance should this exceed 24 hours. The Investigator will submit any updated SAE data to the Sponsor within 24 hours of it being available. Investigators are not obligated to actively seek information on AEs or SAEs after conclusion of the study participation. However, if the Investigator learns of any SAE, including a death, at any time after a participant has been discharged from the study, and he/she considers the event to be reasonably related to the study intervention or study participation, the Investigator must promptly notify the Sponsor.

Method of Detecting AEs and SAEs. Care will be taken not to introduce bias when detecting AEs and/or SAEs. Open-ended and nonleading verbal questioning of the participant is the preferred method to inquire about AE occurrences.

Follow-up of AEs and SAEs. The Investigator should follow a subject with an adverse event until the event has resolved or the condition has stabilised, the event is otherwise explained, or the participant is lost to follow-up (as defined in Section "Lost Follow Up").

Regulatory Reporting Requirements for SAEs.

Prompt notification by the Investigator to the Sponsor of an SAE is essential so that legal obligations and ethical responsibilities towards the safety of participants and the safety of a study intervention under clinical investigation are met.

The Sponsor has a legal responsibility to notify both the local regulatory authority and other regulatory agencies about the safety of a study intervention under clinical investigation. The Sponsor will comply with country-specific regulatory requirements relating to safety reporting to the regulatory authority, institutional review boards (IRBs)/independent ethics committees (IECs), and Investigators.

An Investigator who receives an Investigator safety report describing an SAE or other specific safety information (eg, summary or listing of SAEs) from the Sponsor will review and then file it along with the IB and will notify the IRB/IEC, if appropriate according to local requirements.

Investigator safety reports must be prepared for SUSARs according to local regulatory requirements and Sponsor policy and forwarded to Investigators as necessary.

Pregnancy. The Sponsor must be immediately notified of any subject, or subject's partner who becomes pregnant while participating in a clinical study, or within 5 months of last dose. Pregnancy should be reported on the paper Pregnancy Report Form and sent to Clinipace Pharmacovigilance within 24 hours of awareness.

If it is the partner, rather than the subject, that is pregnant, the Pregnancy Report Form should be completed with the subject's study identifiers. Details regarding the partner (after obtaining the necessary signed informed consent from the female partner) should be entered in the Additional Relevant Information section of the Pregnancy Report Form.

The Investigator should make every effort to follow the subject/partner until completion of the pregnancy. If the pregnancy ends for any reason before the anticipated date, the Investigator should notify the Sponsor. At the completion of the pregnancy, the Investigator will document the outcome of the pregnancy, including an assessment of the apparent 'normality' of the infant, in the subject's medical records.

While pregnancy itself is not considered to be an AE or SAE, any pregnancy complication or elective termination of a pregnancy for medical reasons will be reported as an AE or SAE.

If the outcome of the pregnancy meets the SAE criteria (ie, post-partum complications, spontaneous abortion, stillbirth, neonatal death, or congenital anomaly, including that in an aborted foetus), the Investigator should report this as an SAE.

Any female participant who becomes pregnant while participating in the study will discontinue study intervention or be withdrawn from the study.

Disease-related Events and/or Disease-related Outcomes Not Qualifying as AEs or SAEs. Disease progression will not be recorded as AE; however, symptoms of disease progression may be recorded at the Investigator's discretion.

Adverse Events of Special Interest. The following AEs are regarded as adverse events of special interest (AESIs):

Dermatological ADRs considered to be identified risks for emactuzumab according to the IB.

Photos of dermatological AEs should be taken and uploaded to a secure study website, for evaluation by a specialist Central Dermatologist.

Whenever possible, rashes associated with emactuzumab should be classified as specifically as possible. Subjects presenting with findings that may represent cutaneous lupus (including discoid and subacute cutaneous lupus) should be evaluated by dermatology. These Subjects may present with plaques of alopecia, annular scaly plaques predominantly in sun exposed areas of the trunk and extremities, other photo-distributed eruptions or malar erythema. Lesions of discoid lupus may be small, but can lead to scarring and should be evaluated as soon as this diagnosis is considered. When a diagnosis of a connective tissue disorder is made, evaluation for systemic involvement should be completed. Skin biopsy and photographs should be obtained for severe reactions and in any case where cutaneous lupus is suspected.

Liver toxicities. The following clinical signs and symptoms should be considered for further liver investigations, as appropriate, including: anorexia, nausea, vomiting, fatigue, right upper abdominal discomfort and itching.

Pharmacokinetics

Samples will be collected for measurement of emactuzumab concentrations during the Double-Blind Phase and during the Open-Label Phase for subjects who have changed to emactuzumab from double-blind placebo. Samples will be collected at the following timepoints as specified in the SoA:

Visit 1/Day 1: prior to infusion and 5 minutes to 2 hours following the end of drug infusion.

Visit 2/Day 5.

Visit 5/Day 43: prior to infusion and 5 minutes to 2 hours following the end of drug infusion.

Repeat or unscheduled samples may be taken for technical issues with the samples.

Instructions for the collection and handling of biological samples will be provided by the Sponsor. The actual date and time (24-hour clock time) of each sample will be recorded.

Samples will be used to evaluate the PK of emactuzumab.

Genetic analyses will not be performed on these samples.

Intervention concentration information that would unblind the study will not be reported to investigative sites or blinded personnel until the study has been unblinded.

Immunogenicity Assessments. Immunogenicity assessments include ADA to emactuzumab and are described in Section "Anti-drug Antibody (ADA)".

Health Economics. Health Economics information will be collected during the clinical study, to enable subsequent reporting of the economic impact of treatment on subjects.

QoL Questionnaire data, and records of concomitant medication usage (eg, anti-inflammatory and analgesic) in the clinical assessments will be used as source material.

In addition, limited information in the form of specific questions will be collected from the subject at study visits according to the SoA on the subject's ability to work, and healthcare system utilisation.

The Sponsor may use the collected data to conduct economic analyses.

Statistical Considerations. The statistical analysis plan (SAP) will be finalised prior to unblinding/the first database lock and it will include a more technical and detailed description of the statistical analyses described in this section. This section is a summary of the planned statistical analyses of the most important endpoints including primary and key secondary endpoints.

Statistical Hypotheses. The primary objective is to demonstrate that emactuzumab is superior to placebo in ORR at 6 months. The primary null hypothesis is that emactuzumab and placebo will have the same rate of ORR; and the alternative hypothesis is that emactuzumab-treated subjects will have a higher ORR rate than placebo-treated subjects.

The secondary null hypothesis is that emactuzumab and placebo will have the same effect on PROMIS Physical Function T-Scores; and the alternative hypothesis is that emactuzumab-treated subjects will have improved Physical Function T-Scores compared to placebo-treated subjects.

All Screened Set. All subjects who sign informed consent regardless of whether or not they are eventually eligible for the trial and whether or not they receive any trial medication will be included in the All Screened Set. The disposition and adverse events experienced by all subjects in this All Screened Set will be fully accounted for in the study listings.

Full Analysis Set. Subjects who sign informed consent and receive at least one dose of study treatment, will be included in the full analysis set (FAS). Safety and efficacy analyses will be performed for the FAS.

PK Analysis Set. All subjects who sign informed consent, receive at least one dose of IMP, and have a baseline and at least one post-baseline PK measurement will be included in the PK analysis set (PKS).

Statistical Analyses. General Considerations. In general, measured variables and derived parameters will be listed by subject and tabulated. Tabulation of results will be displayed by randomised treatment group and overall population, and by visit when applicable.

Unless otherwise specified, all continuous endpoints will be summarised using descriptive statistics by randomised treatment group, which will include the number of participants (n), mean, standard deviation, median, minimum, and maximum; geometric means and coefficient of variation (% CV) will be provided for data subject to log transformation. All categorical endpoints will be summarised using frequencies and percentages.

The baseline value is defined as the last non-missing value obtained before the initial administration of randomised treatment.

Protocol deviations, including what generally constitutes major (important) protocol deviations may be detailed in the SAP in accordance with ICH guidelines. All protocol deviations will be reviewed and finally classified as either major or minor in a data review meeting prior to unblinding.

Primary Efficacy Endpoint Analysis. Objective Response Rate (ORR). The primary endpoint is the ORR at the 6-month follow-up visit.

The ORR will be calculated as the combined percentage of subjects who have achieved as best overall response: CR, or PR divided by the number of subjects in the FAS (ie, 100×[CR+PR]/[CR+PR+SD+PD+NE]). The best overall response at a single timepoint will be determined among all tumour assessment visits after the date of randomisation, up to 3 months; per RECIST v1.1 as evaluated by central Independent Radiology reading. In the case that a subject is withdrawn or lost to study such that response cannot be assessed, the subject will be classed as "Non-Evaluable for response" (NE) and will be included in the analysis as a non-responder.

The 1-sided Fisher's exact test at 1.25% level of significance will be used to compare ORR between the two treatment arms. A logistic regression analyses will be employed to provide an estimate of the treatment effect in terms of the odds ratio for response along with its associated 2-sided 97.5% CI.

Key Secondary Efficacy Endpoints Analysis. The two key secondary endpoints are
a) Change in PROMIS Physical Function Scale from baseline to 6 months.
b) Change in PROMIS Paediatric and Parent-proxy Mobility from baseline to 3 months.

The PROMIS Physical Function Scale has been validated in TGCT subjects, and the Short Form version will be used as a quality of life instrument in the study (Gelhorn et al., 2019). A 3-point change in score has been reported to have implications for a patient's physical functioning in the TGCT population (Rose et al., 2014; HealthMeasures, 2021).

For both a) and b), the change from baseline over time will be analysed via mixed model repeated measures with terms for randomised treatment, visit(=timepoint), visit by randomised treatment interaction and baseline value as a covariate. Treatment effect estimates will be extracted by visit and presented along with their associated 95% CI and 2-sided p-value. Formal inference will be focused upon the 6-month data.

The key secondary endpoints will be formally tested only if the primary endpoint is met at the
0.025 1-sided level. If met, then key secondary endpoints will be tested sequentially at the 0.025 1-sided level in the order a) followed by b).

Missing Data Sensitivity Analyses for the Primary and Key Secondary Efficacy Endpoints. While subjects will be followed on an intent-to-treat basis, with data collected on the primary key secondary efficacy endpoints over the 6-month treatment period, some missing data are possible. Primary and key secondary efficacy endpoint data will be subject to sensitivity analyses to assess the potential impact of missing data. These analyses will include:

(i) A control-based pattern-mixture model approach as per Ratitch and O'Kelly (2011) whereby missing observations in both the SNX-301 and placebo groups are imputed using only the data observed in the placebo group; this model reflects a 'jump to placebo (reference)' analysis; and (ii) Tipping point analyses whereby missing data are imputed in the SNX-301 arm with an increasing degree of penalisation for those with missing data to, thus, locate the 'tipping point', ie, that degree of penalisation in the SNX-301 arm that renders a positive endpoint p-value non-significant (Ouyang et al., 2017).

Secondary Efficacy Endpoints Analysis/Other Patient-Reported Outcomes, Pain and Quality of Life. HCP-Reported Joint Range of Motion Score, NRS and SF 12-V2. Secondary efficacy endpoints include HCP-reported joint range of motion score (by goniometry), Worst Pain NRS, SF-12 v2, and Worst Stiffness NRS. These patient-reported outcome (PRO) data collected over the randomised treatment period will be analysed using two approaches:

(i) For PRO scores as a continuous endpoint, the change from baseline over time will be analysed via mixed model repeated measures with terms for randomised treatment, visit (=timepoint), visit by randomised treatment interaction and baseline value as a covariate. Treatment effect estimates will be extracted by visit and presented along with their associated 95% CI and 2-sided p-value.

(ii) For PRO data over time that are dichotomised within subject in terms of achievement, or not, of a prespecified MCID, such data will be analysed using generalised estimating equations. The marginal model will take the form:

$$E[\text{Log}[p/(1-p)]] = \beta 0 + T \cdot \beta T + Vj \cdot \beta Vj + T \cdot Vj \cdot \beta TVj$$

where $E[\cdot]$ denotes expectation, p is the probability of reaching the MCID, $\beta 0$ is the intercept term, $T=0,1$ is the treatment arm indicator for placebo or SNX-301, $\beta T$ is the regression parameter associated with randomised treatment, $\beta Vj$ is the regression parameters associated with visit $Vj=0, 1, \ldots, v-1$, and $\beta TVj$ is the regression parameter associated with the interaction between randomised treatment T and visit Vj. Results will be displayed in terms of the overall odds ratio, SNX-301: placebo, or reaching the MCID along with the associated 95% CI and 2-sided p-value; further, odds ratios by visit will also be extracted and displayed.

EQ-5D-5L. The EQ-5D-5L descriptive system comprises 5 dimensions (mobility, self-care, usual activities, pain/discomfort, anxiety/depression); and each dimension has 5 levels (no problems, slight problems, moderate problems, severe problems, and extreme problems). The respondent is asked to indicate his/her health state or placing a cross in the box against the most appropriate level within each of the 5 dimensions. This decision results in a 1-digit number expressing the level selected for that dimension. The user guide emphasises that the numerals 1-5 for each level have no arithmetic properties and should not be used as a cardinal score. Ambiguous item values (eg, 2 levels are ticked for a single dimension) will be treated as missing values.

For the 5 dimensions, at each assessment point, the number and percentage of subjects responding in each of the 5 levels will be presented in a table as well as displayed by treatment arm. The number of missing responses will also be displayed. The response profile for each of the 5 dimensions will be compared between treatment arms over time using Generalised Estimating Equations (GEE).

Results will be displayed as well as presented in a table, in terms of the overall odds ratio for emactuzumab vs placebo along with the associated 95% CI and 2-sided p-value. Odds ratios by visit will be displayed also.

Antitumour Activity. Duration of Response (DoR). DoR will be measured from the date of first record of RECIST v1.1 response until tumour progression is recorded. Subjects who discontinue from the study will classed as censored at the last timepoint when their response status was known.

Treatment arms will be compared for DoR using a log rank test, from which the 1-sided p-value will be presented; a corresponding Cox regression model will also be applied to the DoR data to provide the HR and associated 97.5% 2-sided CI as measure of treatment effect. Supportive analyses will also be performed using the Max-Combo test will be used with the Fleming-Harrington weights FH(0,1), FH(1,0) and FH(1,1).

Disease Control Rate (DCR). The DCR will be calculated as the combined percentage of subjects who have achieved CR, or PR, or SD (ie, DCR=100×[CR+PR+SD]/[CR+PR+SD+PD+non-evaluable (NE)]). In the case that a subject is withdrawn or lost to study such that response cannot be assessed, the subject will be classed as "Non-Evaluable for response" (NE) and will be included in the analysis as a non-responder. DCR will be analysed using logistic regression model. The DCR odds ratio, associated 2-sided 97.5% CI and 1-sided p-value will be presented. The proportion of subjects with disease control within each treatment arm will be presented.

Tumour Volume Score (TVS). Changes in Tumour Volume Score will be evaluated on a per subject basis. Mean changes in TVS will be presented. Response classification is the same as that for RECIST v1.1 but with different cut-offs for PR (?50% decrease in score relative to baseline) and PD (30% increase in score relative to the nadir). Given the irregular shape and asymmetrical change most commonly seen with TGCT, the TVS threshold for PD usually provides greater sensitivity for progression than does the threshold for RECIST v1.1, and the TVS threshold for PR usually provides less sensitivity for improvement than does the threshold for RECIST v1.1. Despite these more conservative response thresholds, TVS typically shows greater discriminative power for volumetric change in TGCT than does RECIST v1.1.

Since TGCT is a benign tumour, multiple lesions and therefore non-target lesions or new lesions are extremely unlikely. Accordingly, RECIST and TVS data for TGCT typically remain continuous rather than becoming nominal. This allows measurements from independent readers to be averaged and usually obviates the need for adjudicating inter-reader disagreements.

Surgical Intervention Rate. The Surgical Intervention Rate will be calculated as the proportion of subjects deemed initially unresectable who go on to have surgical extirpation. The surgical intervention rate will be presented for each treatment arm and compared using a logistic regression model in the same manner as described for DCR.

Missing Data Sensitivity Analyses for the Secondary Efficacy Endpoints. For non-key secondary efficacy endpoints, assessments of change from baseline to post-baseline, or the ratio of post-baseline to baseline, the last value of a variable taken before the start of treatment will be used as the baseline value.

Health Economics. Health Economics information will be collected during the clinical study to enable subsequent reporting of the economic impact of treatment on subjects. These data include QoL, concomitant medication usage (e.g., anti-inflammatory and analgesic), impact on the subject's ability to work, and healthcare system utilisation. The analysis and presentation of these data will be detailed in the SAP.

Pharmacokinetic Analyses. Emactuzumab will be measured in serum using an in-house validated enzyme-linked immunosorbent assay with a lower limit of quantification for emactuzumab of 1.5 ng/mL in 10% human serum (Smart et al., 2020). Human CSF-1R is used as capture reagent, and an anti-idiotypic antibody against emactuzumab is applied as detection reagent.

A sparse PK sampling protocol has been applied in this trial (see SoA in Section "Schedule of Activities (SoA)"). These data will be combined with the existing large PK data set for emactuzumab to construct a population PK model. These analyses will be specified in a separate PK SAP.

Safety Analyses. General Considerations. Baseline consent date, demographics, medical history, tumour pathology, height, and pregnancy test result will be summarised in tables in the study report and individual subject data presented in the study listings.

Disposition and reasons for discontinuations will be listed and summarised for all subjects. IMP exposure and study duration will be summarised using descriptive statistics.

Adverse Event Analyses. All AEs occurring during the screening period will be tabulated by type, incidence, severity and seriousness and any laboratory abnormalities will be tabulated. All subjects in the "All Screened Set" will be included in these summaries.

All subjects who complete screening, receive at least one dose of study medication and who have at least one safety assessment (including "death") will be in the FAS. For all these subjects the type, incidence, severity, seriousness and relationship to study medications of AE and any laboratory abnormalities will be tabulated.

The number and percentage of subjects reporting treatment-emergent adverse events (TEAEs) will be summarised by the worst CTCAE grade, system organ class, and preferred term.

Similarly, the number and percentage of subjects reporting treatment-emergent SAEs will be summarised, as well as TEAEs considered related to administration of Study Treatment.

A by subject TEAE data listing including but not limited to: verbatim term, preferred term, system organ class, severity, action, outcome, and relationship to IMP will be provided.

Clinical Laboratory Evaluation Analyses. Clinical laboratory abnormalities of CTCAE Grade 3 or 4 severity will be summarised by collection time-point.

Descriptive statistics will be calculated for quantitative safety data, and frequency counts will be compiled for classification of qualitative safety data.

Tables of mean change from Screening/Baseline (also including maximum and minimum changes) to each assessment visit and to the end of treatment will be provided for clinical laboratory variables.

Anti-drug Antibody (ADA) Analyses. Serum ADA to emactuzumab laboratory results will be presented as summary statistics for each sampling timepoint, using both shift and frequency tables. Data will be presented according to the treatment received.

Physical and Dermatology Examination Analyses. Physical and dermatology examination findings will be summarised by time point of collection. Descriptive statistics will be calculated for quantitative safety data and frequency counts will be compiled for classification of qualitative safety data.

Vital Signs and Electrocardiogram (ECG). Numeric summaries of all observed findings and changes from baseline/screening vital signs evaluations will be provided by time point/visit.

ECG results will be summarised by time point/visit and dose cohort. Vital signs and ECG will be presented in listings as well.

Other collected data not specifically mentioned will be presented in subject listings and further detailed in the SAP.

Interim Analysis. An interim analysis solely for the purposes of sample size re-estimation is planned after the 45th randomised subject has reached 6 months follow-up. This procedure will be conducted blind to the Sponsor by a fully independent statistical service provider. Details are provided in Section "Sample Size Re-Estimation".

Sample Size Determination. The null hypothesis is that emactuzumab and placebo will have the same rate of ORR; and the alternative hypothesis is that emactuzumab-treated subjects will have a higher ORR rate than placebo-treated subjects.

Based on an expected ORR of 10% in the placebo arm and 50% in the emactuzumab arm a total of N=135 subjects randomised on a 2:1 basis has 99% power based on the Fisher's exact test at the 1-sided 0.5% alpha level. If the hypothesis was revised to 41% vs 10%, then N=135 subjects would provide 90% power at the 0.5% 1-sided level.

The first key secondary endpoint null hypothesis is that emactuzumab and placebo will have the same effect on PROMIS Physical Function T-Scores; and the alternative hypothesis is that emactuzumab-treated subjects will have improved Physical Function T-Scores compared to placebo-treated subjects.

Based on an expected change from baseline in PROMIS T-Score of 0 in the placebo arm and +3 in the emactuzumab arm, and an assumed SD of 4.55 a sample size of 90 emactuzumab subjects compared to 45 receiving placebo this trial has approximately 94% power to detect a true difference between the randomised treatment groups at the 1-sided 2.5% alpha level.

It is expected that a number of subjects will go on to surgical resection following reduction in tumour volume. Assuming the tumour has not increased in size prior to resection these subjects will contribute to the primary endpoint (ORR at 6 months) and the results of surgery will be recorded as to the completeness of resection and functional improvement.

Sample Size Re-Estimation. A sample size re-estimation (SSRE) is planned after the 45th randomised subject has reached 6 months follow-up. This procedure will be conducted blind to the Sponsor by a fully independent statistical service provider. The conditional probability (CP) of reaching $p<0.5\%$ 1-sided for the primary endpoint and $p<2.5\%$ 1-sided for the first key secondary endpoint (PROMIS-PF) with the planned total of N=135 subjects will be made using the methods described by Mehta and Pocock (2011).

Table 12 below gives the decision rule with regards to continuation of the study with or without a sample size increase. Any increase in sample size will be capped at 50% of the planned sample size (ie, the maximum total sample size will be capped at $135+\frac{1}{2}\times135=204$ subjects allowing for rounding).

TABLE 12

Decision Rule for Sample Size Re-Assessment

| Conditional Power | | (a) Primary Endpoint-Objective Response Rate (ORR) | | |
|---|---|---|---|---|
| | | <30% | ≥30%-<90% | ≥90% |
| (b) 1st Key Secondary Endpoint (Promis-PF) | <30% | Continue, no SS increase | Continue, SS increase | Continue, no SS increase |
| | ≥30%-<90% | Continue, SS increase | Continue, SS increase | Continue, no SS increase |
| | ≥90% | Continue, no SS increase | Continue, SS increase | Continue, no SS increase |

The CP computed as per Mehta and Pocock (2011) will give rise to two CP values, CPa and CPb, corresponding to each of the two alternate primary endpoints, a) and b), respectively in Table 12. Based on these CP values, Equation 9 in Mehta and Pocock (2011) will be used to compute the corresponding post-interim sample sizes, ña and ñb, required to deliver the cross-tabulated power as displayed in Table 12. This, in turn, will give two new sample size totals for the study, Na and Nb, relating to the two endpoints. The larger of Na and Nb, will be taken as the revised sample size for the study subject to a maximal increase of 69 subjects (ie, at most a 50% increase over the planned sample size of N=135 subjects). The final analysis will then combine the pre- and post-SSRE p-values using the inverse Normal approach are per Bauer and Köhne (1994) for the primary and all secondary endpoints using the fixed weights approach defined by Cui et al. (1999) which guarantees no alpha inflation regardless of how the post-interim sample sizes (ie, ña and ñb) are determined.

Example 4—Materials and Methods for Examples 5-6

Study design. This was a phase I, open-label, non-randomised, doseescalation and expansion, multicenter study (ClinicalTrials.gov Identifier: NCT01494688) investigating the safety, PD and clinical activity of emactuzumab in patients with dTGCT. Preliminary results on 29 patients with dTGCT including those from the dose-escalation phase and determination of the optimal biological dose (OBD) were described previously [10].

Ethics. Local ethics committee approval was obtained, and all patients provided written informed consent. The study was conducted in accordance with Good Clinical Practice guidelines and the Declaration of Helsinki in six centres in France and the USA.

Patients. Patients were enrolled on to the study if they were ≥18 years, had an Eastern Cooperative Oncology Group (ECOG) performance status of ≤1, had measurable disease according to Response Evaluation Criteria in Solid Tumors (RECIST) version 1.1, and had adequate haematology, blood chemistry, and renal and liver function.

Patients continued treatment until disease progression, unacceptable toxicity or consent withdrawal. Some patients were limited to a pre-specified number of treatment cycles. A follow-up visit with optional tumour assessment was done after one and two years of study drug discontinuation.

Study drug administration. Patients received emactuzumab IV over 1.5 h at doses of 900-2000 mg. During the dose-escalation phase of the study, emactuzumab was given q2w. Once the OBD was defined, a limited number of cycles (four or five) was introduced and tested for different schedules (including 3×q2w followed by 1×q4w; 4×q3w; and 5×q2w).

Tumor response and safety. Assessments of the metabolic response rate was based
- on (18F)-fluorodeoxyglucose-positron emission tomography (FDG-PET) and were carried out at baseline and on day 7 of cycle 2. Metabolic response assessment was based on the European Organisation for Research and Treatment of Cancer criteria [11]. Radiological assessments with magnetic resonance imaging (MRI) for all patients were done at baseline and after every three cycles of treatment using RECIST version 1.1 [12]. MRI images were centrally reviewed by independent radiologists. Confirmation was not required to define a response as partial or complete.

Safety assessments included physical (ECOG performance status, vital signs) and laboratory examinations, electrocardiogram and echocardiogram. Adverse events (AEs) were defined as per the Common Terminology Criteria for Adverse Events, version 4.0.

Biomarker assessments. For PD assessments, tumour biopsies were taken at baseline and at four weeks on treatment. Samples were analysed for CD68, CD163 and CSF1R expression with immunohistochemical staining as previously described [10]. Automated staining of sections was done on a BenchMark XT instrument (Ventana Medical Systems).

Patient-reported outcomes. Two questionnaires were used in this study, a standard QoL questionnaire (EuroQuol-5D-3L [EQ-5D-3L] Health Questionnaire, English Version for the UK, Validated for Ireland) and the Western Ontario and McMaster Universities Osteoarthritis Index (WOMAC) questionnaire which specifically focuses on joint disorders.

Statistical considerations. All patients who received at least one dose of study medication were included in the safety, biomarker and efficacy population. Descriptive statistics were used for demographics, safety, biomarker and efficacy. For patient-reported EQ-5D-3L QoL and WOMAC questionnaires, on-treatment changes from baseline were analysed using a mixed-effect model repeated measures (MMRM) model (see below for details).

EQ-5D-3L. A questionnaire was included at screening, pre-dose on Day 1 of each cycle and at the 28-day follow-up visit, post disease progression. The questionnaire collected information on how much discomfort the subject had in five domains (mobility, self care, activities of daily living, pain/discomfort, anxiety/depression) each with three response levels based on the last 48 h. Rating each item as 0 (no discomfort), 1 (some discomfort) and 2 (extreme discomfort) a total score was derived (range: 0 to 10). In addition, an overall score on the health status with a 20 cm visual analogue scale (VAS) was collected which asked the patients to rate their health today from 0 (worst imaginable health) to 100 (best imaginable health).

WOMAC® 3.1 Osteoarthritis Index. The change in functional and symptomatic status measures was assessed by the Western Ontario and McMaster Universities Osteoarthritis Index (WOMAC® 3.1 Osteoarthritis Index) (Bellamy et al., J. Rheumatol. 15(12): 1833-1840, 1998) at baseline, Cycle 2 Day 1 and at all following cycles on Day 1, at the 28-day follow up visit, and optionally at the one-year and two-years post treatment follow-up visit. WOMAC was a self-administered health status measure that assessed the dimensions of pain, stiffness and physical function (both separately and as an overall index). Each dimension was composed of a set of questions to assess the clinical severity of the disease (five questions for pain, two questions for stiffness and 17 questions for physical function). The patient's response to each question (using a 100-mm VAS) produced a score that was then summed up to derive an aggregated score for each dimension. This resulted in three subscale scores (pain ranging from 0 to 500, stiffness 0 to 200 and physical function 0 to 1,700) and a total score (WOMAC index, ranging from 0 to 2,400) that reflected disability overall.

Statistical considerations. For patient-reported EQ-5D-3L QoL and WOMAC questionnaires, on-treatment changes from baseline were analyzed using a mixed-effect model repeated measures (MMRM) model, which was fitted using PROC MIXED in SAS and included main effects for baseline score and visit. Visit was fitted as a repeated effect with an unstructured correlation structure across visits within each patient. All main effects were retained in the final model regardless of their statistical significance. The results of the analysis are presented as point estimates, 90% confidence intervals and associated p-values for the adjusted least squares mean at each visit. Inferential findings are provided for descriptive purposes only and without any confirmatory meaning.

Example 5—Results

Altogether, 63 patients were enrolled into the study: 12 patients into the dose-escalation phase and 51 patients into the dose-expansion phase. Emactuzumab was given at doses of 900 mg (n=3), 1000 mg (n=51), 1350 mg (n=5) and 2000 mg (n=4). As published previously [10], no dose-limiting toxicities were reported and the maximum tolerated dose was not reached. The OBD was defined as 1000 mg q2w. Given the rapid onset of response and symptomatic improvement observed in the first part of the study, more convenient treatment schedules for the dTGCT patient population were explored: three alternative regimens (q2w, q3w and q2w-q4w) were investigated, and the total number of cycles were limited to four or five depending on the regimen (Table 13). No overt differences for clinical activity were seen between different doses and schedules.

The median age of patients was 38 years with more women (60%) participating in the study (Table 14). The majority of patients (57%) had the knee as their primary tumour location. More than half of the patients had prior surgery for their disease, and 19% of patients had received prior systemic therapy with nilotinib or imatinib. The median number of treatment cycles administered per patient was 4 cycles (range 1e14) across all patients (Table 13).

The most frequent AEs of any grade were pruritus (70%), asthenia (39%) and different kinds of oedema (face oedema [49%], oedema peripheral [44%], periorbital oedema [43%] and eyelid oedema [37%]) (Table 15). No deaths occurred during the study. Nine patients (14%) had an AE that lead to withdrawal from the study.

Figure 12A:
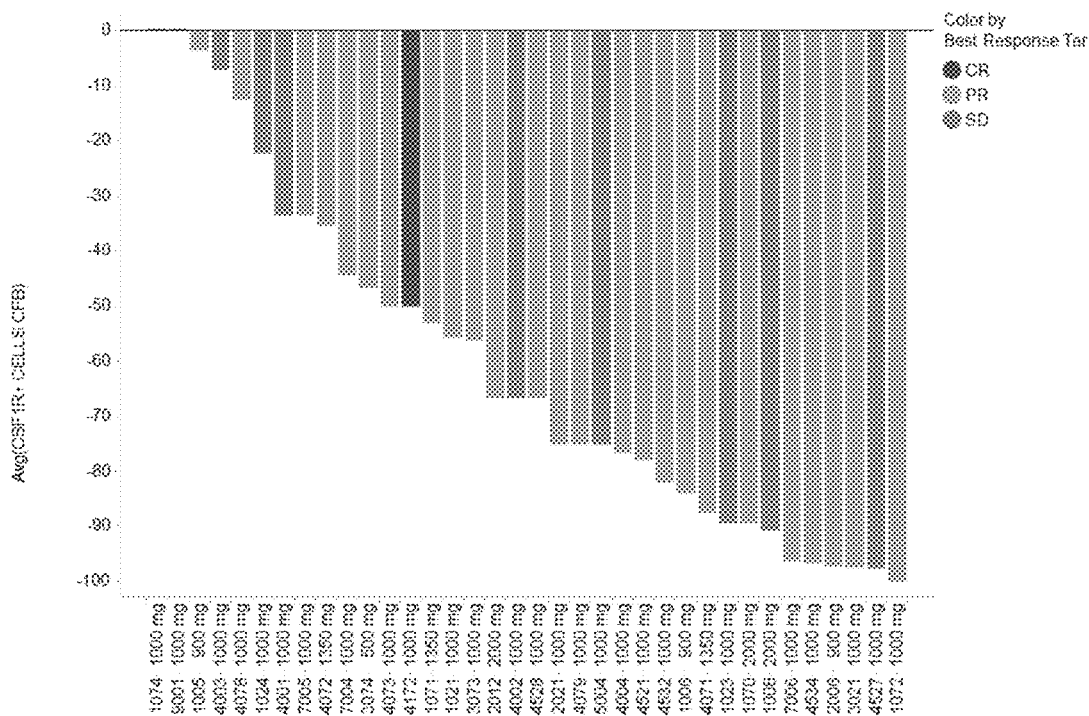
FIGS. 12A-B: Assessment of tumor-associated macrophages in paired biopsies (FIG. 12A) change from baseline of CSF1R-positive cells in 36 evaluable dTGCT patients and FIG. 12B) change from baseline of CD68-positive/CD163-positive cells in 35 evaluable dTGCT patients.
Figure 12B:
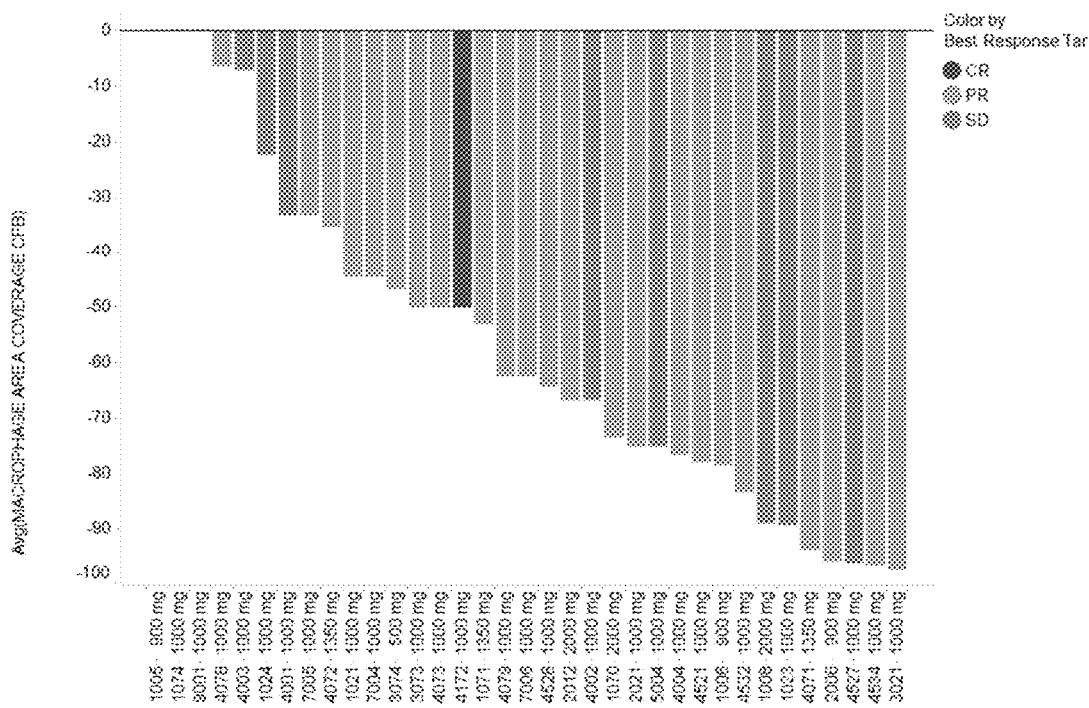

Altogether, 36 patients (57%) had evaluable paired tumour biopsy samples (taken at baseline and on treatment at four weeks, after two cycles of emactuzumab at doses of 900-2000 mg). A significant reduction of >50% of CD68/CD163-positive macrophages and CSF1R-positive macrophages was seen in 22 patients (61%); however, no correlation with clinical benefit could be demonstrated (FIGS. 12a-b). Furthermore, absolute CSF1R- and CD68/CD163-positive infiltrates determined before treatment start were not associated with the change in tumour size induced by emactuzumab therapy (data not shown).

Figure 9:
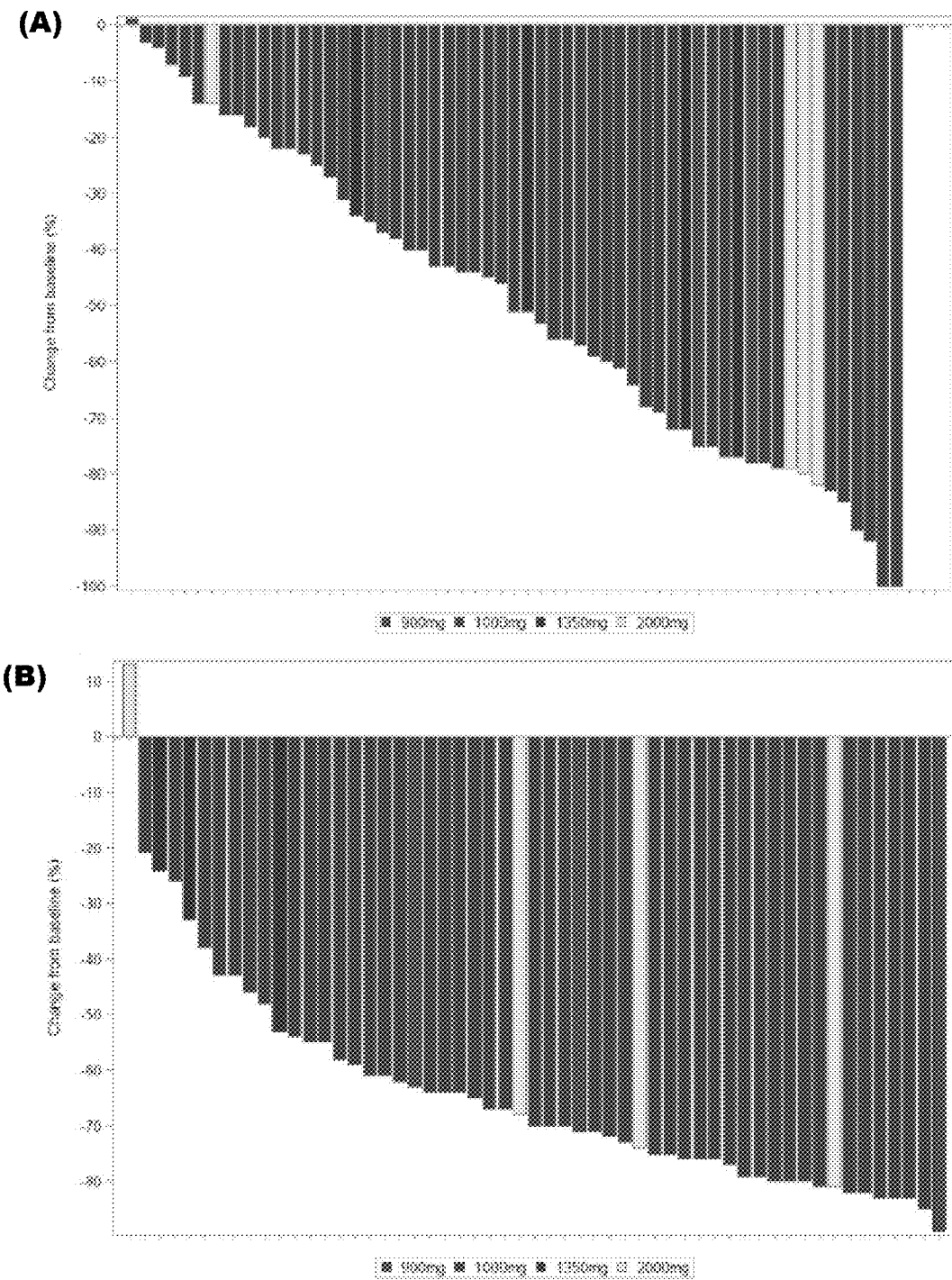
FIGS. 9A-B: The waterfall plot of dTGCT patients treated with different doses of emactuzumab.
Figure 10:
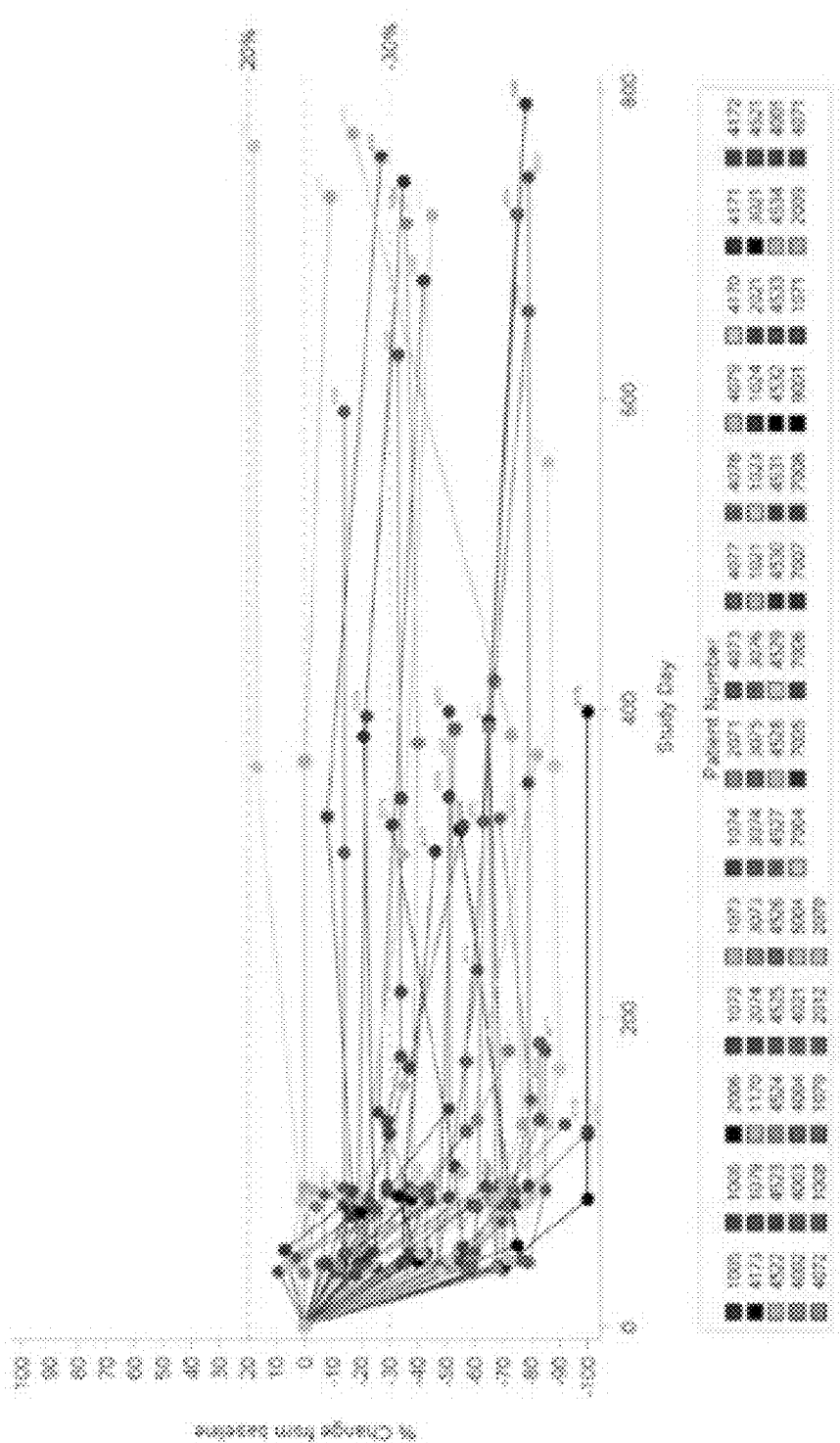
FIG. 10: spider plot of percentage change from baseline over time in the sum of longest diameters (SLDs) according to RECIST 1.1. RECIST, Response Evaluation Criteria in Solid Tumors. Dotted reference lines at −30% and 20% indicate thresholds for partial response and progressive disease, respectively.

Altogether, 45 of 63 patients (71%) had a best overall response of complete response or partial response (PR) and the disease control rate was 98% (62 of 63 patients) (FIG. 9a and Table 16). None of the patients were assessed with progressive disease at the time of treatment discontinuation, although the majority of patients (39 patients [62%]) only received a limited number of four or five treatment cycles. After one- and two-year follow-up MRI, 19/27 patients (70%) and 9/14 patients (64%), respectively, were still in response at these time points (FIG. 10 and Table 16). Two patients remained in a response beyond the two-year follow-up: one patient with a PR from July 2013 to April 2015 was still in response in October 2019, and one patient with stable disease (SD) from January 2013 to June 2014 was still in response in April 2018 (P. Cassier, personal communication).

For FDG-PET, of 63 patients, a complete metabolic response was observed in two patients (3%), partial metabolic response was observed in 52 patients (83%) and three patients (5%) had stable metabolic disease (FIG. 9b).

Retreatment with emactuzumab was allowed per protocol. A 64-year-old woman was diagnosed with dTGCT in 2002 and had multiple surgeries and systemic treatment with nilotinib before entering the study. At baseline, she had lesions in her left wrist and was treated with four cycles of emactuzumab at 900 mg from July to October 2012. The patient had a PR with a lesion reduction by 75% but had to discontinue treatment because of a grade II ischaemic cardiopathy considered unrelated to treatment. After regrowth of the lesion by 150%, the patient received another four cycles of emactuzumab from October to December 2014 and again showed a PR with a lesion reduction by 79%. The patient was discontinued as planned after the fixed number of cycles. The patient benefited with a radiological response until November 2016 (C. Gomez-Roca, personal communication).

Figure 11A:
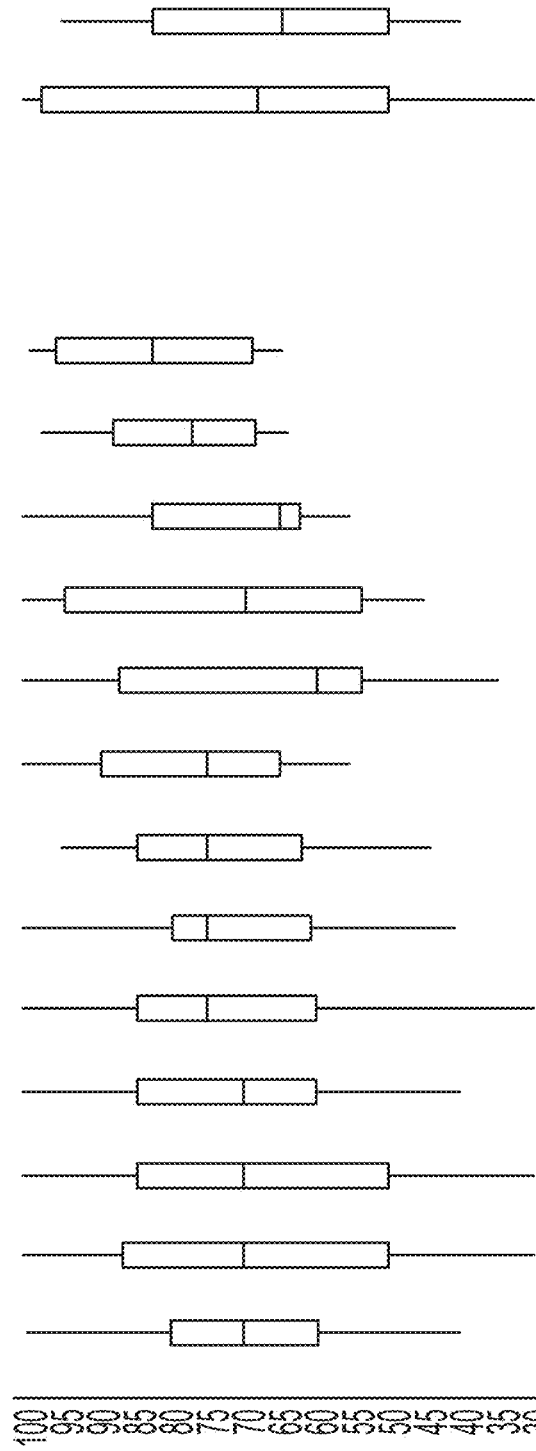
FIGS. 11A-C: Quality-of-life analysis.
Figure 11B:
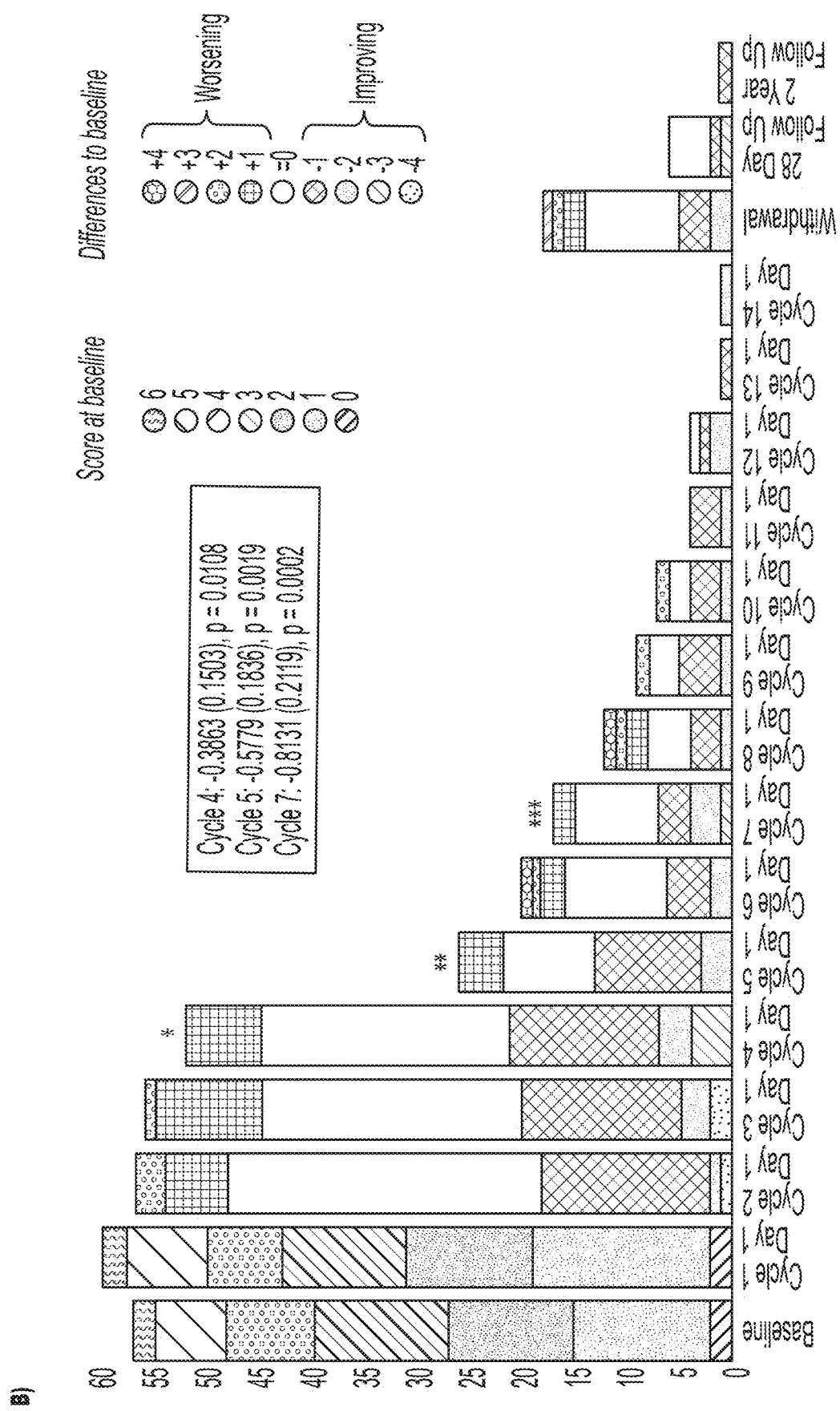
Figure 11C:
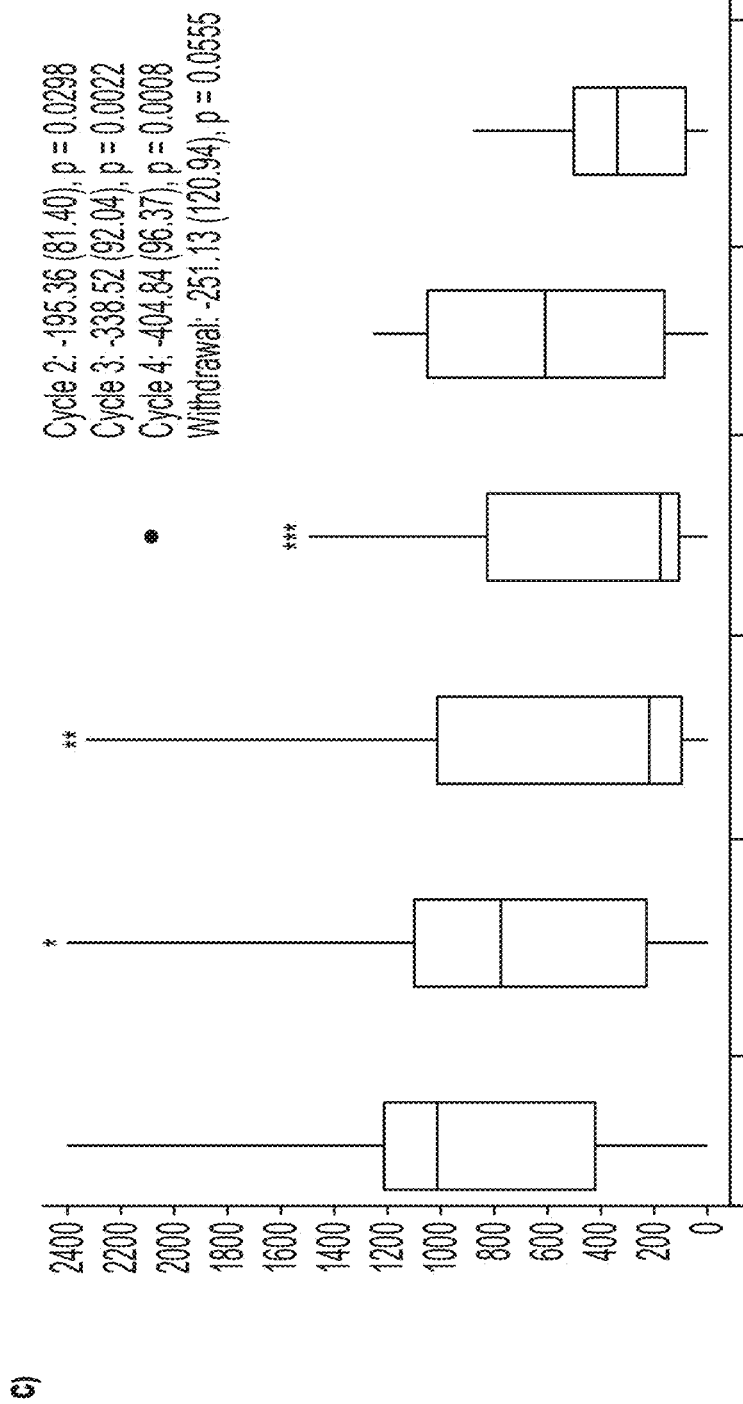

EQ-5D-3L QoL assessment was done for 59 patients. There was a decrease of the estimate from baseline for almost all time points (FIG. 11a), and statistical significance was reached for cycle 4, 5 and 7 (FIG. 11b). For the WOMAC assessed in 18 patients, there was a pronounced reduction in total score that reached statistical significance at all cycles tested (FIG. 11c).

TABLE 13

| Regimen | Dose (mg) | No. of patients | Median no. of cycles (min, max) |
|---|---|---|---|
| Q2W | 900 | 3 | 7 (4, 10) |
|  | 1000 | 12 | 7.5 (4, 12) |
|  | 1350 | 5 | 9 (1, 14) |
|  | 2000 | 4 | 7.5 (5, 9) |
|  | 1000 (limited to 5 cycles) | 7 | 5 (3, 5) |
| Q3W | 1000 (limited to 4 cycles) | 13 | 4 (1,4) |
| Q2W-QM | 1000 (limited to 4 cycles) | 19 | 4 (4, 4) |
| All |  | 63 | 4 (1, 14) |

Please note:
Patients were initially dosed until progressive disease, unacceptable toxicity or withdrawal. A limited number of cycles was then introduced and alternative schedules were explored to evaluate safety and efficacy profiles of emactuzumab.

TABLE 14

Baseline patient demographics and characteristics.

| Characteristic | All patients with dTGCT N = 63 |
|---|---|
| Age, median (range), in years | 38 (18, 82) |
| Sex, n (%) |  |
| Male | 25 (40) |
| Female | 38 (60) |
| Anatomical location of disease |  |
| Upper extremity | 5 (8) |
| Wrist | 3 (5) |
| Thumb | 1 (2) |
| Shoulder | 1 (2) |
| Lower extremity | 58 (92) |
| Knee | 36 (57) |
| Hip | 5 (8) |
| Ankle | 11 (17) |
| Foot | 6 (10) |
| Prior surgery for dTGCT, n (%) | 38 (60) |
| Prior systemic therapy for dTGCT, n (%) | 12 (19) |
| Nilotinib | 9 (14)[a] |
| Imatinib | 4 (6)[a] |
| Time between most recent surgery for dTGCT and study start, median (min, max) [months] | 22 (2, 165) | n = number of patients, dTGCT = diffuse-type tenosynovial giant-cell tumour.
Please note:
[a]One patient received both nilotinib and imatinib as prior therapies.

TABLE 15

Summary of adverse events of any grade and of grade ≥III irrespective of the relationship to study drug.

| Adverse event | No. of patients having an adverse event (%) N = 63 | |
|---|---|---|
|  | All grades | Grade ≥3 |
| Pruritus | 44 (70) | 2 (3) |
| Asthenia | 39 (62) | 0 |
| Face oedema | 31 (49) | 0 |
| Oedema peripheral | 28 (44) | 0 |
| Periorbital oedema | 27 (43) | 1 (2) |
| Eyelid oedema | 23 (37) | 0 |
| Headache | 19 (30) | 0 |
| Nausea | 18 (29) | 0 |
| Rash | 18(29) | 0 |
| Fatigue | 15 (24) | 2 (3) |
| Diarrhoea | 14 (22) | 0 |
| Lacrimation increased | 14 (22) | 0 |
| Dry skin | 10 (16) | 0 |
| Erythema | 8 (13) | 0 |
| Paraesthesia | 8 (13) | 0 |

TABLE 15-continued

Summary of adverse events of any grade and
of grade ≥III irrespective of the relationship to study drug.

| Adverse event | No. of patients having an adverse event (%) N = 63 | |
|---|---|---|
| | All grades | Grade ≥3 |
| Abdominal pain | 7 (11) | 0 |
| Conjunctivitis | 7 (11) | 0 |
| Constipation | 7 (11) | 0 |
| Pyrexia | 7 (11) | 0 |
| Vomiting | 7 (11) | 0 |
| Weight increased | 7 (11) | 0 |

Please note:
Only adverse events reported by >10% of the patients overall are shown. Adverse events are ordered by decreasing frequency for all grade events in the overall population.
Adverse events that led to discontinuation of study treatment included: asthenia grade II, conjunction of chest discomfort grade II/hypertension grade II/myocardial ischaemia grade I, skin lesions grade II, dermo-hypodermitis grade III, maculo-papular rash grade III, neutropenia grade III, subacute cutaneous lupus erythematosus grade III, mucosal inflammation grade III, conjunction of face oedema grade II/skin discoloration grade II with one patient each. All of these events, with the exception of myocardial ischaemia, were considered related to study drug.

TABLE 16

Tumour response to treatment based on RECIST by central assessment.

| RECIST response | Number of patients (%) with respective assessment N = 63 | | |
|---|---|---|---|
| | Best overall response while on treatment | Response at optional 1-year follow-up | Response at optional 2-year follow-up |
| Complete response | 2 (3) | 1 (2) | 0 |
| Partial response | 43 (68) | 18 (29) | 9 (14) |
| Stable disease | 17 (27) | 6 (10) | 4 (6) |
| Progressive disease | 0 | 2 (3) | 1 (2) |
| Not applicable $^a$ | 1 (2) | 36 (57) | 49 (78) |
| Objective response rate | 45 (71) | 19 (70)$^b$ | 9 (64)$^b$ |
| Disease control rate | 62 (98) | 25 (93)$^b$ | 13 (93)$^b$ |

Please note:
Responses described here are unconfirmed. One patient withdrew consent and never had an on-treatment tumour assessment. Another patient had no measurable target lesion at baseline and could not be evaluated.
$^a$ These patients were lost to follow-up, underwent surgery or discontinued the study prematurely.
$^b$Percentages are excluding patient who were not applicable for tumour assessment.

Example 6—Discussion

Here, the inventors present data on the largest cohort of dTGCT patients (n Z 63) ever treated with a CSF1R-targeting antibody in a clinical study to date. Strikingly, the ORR (independent review; unconfirmed) was 71%, which is the best clinical activity reported so far for a systemic therapy of dTGCT to the inventors' knowledge. Responses were durable, and the ORR was 70% and 64% after one and two years, respectively. Clinical activity appeared early as measured by FDG-PET with a metabolic ORR of 86% within one month of treatment. A considerable number of patients discontinued the study during the follow-up phase after emactuzumab treatment was already completed. However, this may be because objective responses had occurred early in this relatively young patient population with a usually nonmalignant disease. Remarkably, one patient with a PR had a treatment interruption for two years. After the lesion regrew during this time, the patient regained a PR after retreatment. This case underscores that retreatment with emactuzumab is feasible and results in a further deep clinical response. Patient-reported outcomes were used to capture symptomatic improvement, which is an important indicator of treatment success in this young patient population. A significant improvement of the EQ-5D-3L QoL and the joint disorder-specific WOMAC during treatment indicates for the first time that patients' QoL did improve under therapy with emactuzumab. Furthermore, emactuzumab was well tolerated. Most AEs were of grade I or II in intensity. Pruritus (70%), asthenia (39%) and oedema (up to 49%) were the most frequently reported AEs. Paired tumour biopsy samples showed a profound reduction in tumour-associated CD68/CD163-positive and CSF1R-positive cells in a majority of patients and underscore the PD activity of emactuzumab.

The efficacy shown in this study exceeds that of other systemic therapies investigated so far, both in duration and proportion. For example, non-selective tyrosine kinase inhibitors imatinib and nilotinib have been tested in dTGCT patients with limited success. Imatinib was tested in 27 patients and showed an ORR of 19%, and 74% had stable disease [13]. Nilotinib was tested in 51 patients with dTGCT who were treated for up to one year in a phase II study [14]. No patient had an objective response at week 12 of treatment. The best overall response after one year of treatment was stable disease in 90% of patients and PR in 6% of patients. Phase I data on dTGCT patients have been reported as well for the CSF1R-targeting compounds cabiralizumab and pexidartinib. Five of eleven patients (45%) treated with cabiralizumab had a PR [15]. The best response (unconfirmed and assessed by the investigator) with pexidartinib (PLX3397) was a PR in 12/23 patients (52%) and SD in 7/23 patients (30%) [16]. Most recently, data in a controlled study of 61 advanced TGCT patients treated with pexidartinib versus 59 patients treated with placebo have been reported [17]. At week 25 and based on centrally read RECIST-based, unconfirmed tumour assessment, the ORR was 39% compared with 0% in the placebo group. The best overall response after a median treatment duration of 17 months was 54% [18].

Regarding the safety profile, emactuzumab compares favourably to other CSF1R-targeting agents. Most importantly, no liver toxicity was reported for patients in the present emactuzumab study, although transient, on-target aspartate aminotransferase (AST) increase was observed. In the phase III trial of pexidartinib, seven patients (11%) had to discontinue pexidartinib because of hepatic AEs [17]. In addition, pexidartinib shows some specific AEs which are not seen or are fewer with emactuzumab treatment (e.g. hair colour changes, fatigue, dysgeusia). Long-term treatment with pexidartinib with a median treatment duration of 17 months may even enhance the side-effect profile [18]. These differences might be explained by off-target effects that are common for tyrosine kinase inhibitors such as pexidartinib, which is known to inhibit KIT with comparable potency as CSF1R [16]. Other reported events seem to be similar between pexidartinib and emactuzumab including oedema and skin disorders. However, in the present study, the number of treatment cycles was limited to four or five in the majority of patients (62%) which may underestimate any toxicity as a result of long-term treatment. At the same time, this can be interpreted as an advantage of emactuzumab treatment. Although the oral treatment with pexidartinib may be more convenient compared with the IV infusion of emactuzumab, the deep and durable responses seen with emactuzumab were after 4 or 5 cycles, whereas patients receiving oral treatment were dosed twice a day with pexidartinib for at least 24 weeks and up to 30 months [17]. Superior efficacy of emactuzumab may be caused by the short half-life of pexidartinib with a median of 16.8 h [16], whereas that of emactuzumab is about 2 weeks [10].

Functional and symptomatic improvements are an important aspect for assessing clinical benefit in patients with dTGCT. Validated patient-reported outcomes that have been prospectively implemented in clinical trials to document treatment-induced symptomatic and functional improvement are scarce for patients with dTGCT. Gelhorn et al. [19] recently established the worst pain numeric rating scale, Patient Reported Outcomes Measurement Information System physical functioning items and the WOMAC pigmented villonodular synovitis and the histologically related lesion giant cell tumor of tendon sheath (PVNS-GCTTS) Index, as well as a worst stiffness numeric rating scale in 22 patients with TGCT treated with pexidartinib. In the phase III study of pexidartinib, the range of motion, physical functioning and stiffness improved significantly, and there was a trend in reduction of pain from baseline through to week 25 [17]. This is in line with the inventors' findings that the EQ-5D-3L QoL and WOMAC significantly improved over the treatment period.

Future studies may further explore the optimal treatment duration and ascertain the long-term therapeutic effects of CSF1R-targeting therapy with emactuzumab. In addition, the use of emactuzumab as a neoadjuvant or adjuvant treatment, i.e. before or after surgery, should be tested to elucidate long-term outcomes in such patients.

TABLE 17

| ABBREVIATION | DEFINITION |
| --- | --- |
| % CV | coefficient of variation |
| ADA | anti-drug antibody |
| ADR | adverse drug reaction |
| AE | adverse event |
| AESI | adverse event of special interest |
| ALP | alkaline phosphatase |
| ALT | alanine aminotransferase |
| AST | aspartate aminotransferase |
| BSA | body surface area |
| BW | body weight |
| CBR | clinical benefit rate |
| CFR | Code of Federal Regulations |
| CI | confidence interval |
| CMS | Centers for Medicare & Medicaid Service |
| CIOMS | Council for International Organisations of Medical Sciences |
| COVID-19 | Coronavirus Disease 2019 |
| CP | conditional probability |
| CPK | creatine phosphokinase |
| CR | complete response |
| CRO | contract research organisation |
| CSF-1 | colony stimulating factor-1 |
| CSF-1R | colony stimulating factor-1 receptor |

TABLE 17-continued

| ABBREVIATION | DEFINITION |
| --- | --- |
| CTCAE | Common Terminology Criteria for Adverse Events |
| DCR | disease control rate |
| DoR | duration of response |
| DSMB | Data Safety Monitoring Board |
| dTGCT | diffuse tenosynovial giant cell tumour |
| ECG | electrocardiogram |
| eCRF | electronic case report form |
| EDC | electronic data capture |
| EQ-5D-5L | EuroQoL 5-Dimension, 5-Level questionnaire |
| EQ-VAS | EuroQoL visual analogue scale |
| EU | European Union |
| FAS | full analysis set |
| FDA | Food and Drug Administration |
| FSH | follicle-stimulating hormone |
| GCP | Good Clinical Practice |
| GEE | generalised estimating equations |
| GMP | Good Manufacturing Practice |
| Hb | haemoglobin |
| HCP | Healthcare Professional |
| HRT | hormone-replacement therapy |
| IB | Investigator's Brochure |
| ICF | Informed Consent Form |
| ICH | International Council for Harmonisation |
| IEC | Independent Ethics Committee |
| IL | interleukin |
| IMP | investigational medicinal product |
| IRB | Institutional Review Board |
| IUD | intrauterine device |
| IUS | intrauterine hormone-releasing system |
| iv | intravenous |
| IWRS | interactive web response system |
| LD | longest diameter |
| LDH | lactate dehydrogenase |
| lTGCT | localised tenosynovial giant cell tumour |
| MCS | Mental Component Summary |
| MRI | magnetic resonance imaging |
| NE | non-evaluable |
| NRS | Numeric Rating Scale |
| NYHA | New York Heart Association |
| ORR | objective response rate |
| ol | open-label |
| PCS | Physical Component Summary |
| PD | progressive disease |
| PK | pharmacokinetic(s) |
| PKS | pharmacokinetics analysis set |
| PR | partial response |
| PRO | patient-reported outcomes |
| PROMIS | Patient-Reported Outcomes Measurement Information System; Physical Function Scale |
| Q2W | once every 2 weeks |
| QoL | quality of life |
| QTL | quality tolerance limit |
| RECIST | Response Evaluation Criteria in Solid Tumours |
| SAE | serious adverse event |
| SAP | statistical analysis plan |
| SARS-CoV-2 | severe acute respiratory syndrome coronavirus 2 |
| SD | stable disease |
| SF-12 v2 | Short Form 12-Item Survey version 2 |
| SoA | schedule of activities |
| SOP | standard operating procedure |
| SPF | sun protection factor |
| SS | sample size |
| SSRE | sample size re-estimation |
| SUSAR | suspected unexpected serious adverse reaction |
| TAM | tumour-associated macrophage |
| TEAE | treatment-emergent adverse event |
| TGCT | tenosynovial giant cell tumour |
| TVS | Tumour Volume Score |
| ULN | upper limit of normal |
| US | United States |
| VAS | Visual Analogue Scale |
| WOCBP | women of childbearing potential |
| w/v | weight/volume |

REFERENCES

The following references, to the extent that they provide exemplary procedural or other details supplementary to those set forth herein, are specifically incorporated herein by reference.

For Background and Examples 1-3

Bauer P, Köhne K. Evaluation of experiments with adaptive interim analyses. Biometrics. 1994; 50:1029-41.

Clinical Trial Regulation (EU) No 536/2014. Available from: //ec.europa.eu/health/sites/health/files/files/eudralex/vol-1/reg_2014_536/reg_2014_536_en.pdf. Accessed 9 Jul. 2021.

Cui L, Hung H M, Wang S J. Modification of sample size in group sequential clinical trials. Biometrics. 1999; 55:853-7.

Eisenhauer E A, Therasse P, Bogaerts J, Schwartz L H, Sargent D, Ford R, et al. New response evaluation criteria in solid tumours: revised RECIST guideline (version 1.1). Eur J Cancer. 2009; 45:228-47.

FDA Title 21, Code of Federal Regulations, Part 50—Protection of Human Subjects. Available from: //world-wide-web.ecfr.gov/cgi-bin/text-idx?SID=408dd86524f77ce09fef8fe0c60afa31&mc=true&node=pt21.1.50&rgn=div5. Accessed 9 Jul. 2021.

FDA Title 21, Code of Federal Regulations, Part 312—Investigational New Drug Application. Available from: //world-wide-web.accessdata.fda.gov/scripts/cdrh/cfdocs/cfcfr/CFRsearch.cfm?CFRPart=312. Accessed 9 Jul. 2021.

Gelhorn H L, Ye X, Speck R M, Tong S, Healey J H, Bukata S V, et al. The measurement of physical functioning among patients with Tenosynovial Giant Cell Tumour (TGCT) using the Patient-Reported Outcomes Measurement Information System (PROMIS). J Patient Rep Outcomes. 2019; 3:6.

HealthMeasures. 2021. Available from: //world-wide-web.healthmeasures.net/score-and-interpret/interpret-scores/promis/meaningful-change. Accessed 9 Jul. 2021.

International Council for Harmonisation E6 (R2): Integrated Addendum to ICH E6(R1): Guideline for Good Clinical Practice; 2016. Available: //world-wide-web.ich.org/page/efficacy-guidelines.

International Council for Harmonisation Q7: Good Manufacturing Practice Guide for Active Pharmaceutical Ingredients, 2000. Available from: //world-wide-web.ich.org/page/quality-guidelines. Accessed 9 Jul. 2021.

Janssen M F, Pickard A S, Golicki D, Gudex C, Niewada M, Scalone L, et al. Measurement properties of the EQ-5D-5L compared to the EQ-5D-3L across eight patient groups: a multi-country study. Qual Life Res. 2013; 22:1717-27.

Lin Y, Yu Y, Zeng J, Zhao X, Wan C. Comparing the reliability and validity of the SF-36 and SF-12 in measuring quality of life among adolescents in China: a large sample cross-sectional study. Health Qual Life Outcomes. 2020; 18:360.

Mastboom M J, Planje R, van de Sande M A. The Patient Perspective on the Impact of Tenosynovial Giant Cell Tumors on Daily Living: Crowdsourcing Study on Physical Function and Quality of Life. Interact J Med Res. 2018; 7.

Mehta C R, Pocock S J. Adaptive increase in sample size when interim results are promising: a practical guide with examples. Stat Med. 2011; 30:3267-84.

New York Heart Association. Nomenclature and Criteria for Diagnosis of Diseases of the Heart and Great Vessels. 9th ed Boston, Mass: Little, Brown & Co; 1994:253-56.

Ouyang J, Carroll K J, Koch G, Junfang L. Coping with missing data in phase III pivotal registration trials: Tolvaptan in subjects with kidney disease, a case study. Pharm Stat. 2017; 16:250-66.

Palmerini E, Bastida J L, Ye X, Stacchiot S, Staals E L, Spierenburg G, Laeis P, et al; 2020. TOPP: Tenosynovial Giant Cell Tumor Observational Platform Project—Patient-Reported Symptoms and Quality of Life (QoL) from a European and US Prospective Registry. CTOS Virtual Annual Meeting November 2020; Poster 038.

Radi Z A, Koza-Taylor P A, Bell R R, Obert L A, Runnele H A, Beebe J S, et al. Increased serum enzyme levels associated with kupffer cell reduction with no signs of hepatic or skeletal muscle injury. Am J Pathol. 2011; 179:240-7.

Rose M, Bjorner J B, Gandek B, Bruce B, Fries J F, Ware J E Jr. The PROMIS Physical Function item bank was calibrated to a standardized metric and shown to improve measurement efficiency. J Clin Epidemiol. 2014; 67:516-26.

Smart K, Bröske A M, Rüttinger D, Mueller C, Phipps A, Walz A C, et al. PK/PD Mediated Dose Optimization of Emactuzumab, a CSF1R Inhibitor, in Patients With Advanced Solid Tumors and Diffuse-Type Tenosynovial Giant Cell Tumor. Clin Pharmacol Ther. 2020; 108:616-24.

Stolk E, Ludwig K, Rand K, Van Hout B, Ramos-Goni J M. Overview, Update, and Lessons Learned From the International EQ-5D-5L Valuation Work: version 2 of the EQ-5D-5L Valuation Protocol. Value Health. 2019; 22:23-30.

Tong A, Wong G, McTaggart S, Henning P, Mackie F, Carroll R P, et al. Quality of life of young adults and adolescents with chronic kidney disease. J Pediatr. 2013; 163:1179-85.

Verspoor F G M, Mastboom M J L, Hannink G, van der Graaf W T A, van de Sande M A J, Schreuder HWB. The effect of surgery in tenosynovial giant cell tumours as measured by patient-reported outcomes on quality of life and joint function. Bone Joint J. 2019; 101-B:272-80.

For Examples 4-6

[1] O'Connell J X, Fanburg J C, Rosenberg A E. Giant cell tumor of tendon sheath and pigmented villonodular synovitis: immunophenotype suggests a synovial cell origin. Hum Pathol 1995; 26:771e5.

[2] O'Connell J X. Pathology of the synovium. Am J Clin Pathol 2000; 114:773e84.

[3] West R B, Rubin B P, Miller M A, Subramanian S, Kaygusuz G, Montgomery K, et al. A landscape effect in tenosynovial giant-cell tumor from activation of CSF1 expression by a translocation in a minority of tumor cells. Proc Natl Acad SciUSA2006; 103:690e5.

[4] Palmerini E, Staals E L, Maki R G, Pengo S, Cioffi A, Gambarotti M, et al. Tenosynovial giant cell tumour/pigmented villonodular synovitis: outcome of 294 patients before the era of kinase inhibitors. Eur J Canc 2015; 51:210e7.

[5] Chen E L, de Castro C Mt, Hendzel K D, Iwaz S, Kim M A, Valeshabad A K, et al. Histologically benign metastasizing tenosynovial giant cell tumor mimicking metastatic malignancy: a case report and review of literature. Radiol Case Rep 2019; 14:934e40.

[6] Verspoor F G, Zee A A, Hannink G, van der Geest I C, Veth R P, Schreuder H W. Long-term follow-up results of primary and recurrent pigmented villonodular synovitis. Rheumatology 2014; 53:2063e70.
[7] Burton T M, Ye X, Parker E D, Bancroft T, Healey J. Burden of illness associated with tenosynovial giant cell tumors. Clin Therapeut 2018; 40:593e602 e591.
[8] Lin F, Kwong J, Ionescu-Ittu R, Pivneva I, Wynant W, Shi S, et al. Work productivity loss in patients with tenosynovial giant cell tumors in the United States. J Clin Oncol 2019; 37. e22527ee22527.
[9] Ries C H, Cannarile M A, Hoves S, Benz J, Wartha K, Runza V, et al. Targeting tumor-associated macrophages with anti-CSF-1R antibody reveals a strategy for cancer therapy. Canc Cell 2014; 25: 846e59.
[10] Cassier P A, Italiano A, Gomez-Roca C A, Le Tourneau C, Toulmonde M, Cannarile M A, et al. CSF1R inhibition with emactuzumab in locally advanced diffuse-type tenosynovial giant cell tumours of the soft tissue: a dose-escalation and dose-expansion phase 1 study. Lancet Oncol 2015; 16:949e56.
[11] Young H, Baum R, Cremerius U, Herholz K, Hoekstra O, Lammertsma A A, et al. Measurement of clinical and subclinical tumour response using [18F]-fluorodeoxyglucose and positron emission tomography: review and 1999 EORTC recommendations. European Organization for Research and Treatment of Cancer (EORTC) PET Study Group. Eur J Canc 1999; 35: 1773e82.
[12] Eisenhauer E A, Therasse P, Bogaerts J, Schwartz L H, Sargent D, Ford R, et al. New response evaluation criteria in solid tumours: revised RECIST guideline (version 1.1). Eur J Canc 2009; 45: 228e47.
[13] Cassier P A, Gelderblom H, Stacchiotti S, Thomas D, Maki R G, Kroep J R, et al. Efficacy of imatinib mesylate for the treatment of locally advanced and/or metastatic tenosynovial giant cell tumor/pigmented villonodular synovitis. Cancer 2012; 118: 1649e55.
[14] Gelderblom H, Cropet C, Chevreau C, Boyle R, Tattersall M, Stacchiotti S, et al. Nilotinib in locally advanced pigmented villonodular synovitis: a multicentre, open-label, single-arm, phase 2 trial. Lancet Oncol 2018; 19:639e48.
[15] Sankhala K, Blay J, Ganjoo K, Italiano A. A phase I/II dose escalation and expansion study of cabiralizumab (cabira; FPA-008), an anti-CSF1R antibody, in tenosynovial giant cell tumor (TGCT, diffuse pigmented villonodular synovitis D-PVNS). J Clin Oncol 2017; 35.
[16] Tap W D, Wainberg Z A, Anthony S P, Ibrahim P N, Zhang C, Healey J H, et al. Structure-guided blockade of CSF1R kinase in tenosynovial giant-cell tumor. N Engl J Med 2015; 373: 428e37.
[17] Tap W D, Gelderblom H, Palmerini E, Desai J, Bauer S, Blay J Y, et al. Pexidartinib versus placebo for advanced tenosynovial giant cell tumour (ENLIVEN): a randomised phase 3 trial. Lancet 2019; 394:478e87.
[18] Gelderblom H, Tap W D, Palmerini E, Stacchiotti S, Wainberg Z A, Desai J, et al. Pexidartinib for advanced tenosynovial giant cell tumor (TGCT): long-term efficacy and safety from the phase 3 ENLIVEN and phase 1 PLX108-01 (TGCT cohort) studies. J Clin Oncol 2019; 37. 11042e11042.
[19] Gelhorn H L, Tong S, McQuarrie K, Vernon C, Hanlon J, Maclaine G, et al. Patient-reported symptoms of tenosynovial giant cell tumors. Clin Therapeut 2016; 38:778e93.

---

What is claimed:

1. A method for the treatment of tenosynovial giant cell tumour (TGCT) in a subject, according to a treatment regimen;
   wherein the treatment regimen consists of five treatment cycles of Emactuzumab; and,
   wherein a treatment cycle comprises one administration of about 1000 mg of Emactuzumab; and
   wherein the administration is an intravenous (IV) administration.

2. The method of claim 1, wherein the IV infusion is administered over a period of about 30 minutes to about 360 minutes.

3. The method of claim 2, wherein the IV infusion is administered over a period of about 90 minutes.

4. The method of claim 1, wherein the treatment is a monotherapy.

5. The method of claim 1, wherein the subject exhibits a long duration of response to the treatment regimen, wherein the long duration of response is at least six months.

* * * * *